__United States Patent Office__

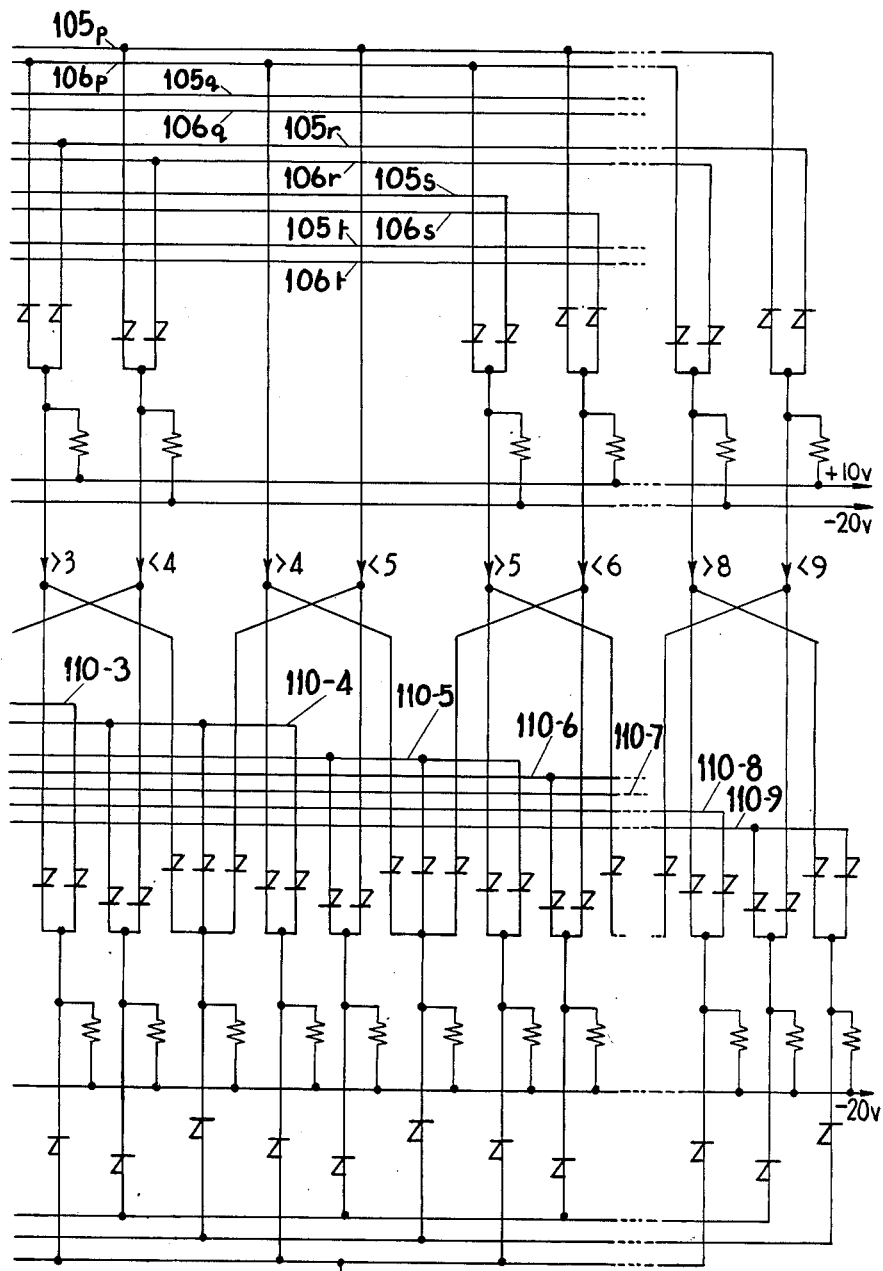
Fig. 11.b

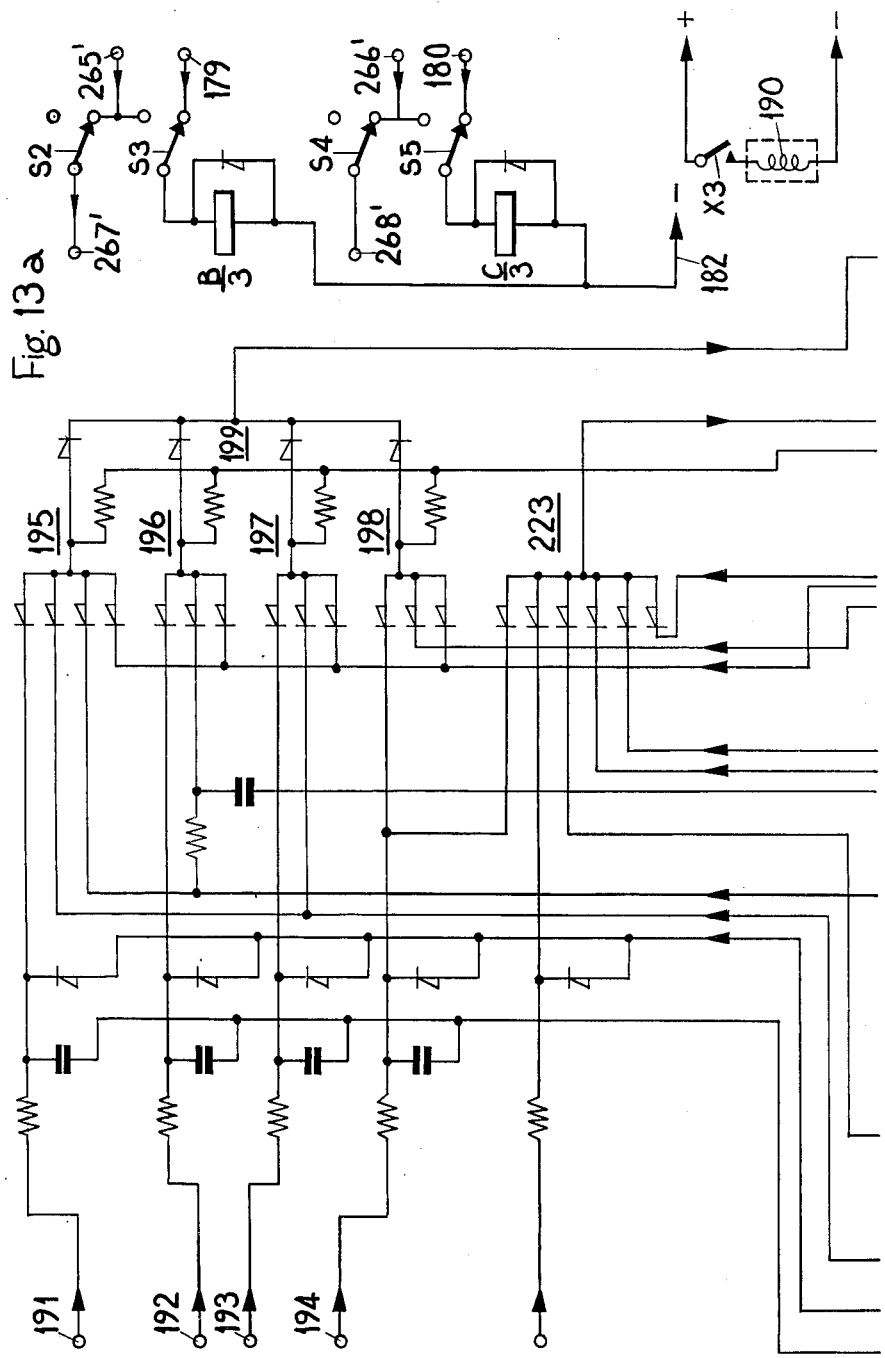

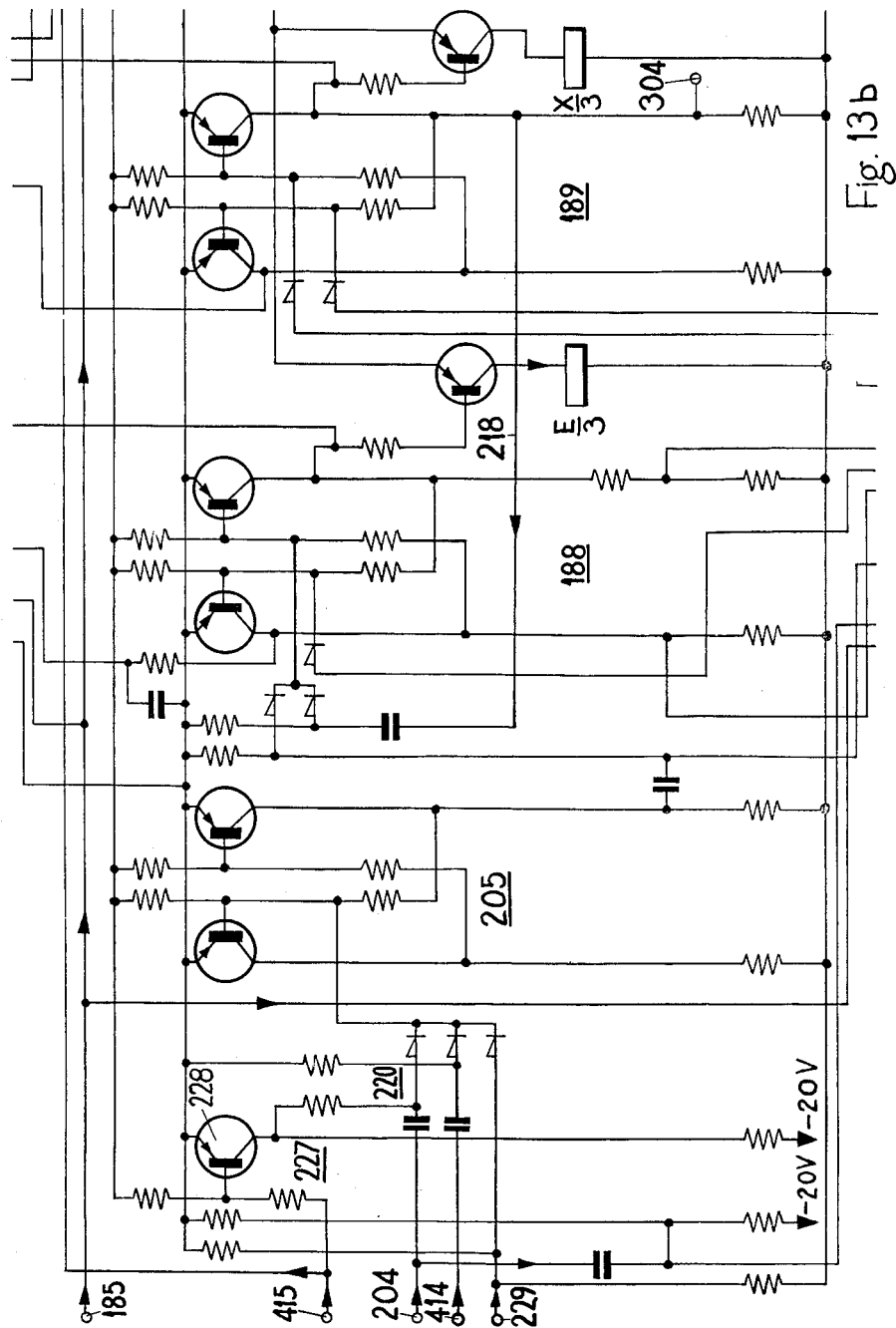

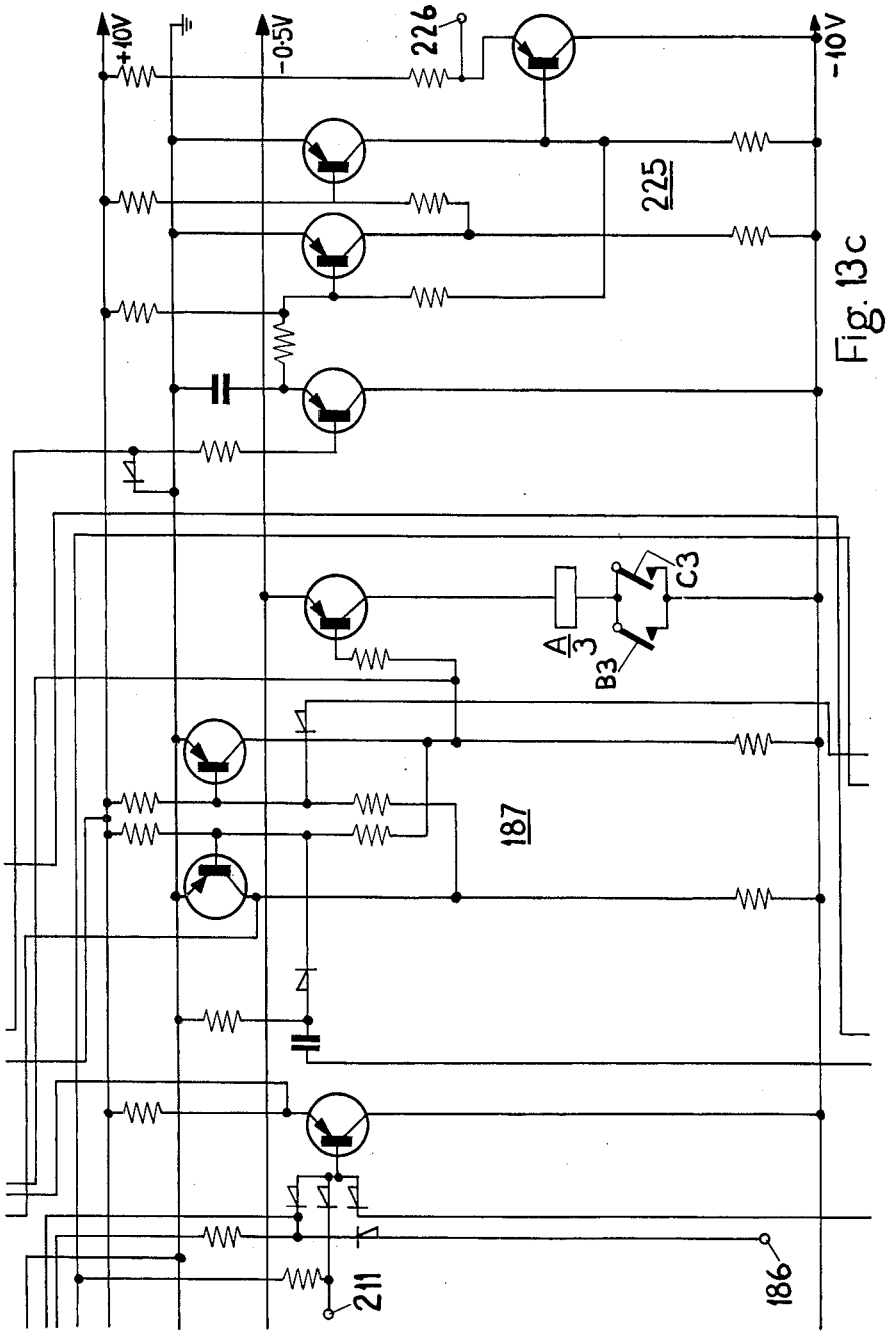

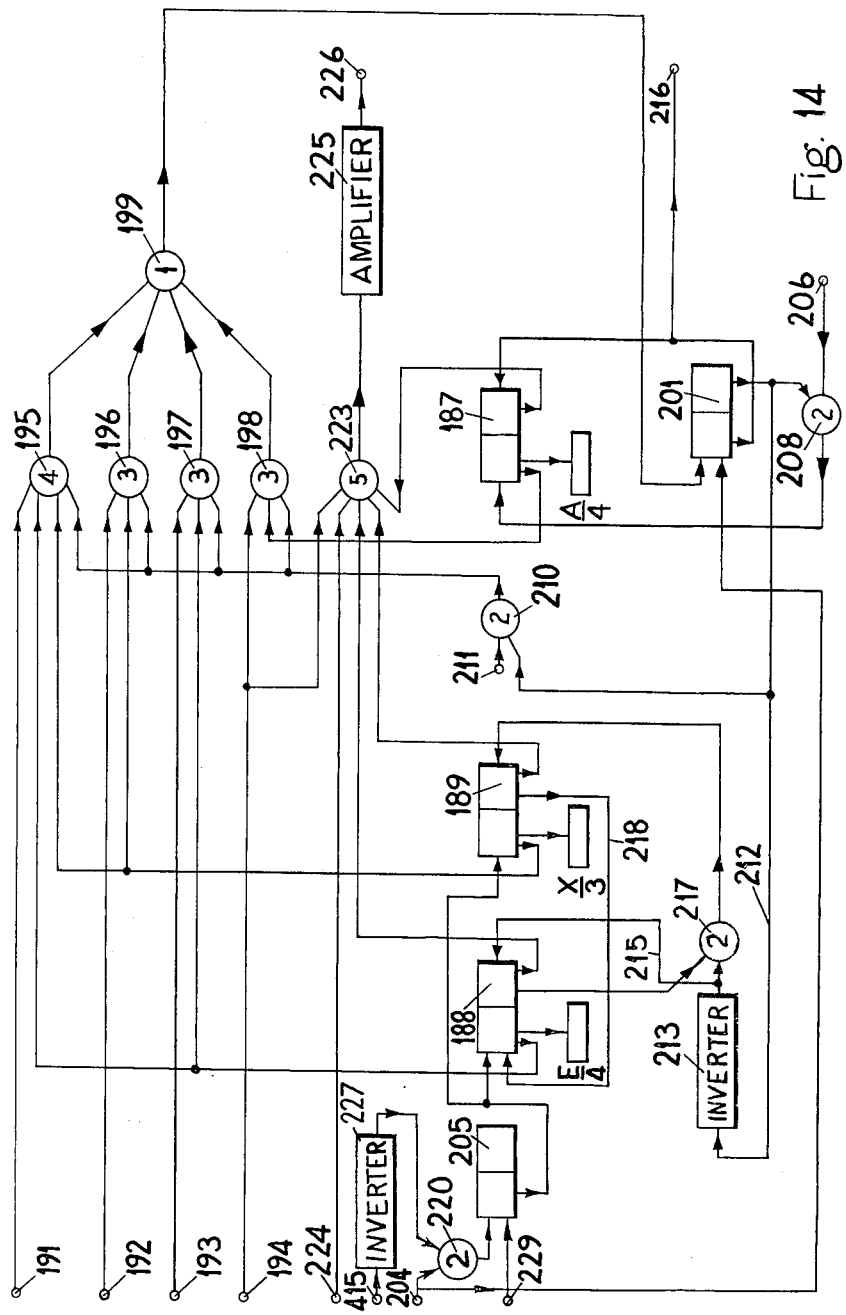

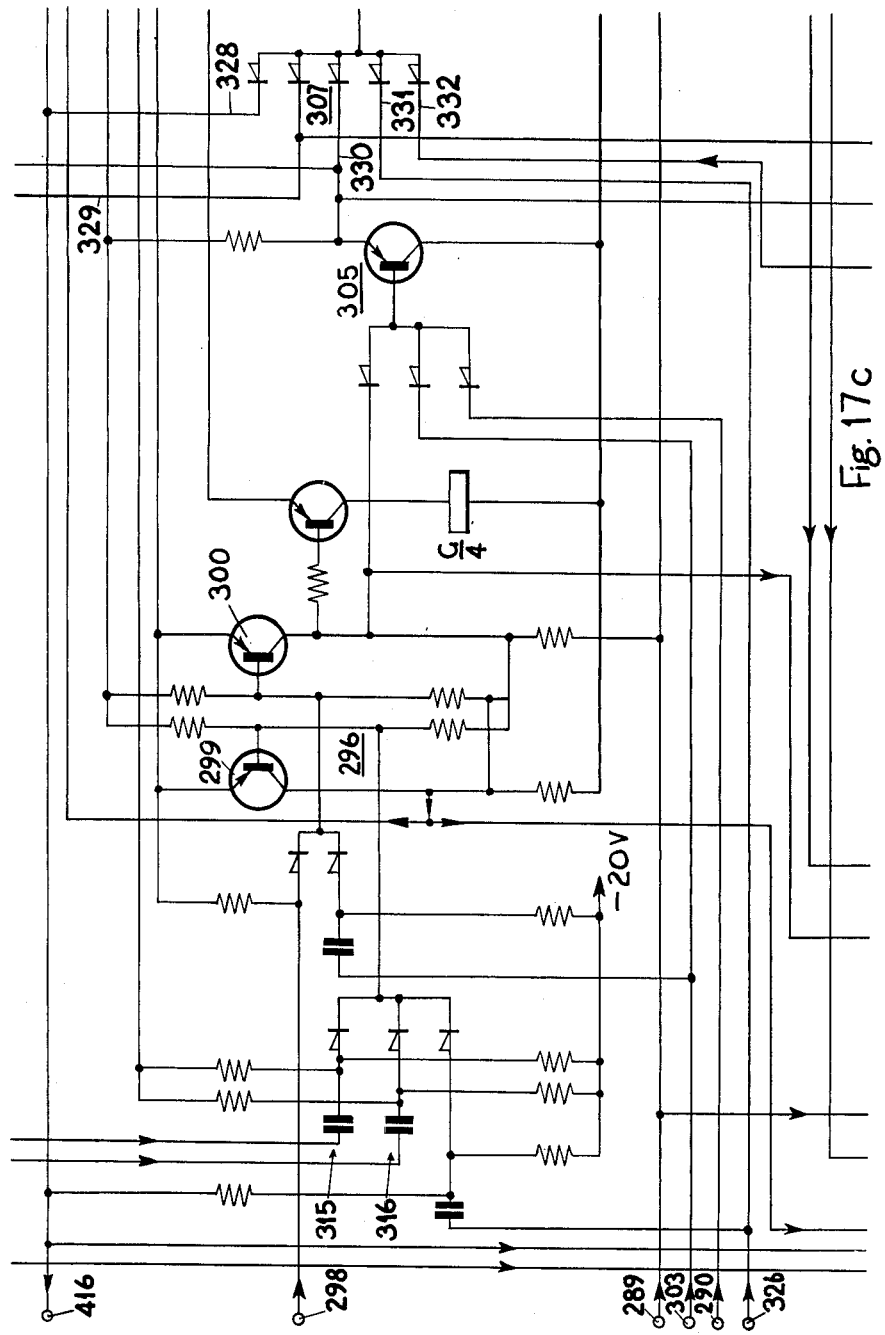

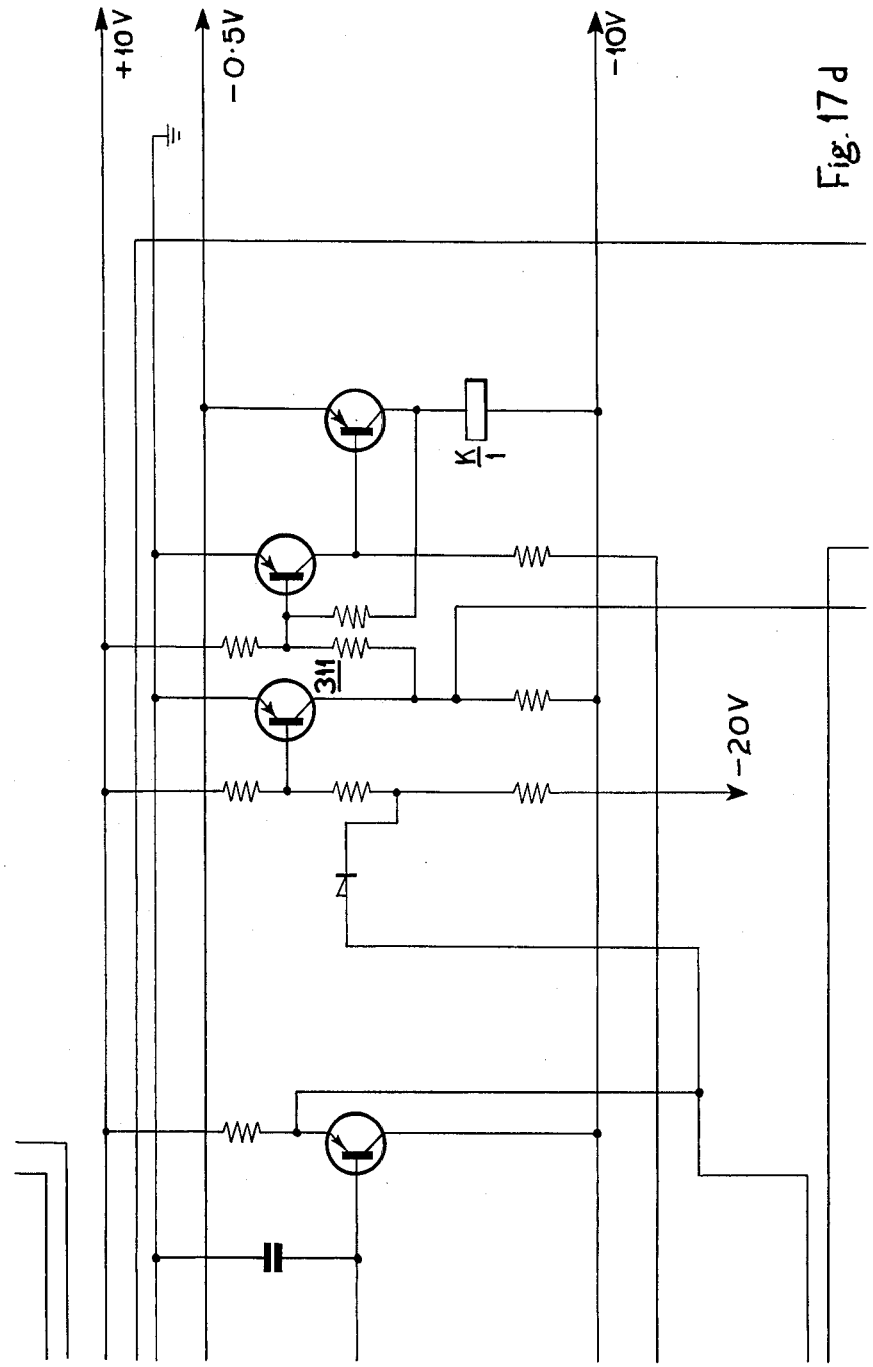

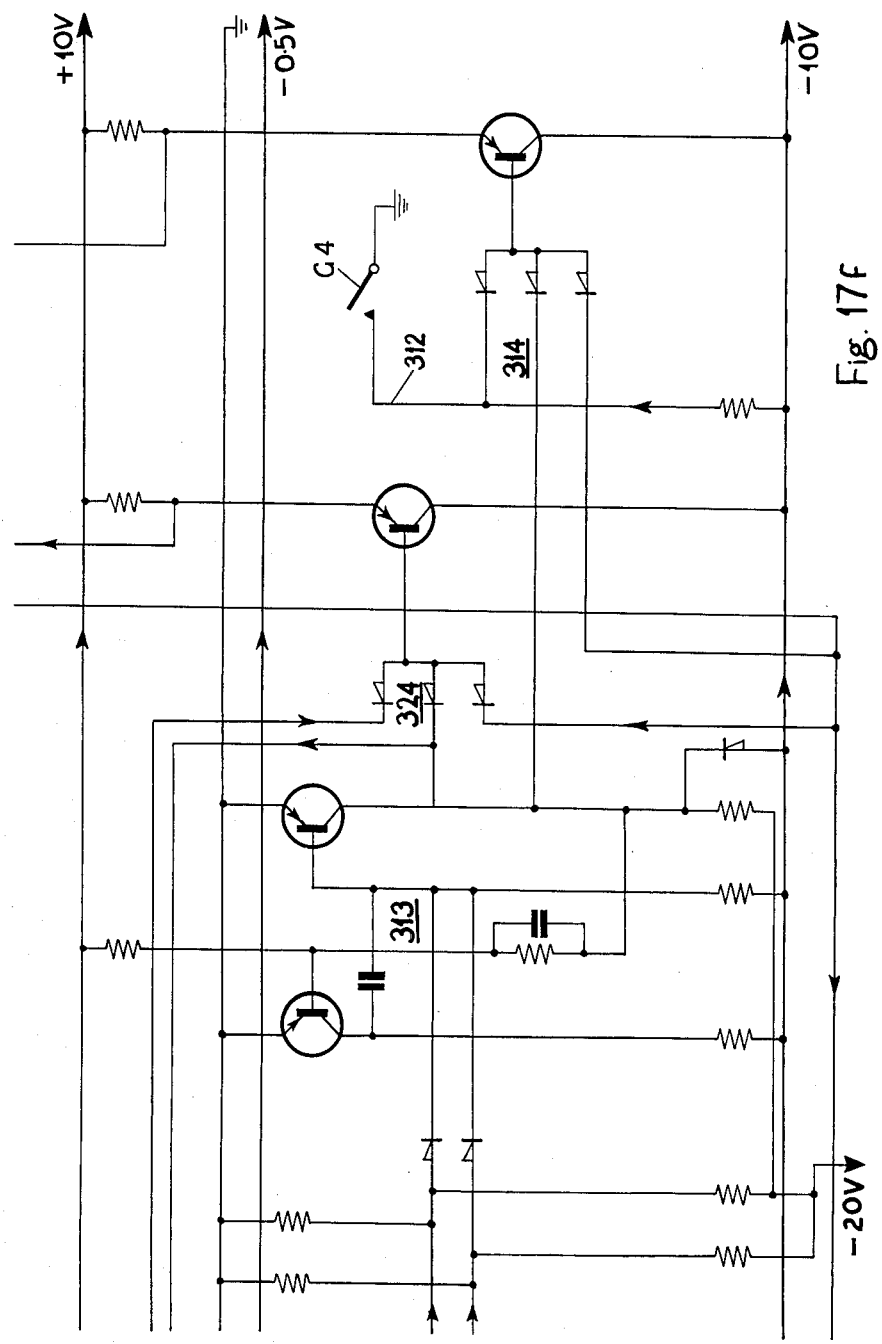

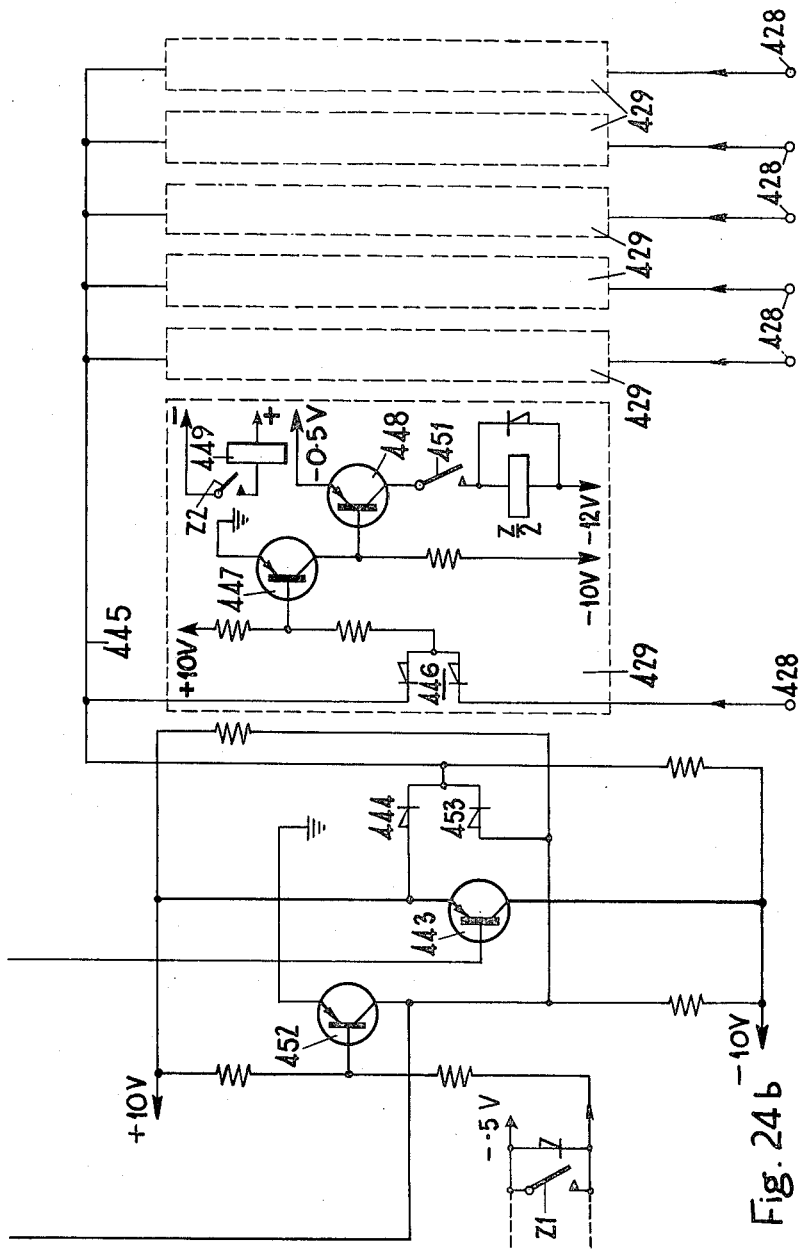

3,209,221
Patented Sept. 28, 1965

3,209,221
POSITION CONTROL INCLUDING FIRST DIGITAL MOTOR CONTROL TO SET POSITION AND SECOND CONTROL TO FOLLOWUP
Peter Charles Pugsley, Hatch End, and Basil Amory Turner, London, England, assignors to The General Electric Company Limited, London, England
Filed Apr. 11, 1960, Ser. No. 21,182
Claims priority, application Great Britain, Apr. 14, 1959, 12,628/59
5 Claims. (Cl. 318—28)

This invention relates to position control arrangements of the kind which is adapted to control the position of a movable member in dependence upon input data supplied to the arrangement in the form of a multi-digit number which gives a measure of the desired position of the member from an arbitrary zero position.

One object of the present invention is to provide a control arrangement which enables the zero position to be changed.

According to the present invention, in a position control arrangement which is of the kind specified and which comprises means to supply information in the form of a multi-digit number in respect of the actual position of the movable member and means to move said member in dependence upon comparison of said two numbers so as to reduce the difference between those numbers to some predetermined value, which may be zero, there is provided zero-changing means to change the electrical representation of one of said numbers whereby said zero position may be moved.

Preferably the zero-changing means is arranged to change a group of signals which represent the information in respect of the actual position of said member and if the multi-digit number represented thereby is a decimal number, each of the signals of said group may represent one binary digit of a binary coding of the appropriate decimal number.

An arrangement in accordance with the present invention may form part of a system for controlling the relative position of a working tool and the table of a machine tool such as a boring machine. For example, a movable part, say the table of the machine, may be required to be positioned during normal operation of the system in dependence upon the position of said movable member and, in that case, there may be means which is responsive to the relative position of said movable part and said movable member and which is arranged to supply an electric signal which is utilised for the purpose of controlling the position of the movable part during normal positioning of that part and, alternatively, to control the position of the movable member so as to bring it to a position determined by the movable part prior to the electrical representation of the number corresponding to the position of said movable member being changed as aforesaid.

A position control system which includes an arrangement in accordance with the present invention and which is for use with a boring machine will now be described by way of example with reference to the accompanying drawings in which.

Figure 1:
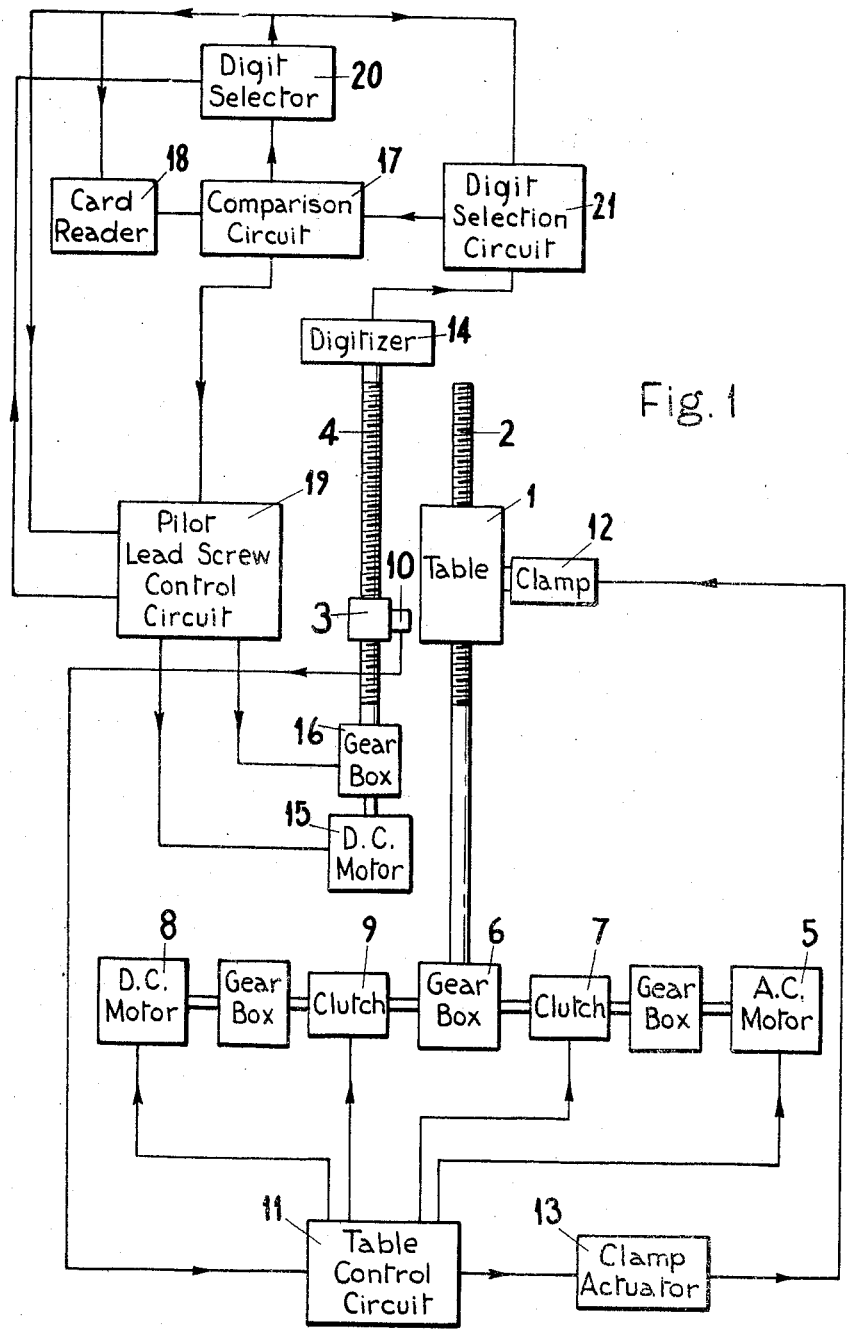
FIGURE 1 is a block diagram of the complete system.
Figure 11A:
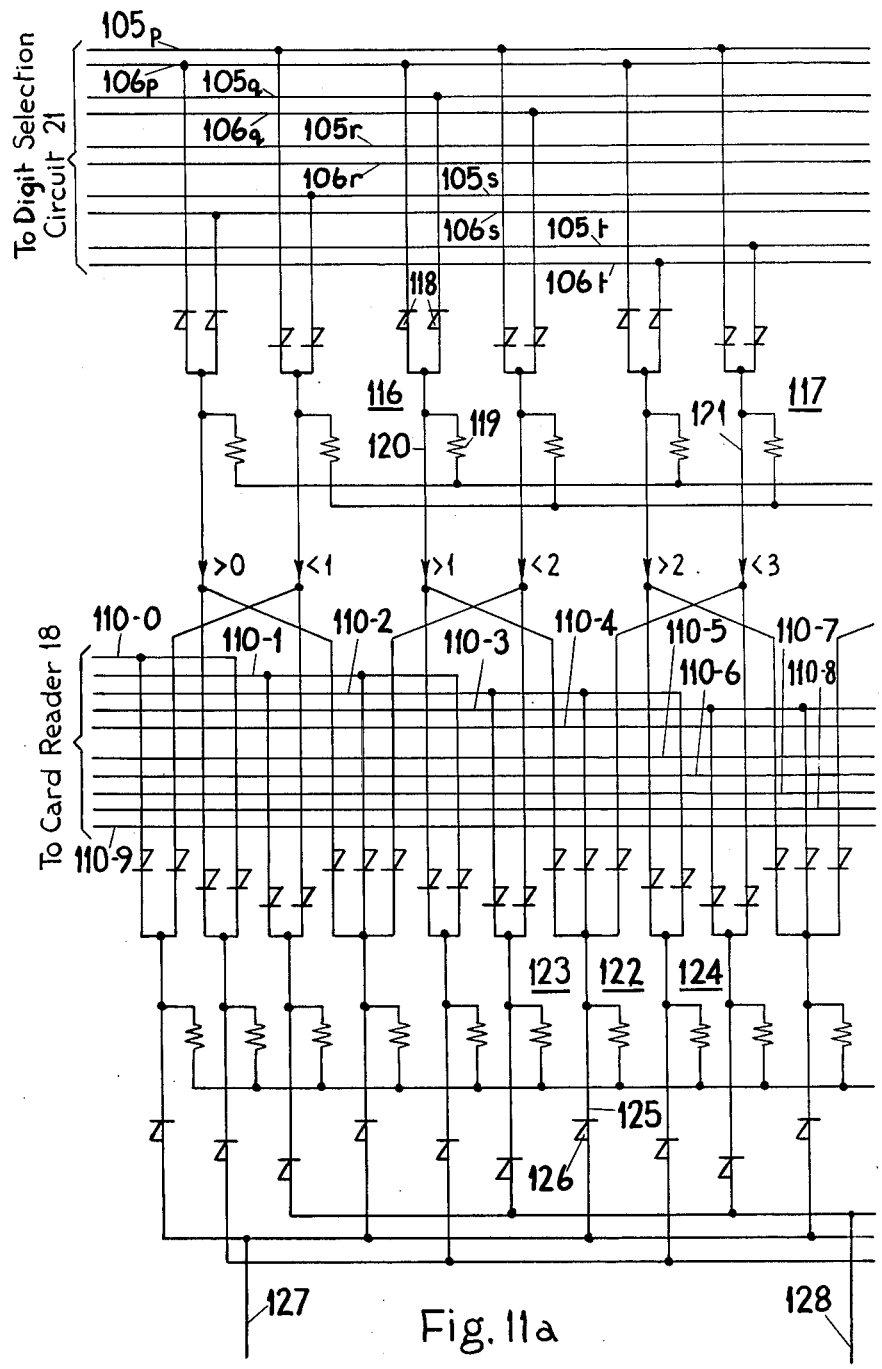
Figure 11C:
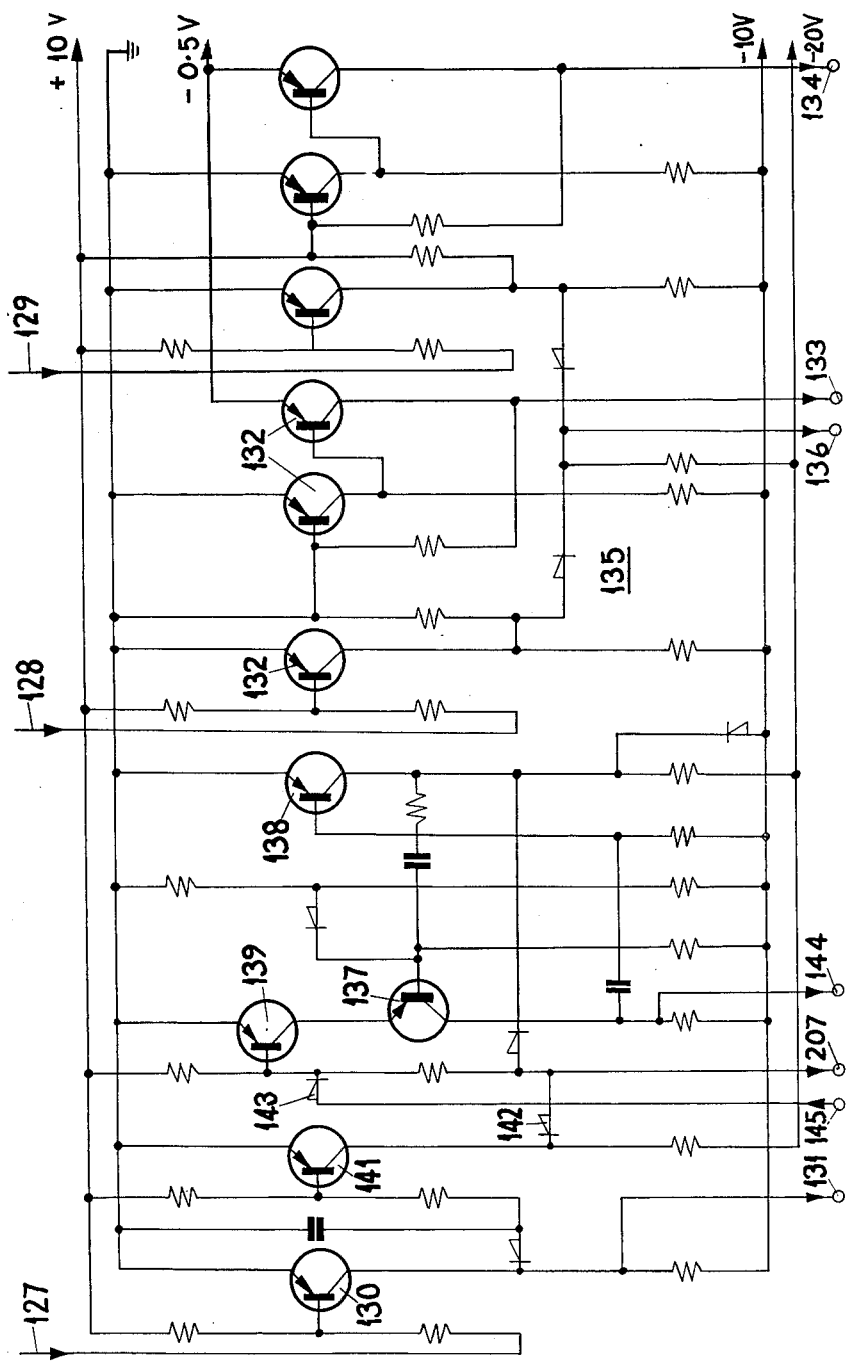
Figure 11D:
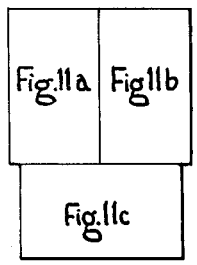
Figure 13F:
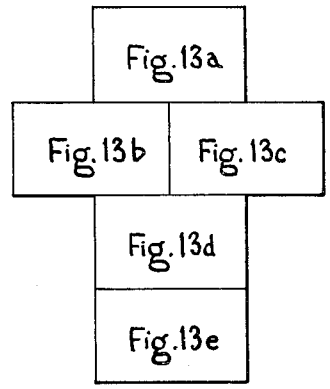
Figure 17H:
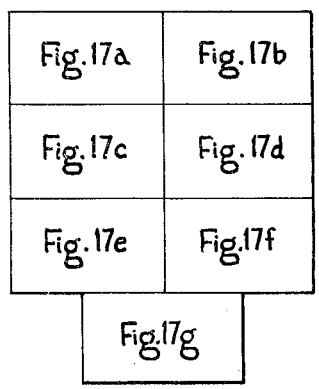
Figure 24C:
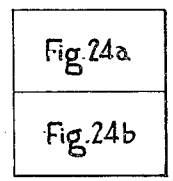
Figure 12:
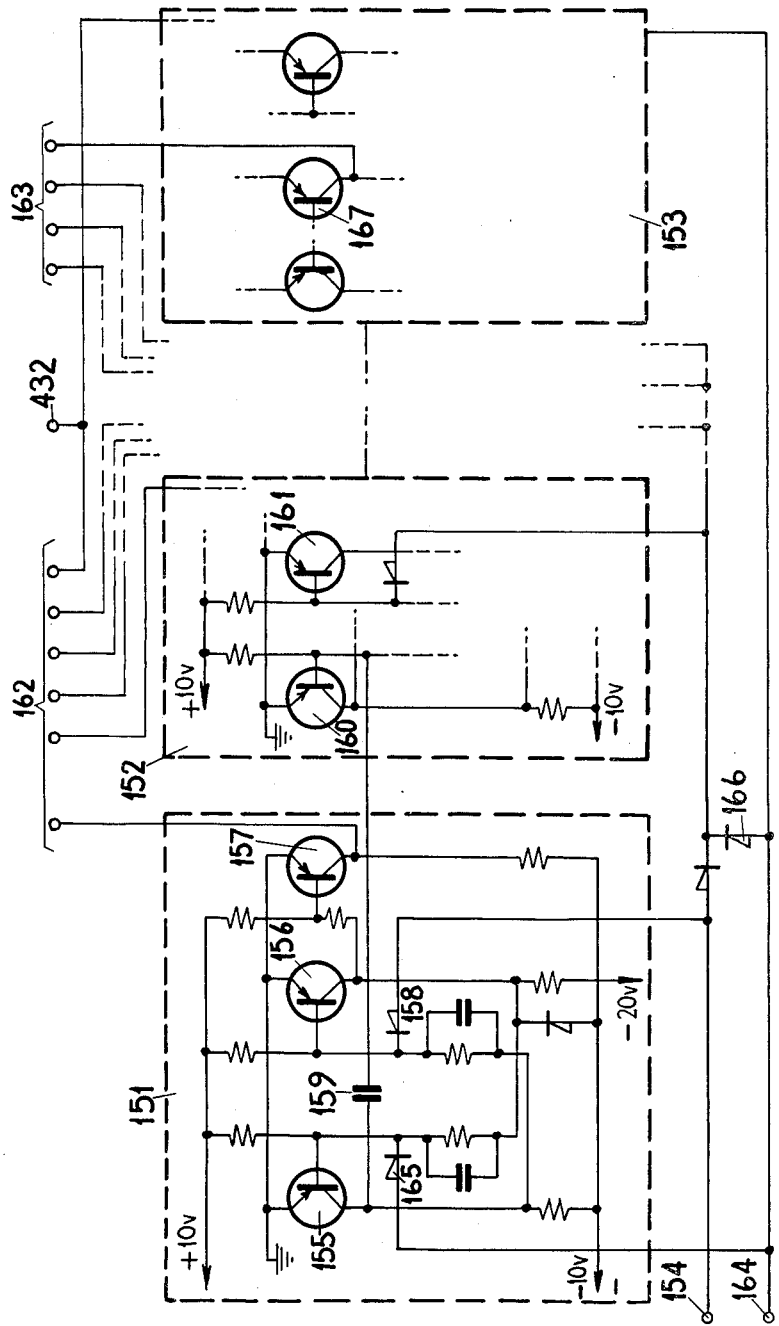
Figure 15:
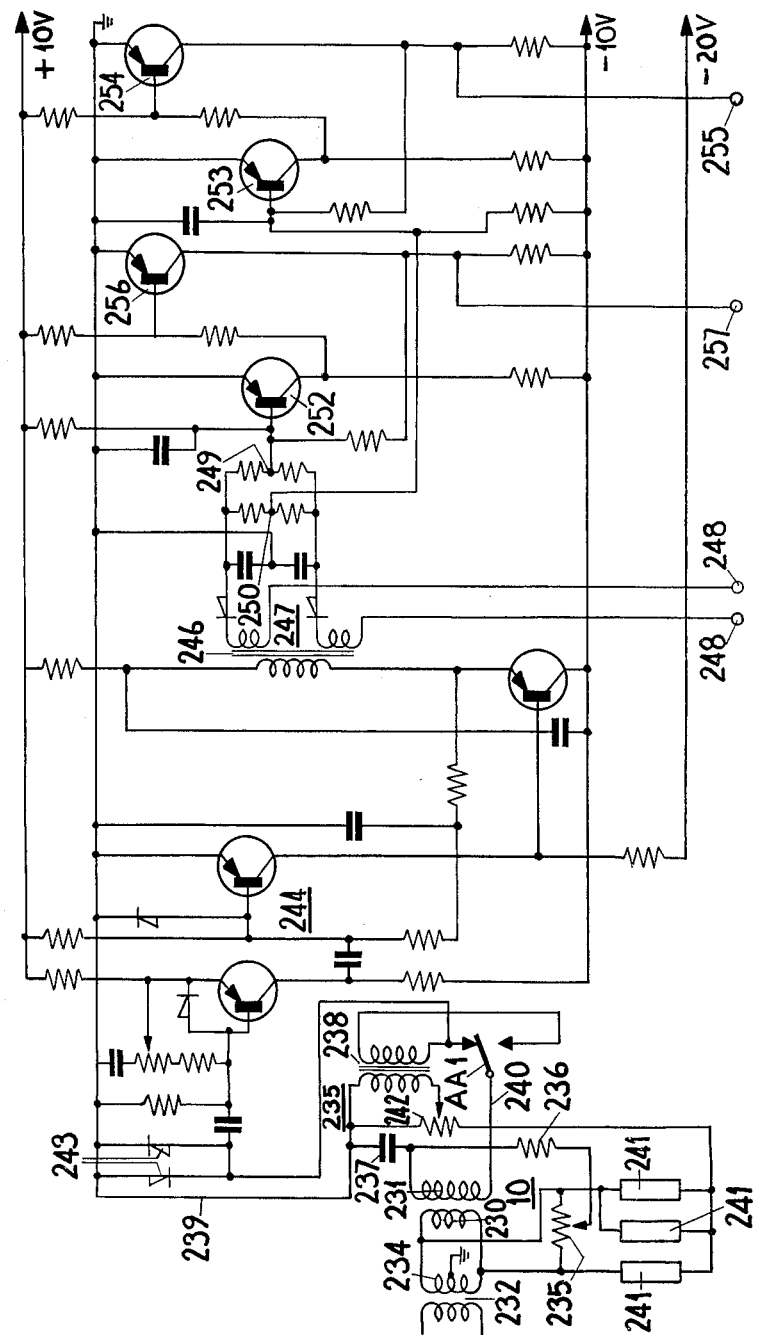
Figure 16:
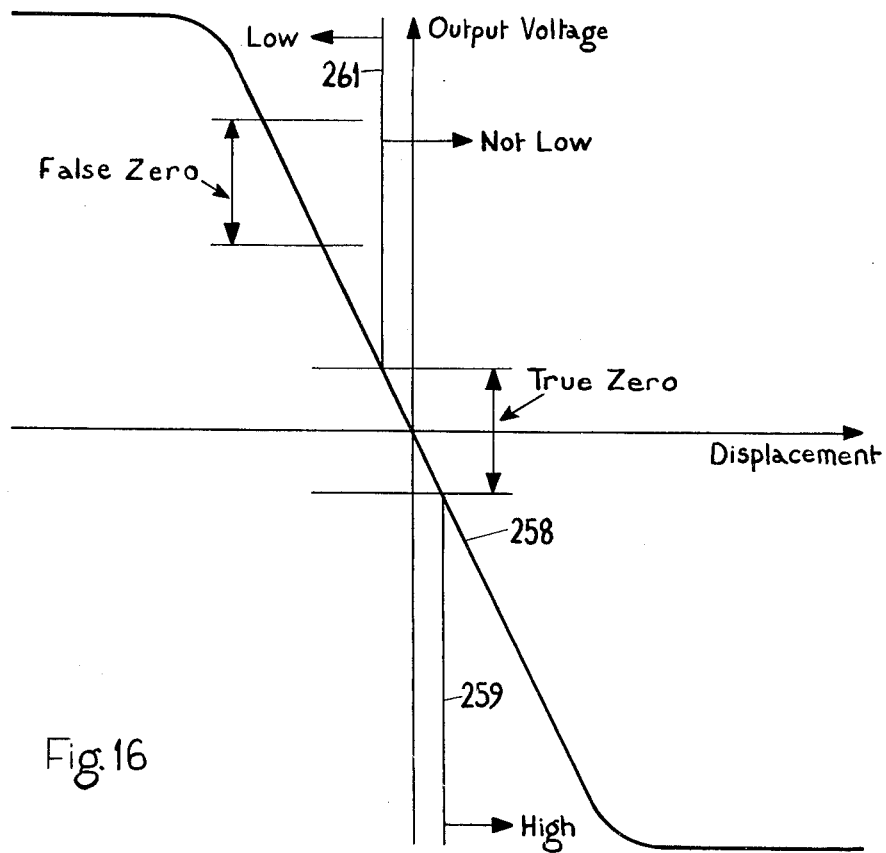
Figure 18:
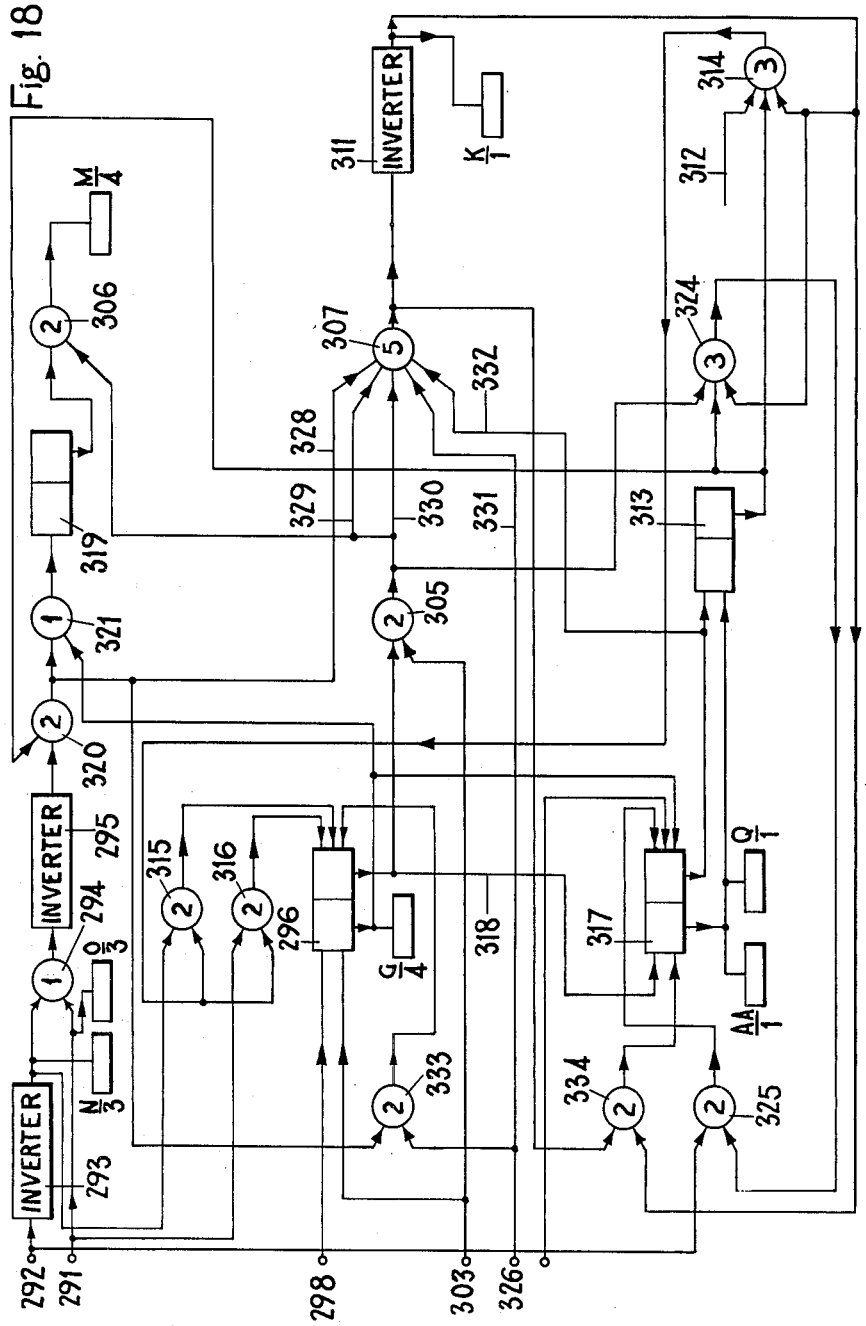
Figure 19:
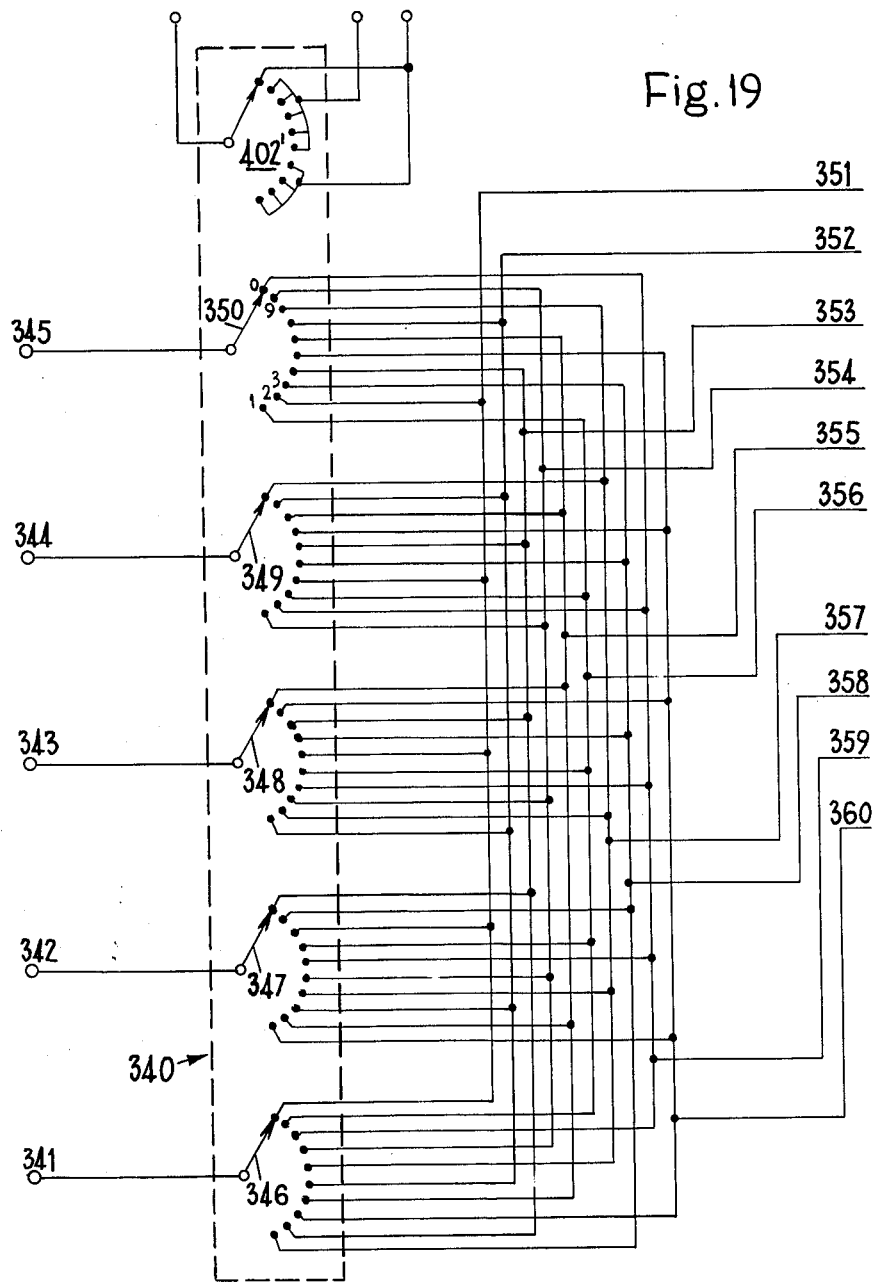
Figure 20:
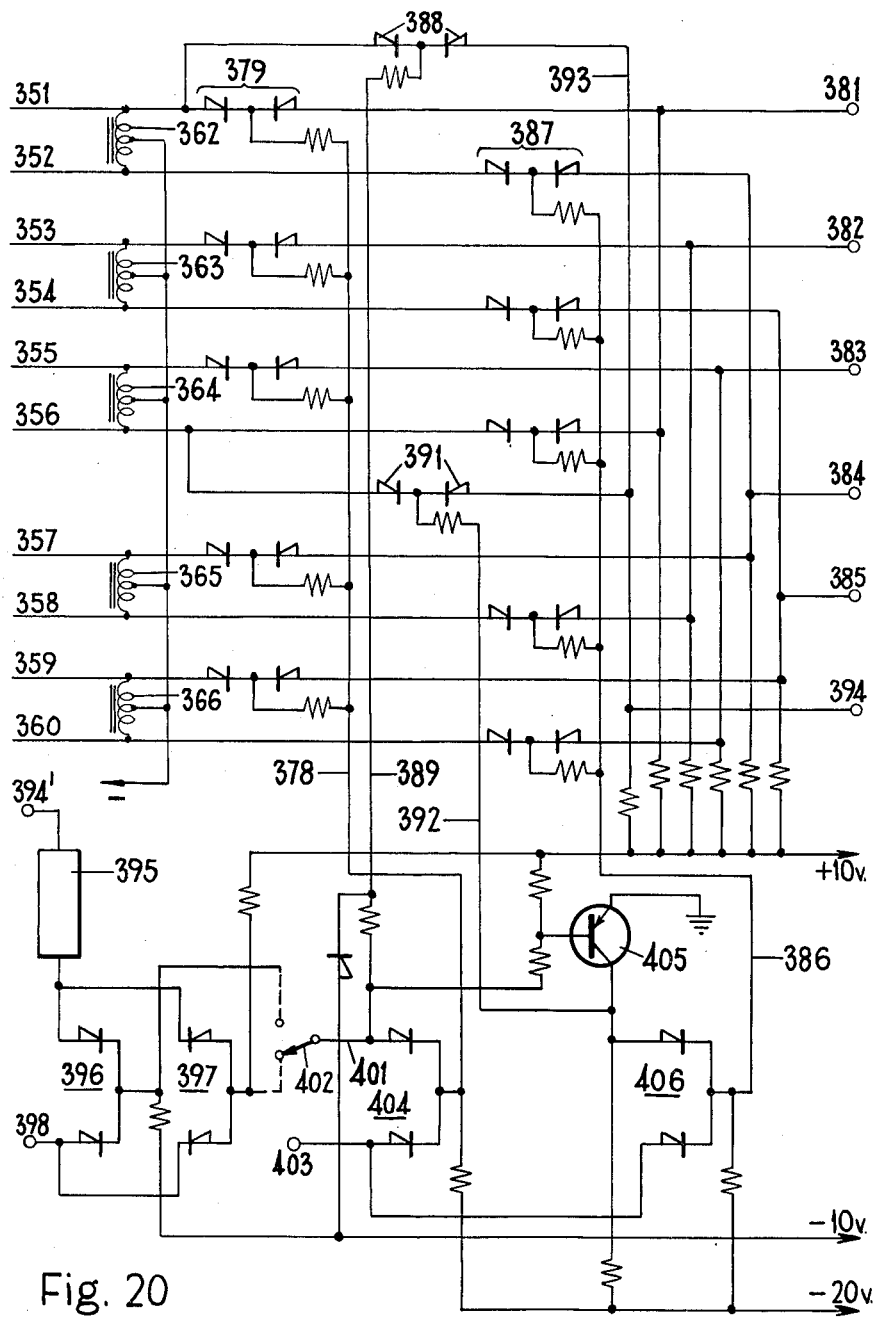
Figure 21:
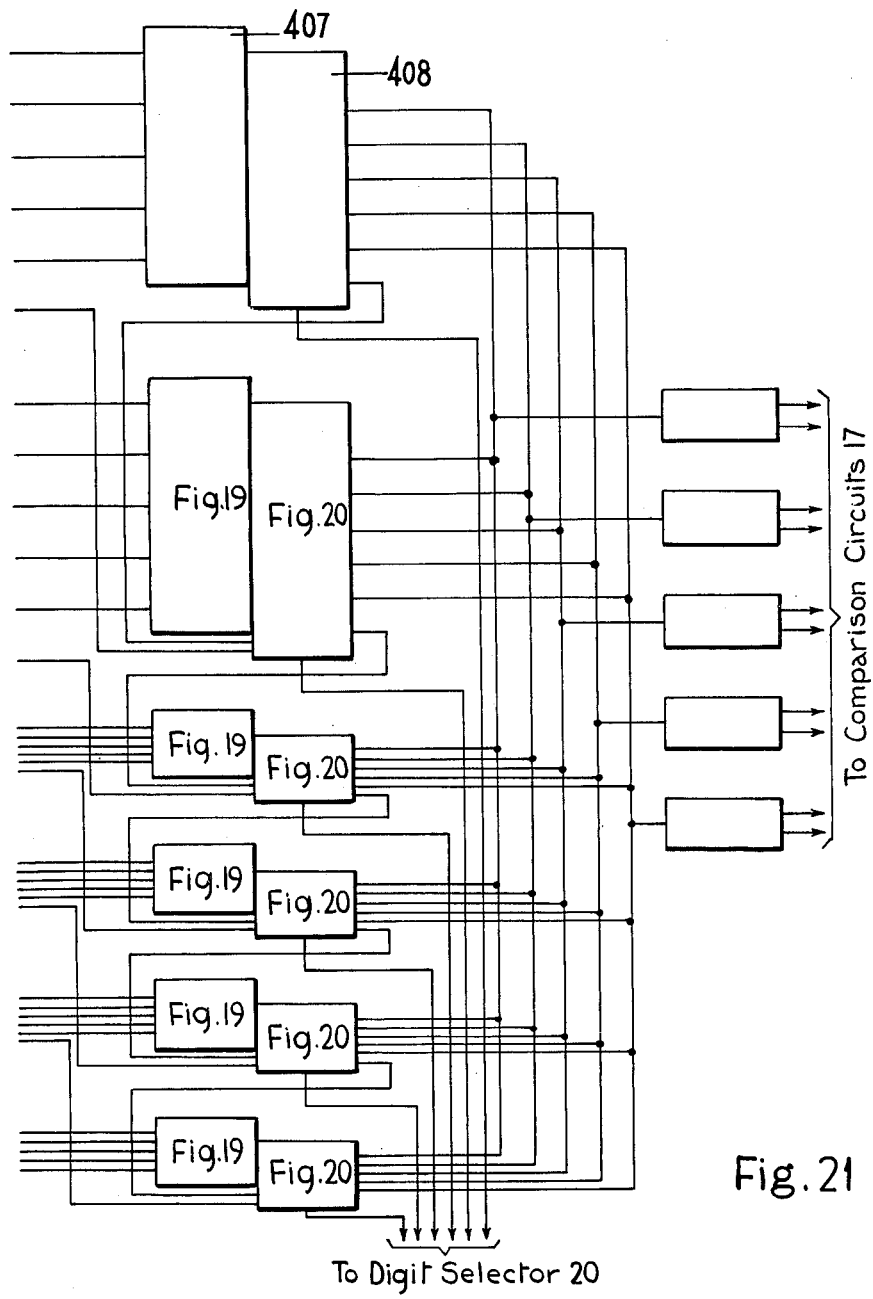
Figure 22:
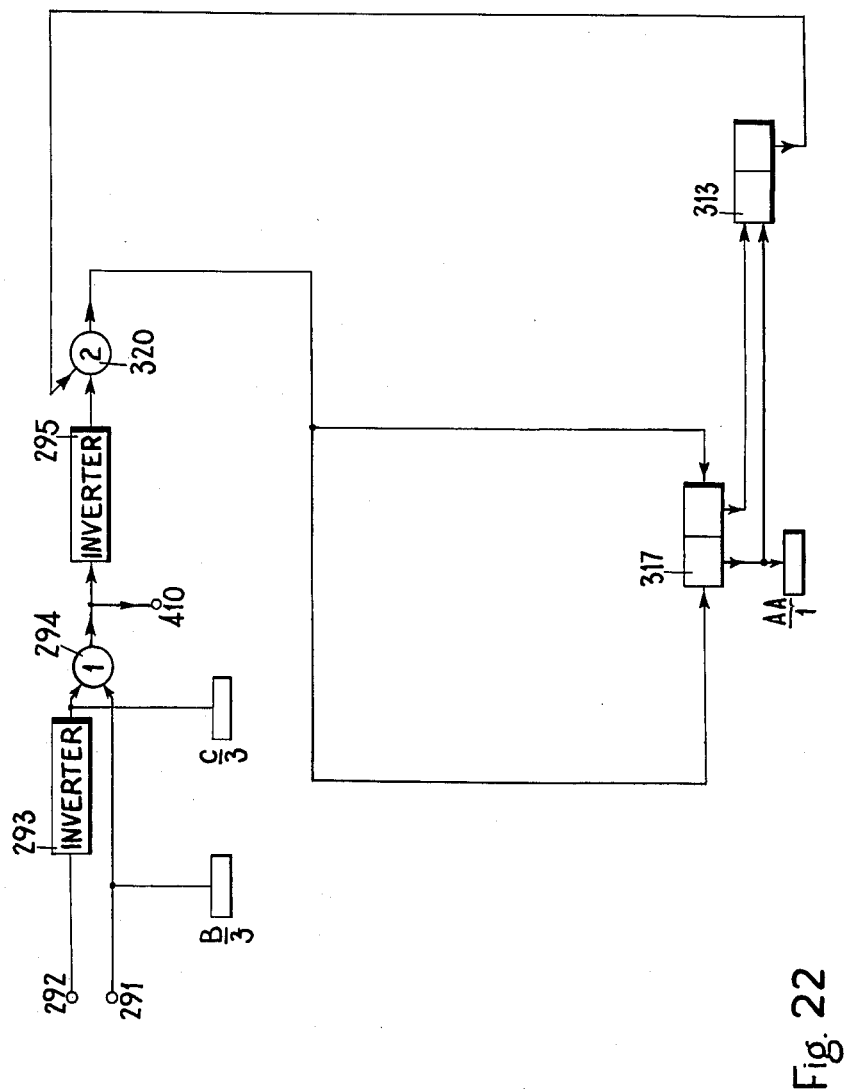
Figure 23:
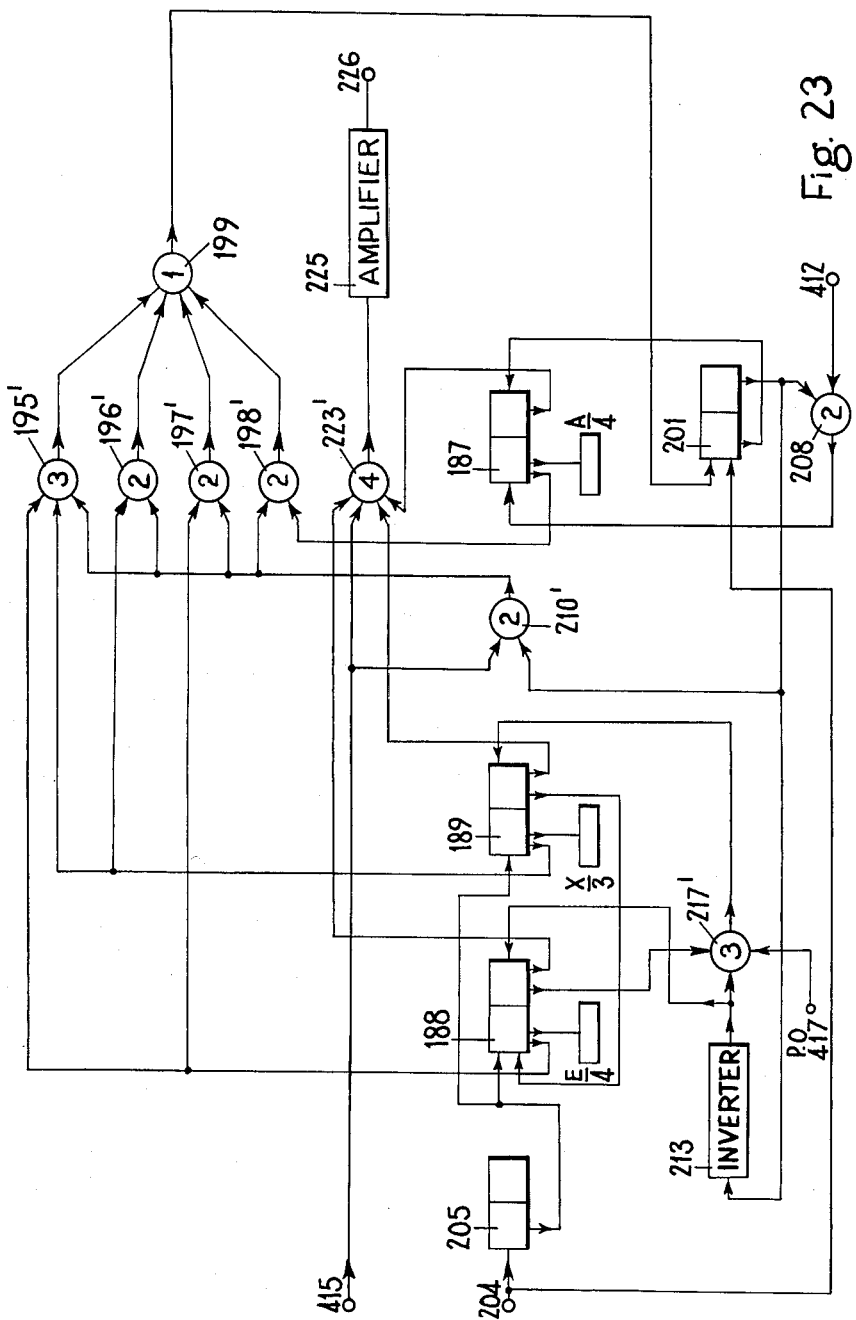
Figure 24A:
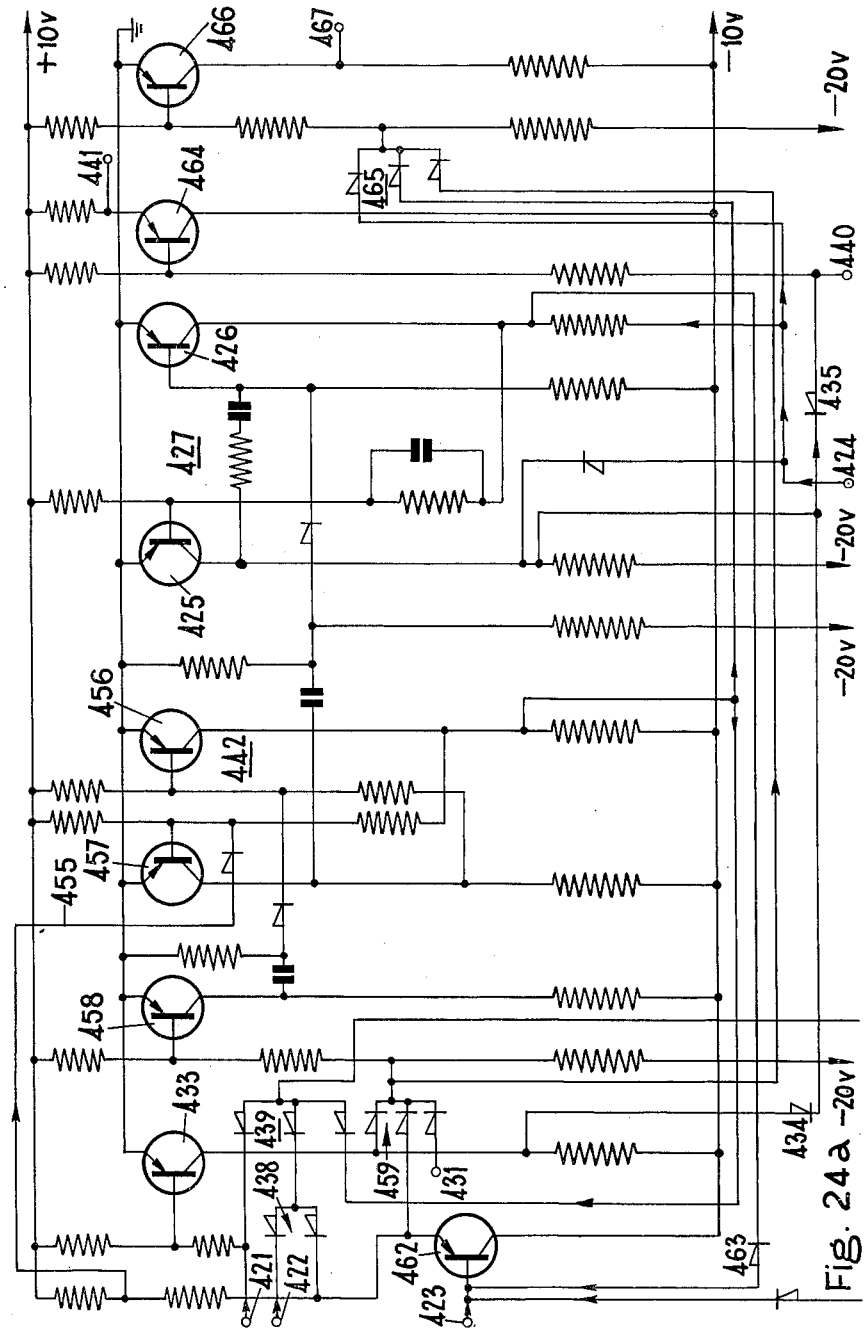
Figure 25:
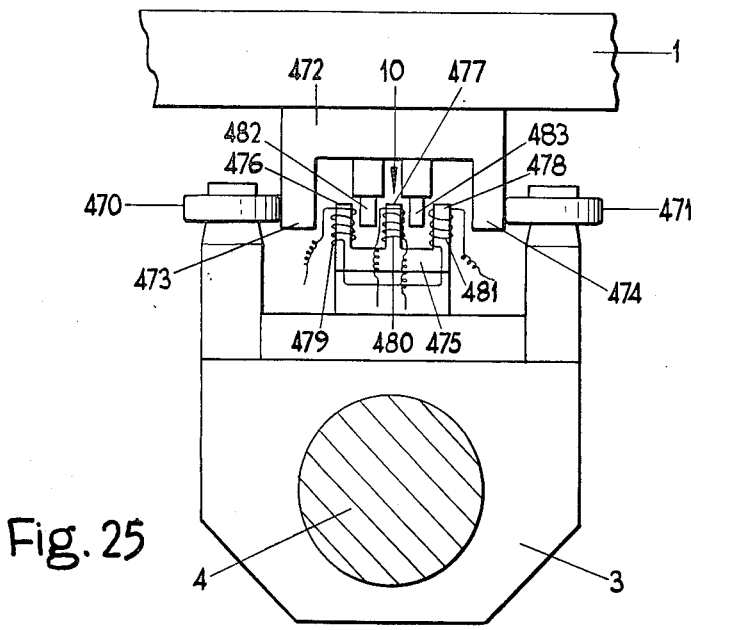
Figure 26:
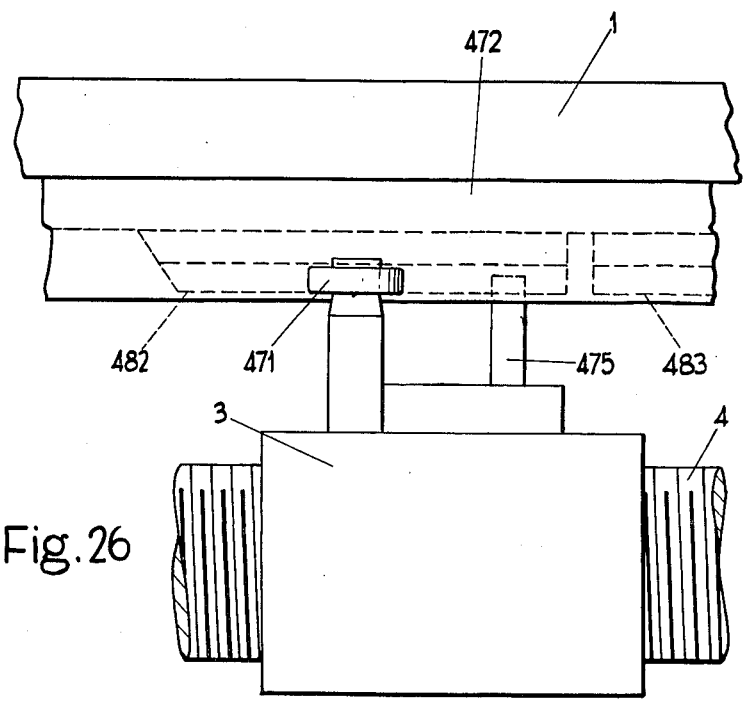

FIGURE 11A to 11C, when arranged in the manner of FIGURE 11D, show the comparison circuit of FIGURE 1;

FIGURE 12 shows the circuit of the digit selector of FIGURE 1;

FIGURES 13A to 13E, when arranged in the manner of FIGURE 13F, show the pilot lead screw control circuit of FIGURE 1;

FIGURE 14 shows diagrammatically a simplified representation of the pilot lead screw control circuit as arranged for normal operation of the control system;

FIGURE 15 shows a circuit associated with the sensing device 10 of FIGURE 1;

FIGURE 16 is an explanatory diagram;

FIGURES 17A to 17G, when arranged in the manner of FIGURE 17H, show the table control circuit of FIGURE 1;

FIGURE 18 shows diagrammatically a simplified representation of the table control circuit as arranged for normal operation of the system;

FIGURES 19 and 20 show circuits included in the digit selection circuit of FIGURE 1 for the purpose of modifying the output of the digitizer;

FIGURE 21 shows diagrammatically the manner in which the circuits of FIGURES 19 and 20 are arranged to form the digit selection circuit;

FIGURE 22 shows diagrammatically a simplified representation of the table control circuit when arranged for zero setting;

FIGURE 23 shows diagrammatically a simplified representation of the pilot lead screw when arranged for zero setting;

FIGURES 24A and 24B, when arranged in the manner of FIGURE 24C, show a further circuit which is utilised during zero setting; and FIGURES 25 and 26 respectively show an end elevation, partly in section, and a front elevation of the sensing device of FIGURE 1.

The boring machine with which is associated the position control system now to be described is a vertical boring machine and a workpiece to be subjected to a boring operation is secured to a table which is arranged for movement in two horizontal directions which are at right angles to one another, the position of the boring head being fixed relative to the bed of the machine. For the purpose of positioning the table in these two directions, there are, in fact, two separate position control systems provided and as these two systems are essentially the same, only one will be considered in detail.

*General description of system*

Referring to FIGURE 1 of the accompanying drawings, in the control system under consideration, the table 1 is arranged to be driven by way of a lead-screw 2 so that it takes up a predetermined position relative to a nut 3 carried on a pilot lead-screw 4 which lies parallel to the lead-screw 2. The lead-screw 2 is connected to an alternating current electric motor 5 by way of a gear box 6 and a clutch 7 for the purpose of fast positioning of the table 1 and to a direct current electric motor 8 by way of a clutch 9 and the gear box 6 for slow positioning. The motor 5 enables the table 1 to traverse at a speed of 90 inches/minute while the motor 8 can be operated so as to traverse the table at either 1.2 inches/minute or 0.06 inch/minute, the latter speed being used for final positioning.

The nut 3 is provided with an electromagnetic sensing device 10 which is arranged to supply a signal to the table control circuit 11 when the table 1 is not correctly positioned relative to the nut 3. Electric signals supplied by the table control circuit 11 determine the direction and speed at which the table 1 is to be moved by operation of the motors 5 and 8 and the clutches 7 and 9. The table control circuit 11 also causes a hydraulic clamp 12 to be operated by way of a clamp actuator 13 when the table 1 is correctly positioned relative to the nut 3.

The control system is also arranged to position the nut 3 along the pilot lead-screw 4 in dependence upon input data fed to the system and the arrangement described in the last paragraph thus causes the table 1 to be moved relative to the machine bed in a direction parallel to the longitudinal axis of the lead-screw 2 so as to take up (within the accuracy of the system) a unique position determined by said input data. This input data is in the form of a six digit decimal number which is numerically equal to the distance in inches of the table 1 from some arbitrary position, the decimal point occurring after the second digit.

The input data is supplied to the system as a punched card which has a plurality of rows each having ten positions at which a hole could be punched. Six of these rows carry information of the six digits respectively of the said number and for this purpose one of said ten positions only is punched in each of these rows to characterise the appropriate digit.

The lead-screw 4 is connected to apparatus 14 (sometimes known as a "digitizer" by which name it is referred to herein) which is arranged to supply electric signals which characterise the position of the nut 3 along the lead-screw 4. These electric signals provide, in fact, a parallel representation of a six digit decimal number which is equal to the distance in inches of the nut 3 from some arbitrary position, the decimal point occurring after the second digit.

The nut 3 is correctly positioned when the six digit number represented by the signals supplied by the digitizer 14 is identical with that of the input data and the arrangement is such that the lead-screw 4 is driven by a direct current electric motor 15 via a two-speed gear box 16 until this condition is reached.

The method of positioning the nut 3 when the number represented by the signals supplied by the digitizer 14 is not equal to that of the input data is briefly that the two numbers are compared digit by digit, commencing with the most significant digit, then the next most significant digit and so on, and the result of each such comparison is utilised to drive the lead-screw 4 until the two digits are the same. For this purpose a comparison circuit 17 is arranged to compare the information carried by electric signals supplied by the device 14 and by a card reader 18 to which is presented the punched card carrying the input data; the output of the comparison circuit 17 is utilised by way of a pilot lead screw control circuit 19 to control operation of the motor 15 and to select one or other of the gear ratios (which are subsequently referred to herein as "high gear" and "low gear") of the gear box 16.

Under control of the circuit 19, the motor 15 can be driven at either one of two speeds (subsequently referred to herein as "high speed" and "low speed") in either the forward or reverse direction. The speed at which the nut 3 is positioned during each digit comparison and the speed of the motor 15 and the gear ratio of the gear box 16 under each of these conditions is set out below:

| Digit | Speed of Nut 3 | Speed of Motor 15 | Gear Box 16 |
|---|---|---|---|
| First | 90 inches/minute | High | High gear. |
| Second | 90 inches/minute | High | High gear. |
| Third | 90 inches/minute | High | High gear. |
| Fourth | 6 inches/minute | Low | Do. |
| Fifth | 0.4 inch/minute | High | Low gear. |
| Sixth | 0.027 inch/minute | Low | Do. |

At each speed change the drive is stopped by electromagnetic braking and, before proceeding further, the digits already set are re-checked and the position of the nut 3 corrected (at the lower speed) if necessary. In order to prevent backlash between the nut 3 and the lead-screw 4, there is provision for axially loading the nut 3 so as to take up any backlash although this is only brought into operation for the last two of the six digits.

A digit selector 20 is arranged to supply an electric signal both to a digit selection circuit 21 which thus passes to the comparison circuit 17 the electric signals supplied by the digitizer 14 in respect of a single digit of the numerical representation of the position of the nut 3 and to the card reader 18 which is thereby arranged to supply to the circuit 17 an electric signal representing the selected digit of the input data. When the comparison circuit 17 determines that two digits being compared thereby are the same, it supplies a signal to stop the digit selector 20 and cause the next digit to be selected.

It is to be understood that FIGURE 1 is only a simplified diagrammatic representation of the system for the purpose of describing the general method of operation and it does not therefore show all the essential connections between the various items which will now be considered in more detail.

*Digitizer 14*

For the purpose of characterising the position of the nut 3 as aforesaid, the digitizer 14 is required to supply information as to the number of complete revolutions of the lead-screw 4 necessary to bring the nut 3 from some arbitrary (and possibly imaginary) position, which is so chosen that the number of revolutions are always of the same sense, and also the angular position of the lead-screw 4. Since the lead-screw 4 has ten threads per inch, the number of complete revolutions of the lead-screw gives the three most significant digits of the said six digit decimal number, these digits representing the position of the nut in tens, units and tenths (measured in inches).

Six separate stages are provided in the digitizer 14 to give binary-coded repreesntations of the six digits respectively of the six digit decimal number which is characteristic of the position of the nut 3. In fact, each decimal digit is represented by five binary digits and if the two possible values of each binary digit are written as "0" and "1" while the five binary digits corresponding to any decimal digit are designated $p$, $q$, $r$, $s$ and $t$, the code can be written as in Table I below.

TABLE I

| Decimal Number | Binary Representation | | | | |
|---|---|---|---|---|---|
| | p | q | r | s | t |
| 0 | 1 | 0 | 0 | 1 | 1 |
| 1 | 1 | 0 | 0 | 0 | 1 |
| 2 | 1 | 1 | 0 | 0 | 1 |
| 3 | 1 | 1 | 0 | 0 | 0 |
| 4 | 1 | 1 | 1 | 0 | 0 |
| 5 | 0 | 1 | 1 | 0 | 0 |
| 6 | 0 | 1 | 1 | 1 | 0 |
| 7 | 0 | 0 | 1 | 1 | 0 |
| 8 | 0 | 0 | 1 | 1 | 1 |
| 9 | 0 | 0 | 0 | 1 | 1 |

It will be noted that the above code is one in which the binary representation of any two successive values of the decimal number differ in only one digit. (For this purpose the number "0" and "9" can be considered as being successive as "0" follows "9" in the normal decimal system of numbering.)

The binary coding is effected in each stage of the digitizer by the use of a wheel which is individual to that stage and which is caused to rotate with the pilot lead-screw 4. Each wheel, which may be of mild steel, has $10^n$ inch radial slots (where $n$ is an integer which may be zero) in each major face of the wheel, the slots in each face being regularly spaced and extending to the circumference of the wheel. The angle subtended at the axis of revolution of the wheel by each slot is equal to the corresponding angle subtended by the tooth which is left between each adjacent pair of slots in one face of the wheel and twice this angle is subsequently referred to as the "pitch angle." The slots in the two faces are staggered by half the pitch angle.

Although the angles subtended by a tooth and by a slot are equal in the construction under consideration, this is not essential. If they are unequal, the "pitch angle" is equal to the sum of the two individual angles.

Figure 2:
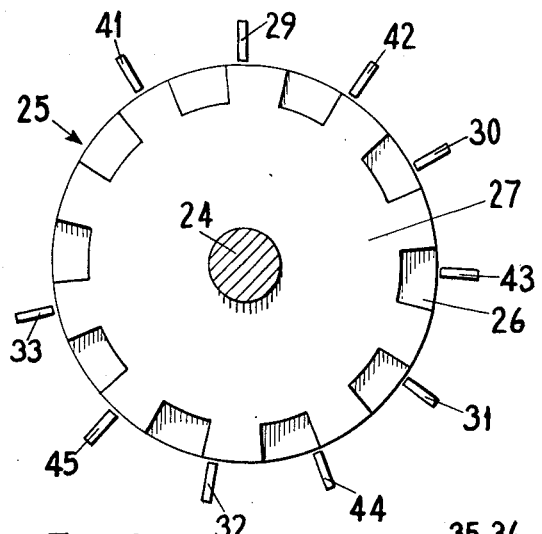
FIGURES 2 and 3 show front and side elevations respectively of part of the digitizer of FIGURE 1.
Figure 3:
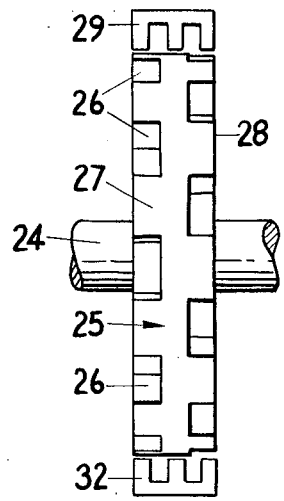

Referring now to FIGURES 2 and 3, the wheel 25 constitutes the said wheel of the digitizer stage associated with the second least significant decimal digit, the wheel 25 being carried on a shaft 24 which is coupled to the pilot lead-screw by way of gearing having a gear ratio of unity. It will be seen that there are ten slots 26 in each fact 27 or 28 of the wheel 25. Around the circumference of the wheel 25 there are provided five electromagnetic sensing devices 29, 30, 31, 32 and 33 which are fixed and arranged each to provide an electric signal which is dependent upon whether the portion of the circumference of the wheel 25 under the sensing device has a slot 26 in either the face 27 or in the face 28, it being appreciated that for all positions of the wheel, the portion thereof under the sensing device has a slot in one or other of the faces 27 and 28.

Figure 4:
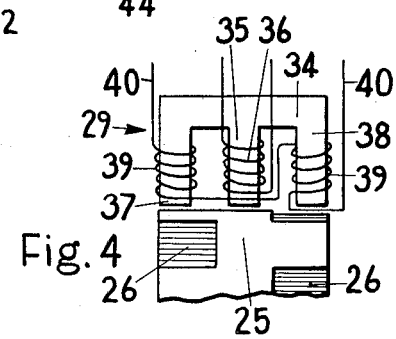
FIGURE 4 shows a fragment of FIGURE 3 in more detail.

The construction of the sensing device 29, for example, is shown diagrammatically in FIGURE 4 and comprises an E-shaped ferromagnetic core 34, which may be of ferrite material, the centre arm 35 of the core 34 carrying an input coil 36 while the outer arms 37 and 38 carry two output coils 39 which are connected in series opposition. The coil 36 and the coils 39 and 40 act as primary and secondary windings respectively of a transformer, the magnetic paths linking these coils passing through that portion of the wheel adjacent to the core 34 so that, depending upon the position of the wheel 25, there is usually unequal coupling between the coil 36 and the coils 39. During operation, the input coil 36 is supplied with oscillations of frequency 15 kilocycles per second and oscillations of that frequency are therefore passed to the output leads 40 with a phase depending upon whether the portion of the circumference of the wheel under the device 29 contains a slot 26 in the face 27 or in the face 28. Under one of these two conditions the output oscillations are in phase with the input oscillations while in the other condition, the output oscillations are in antiphase with the input oscillations, the change-over from either condition to the other as the wheel 25 is rotated being rapid.

The five sensing devices 29 to 33 are spaced apart round the wheel 25 so that the angle between each adjacent pair of devices is equal to an integral multiple of the pitch angle minus one fifth of the pitch angle. The positions of the devices 29 to 33 relative to the wheel 25 are shown diagrammatically in FIGURE 5A in which the line 34 represents a development of the profile of the wheel 25. It will be appreciated that if the phase of the output oscillations supplied by the sensing devices 29 and 30 are designated by the symbols "1" and "0" respectively, then the output oscillations of the devices 31, 32 and 33 correspond to "0" "1" and "1" respectively. If, now, the situation is considered when the wheel 25 has been rotated through one tenth of a pitch so as to take up the position shown diagrammatically in FIGURE 5B, the output oscillations supplied by the devices 29 to 33 are "1," "0," "0," "0" and "1" respectively. Rotating the wheel 25 again through one tenth of a pitch brings the wheel to the position shown diagrammatically in FIGURE 5C and in this case the devices 29 to 33 supply oscillations corresponding to "1," "1," "0," "0" and "1" respectively.

Figure 5:
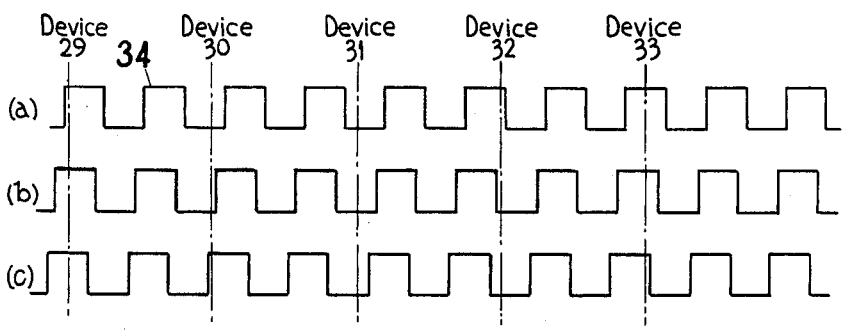
FIGURES 5 and 6 are explanatory diagrams.

From a comparison of these codes with Table I, it will be seen that the output oscillations supplied by the devices 29 to 33 carry the information of the digits $p$, $q$, $r$, $s$ and $t$ respectively at least as far as the first three lines of Table I are concerned, the position of the wheel 25 shown in FIGURE 5A giving the first line of the table while the position of FIGURE 5B gives the second line and FIGURE 5C gives the third line. The arrangement of the devices 29 to 33 is in fact such that the output oscillations supplied thereby represent the digits $p$, $q$, $r$, $s$ and $t$ of the code shown in Table I for all positions of the wheel 25. Thus these oscillations define, at any instant, the fifth digit of the said decimal number which characterises the position of the nut 3 on the pilot lead-screw 4.

Two other slotted wheels are carried by the shaft 24, one of these wheels having only one "slot," which subtends an angle of 180°, in each face, while the other wheel has one hundred slots in each face. Each of these two wheels has five sensing devices associated therewith, these devices being constructed and arranged in the manner discussed in the last three paragraphs. The output oscillations supplied by the sensing devices associated with the one "slot" and the one hundred slot wheels thus define the fourth and sixth digits respectively of the said decimal number which characterises the position of the nut 3.

In addition there are provided three further wheels each of which has exactly the same construction as the "one slot" wheel mentioned in the last paragraph. One of these three wheels is coupled to the shaft 24 by gearing having a ten-to-one gear ratio and the other two wheels are arranged in tandem each being coupled to the preceding wheel via gearing having a gear ratio of ten-to-one. As previously, each of these wheels has a group of five associated sensing devices and the output oscillations supplied by the three groups of sensing devices represent the three most significant digits of the said decimal number which characterises the position of the nut 3.

The said "one slot" wheels are of somewhat smaller diameter than the other wheels, the one hundred slot wheel being the largest. In order to reduce the total space taken up by the wheels and their associated sensing devices, the three shafts carrying the said three further wheels respectively are disposed symmetrically around the longitudinal axis of the shaft 24 so that these shafts are parallel to the shaft 24 and the three wheels carried thereby lie side by side.

The digitizer as so far described is capable of giving a false binary representation of the position of the nut 3. The reason for this is that although, as previously noted, the code set out in Table I is such that only one binary digit changes at a time, this is only true for each decimal digit and does not apply when two or more decimal digits are required to change simultaneously since there is then essentially a change in the binary representatiion of each of these decimal digits. For example, if the two stages of the digitizer are supplying oscillations which represent the number "19" and the nut 3 is then moved, by rotation of the lead-screw 4, to a position corresponding to the number "20," it is necessary for the binary representation supplied by each of these two stages to change. However, the tolerances in the manufacture of the said wheels of the two stages, and the positioning of the sensing devices may be such that the stage providing the binary representation of the less significant decimal digit changes from giving representation of "9" to giving a representation of "0" shortly before there is any change in the representation supplied by the other stage. In other words, continuous movement of the nut 3 would result in the two stages of the digitizer under consideration providing electric oscillations which characterise the decimal numbers "19," "10" and "20" in turn.

In order to prevent the digitizer 14 operating in the manner discussed in the last paragraph, each stage of the digitizer (other than the one associated with the least significant decimal digit) is controlled by the output of the stage associated with the next decimal digit of lower significance. From Table I it will be noted that, when changing from "9" to "0," only the $p$ digit of the binary representation changes and accordingly the output oscillations of each digitizer stage (other than that associated with the most significant decimal digit) corresponding to the $p$ digit are utilised to control the stage associated with the next most significant decimal digit.

Considering now the digitizer stage associated with the second least significant decimal digit and referring again to FIGURE 2, there are provided another group of sensing devices 41 to 45. This group of devices 41 to 45 is arranged in exactly the same manner as the group of devices 29 to 33 hereinbefore described so as to supply five electric oscillations the phases of which define the angular position of the shaft 24, the corresponding devices (for example the devices 29 and 41 both of which supply oscillations in respect of the binary digit $p$) being spaced apart by an angle equal to nine-tenths of the pitch angle.

Figure 6:
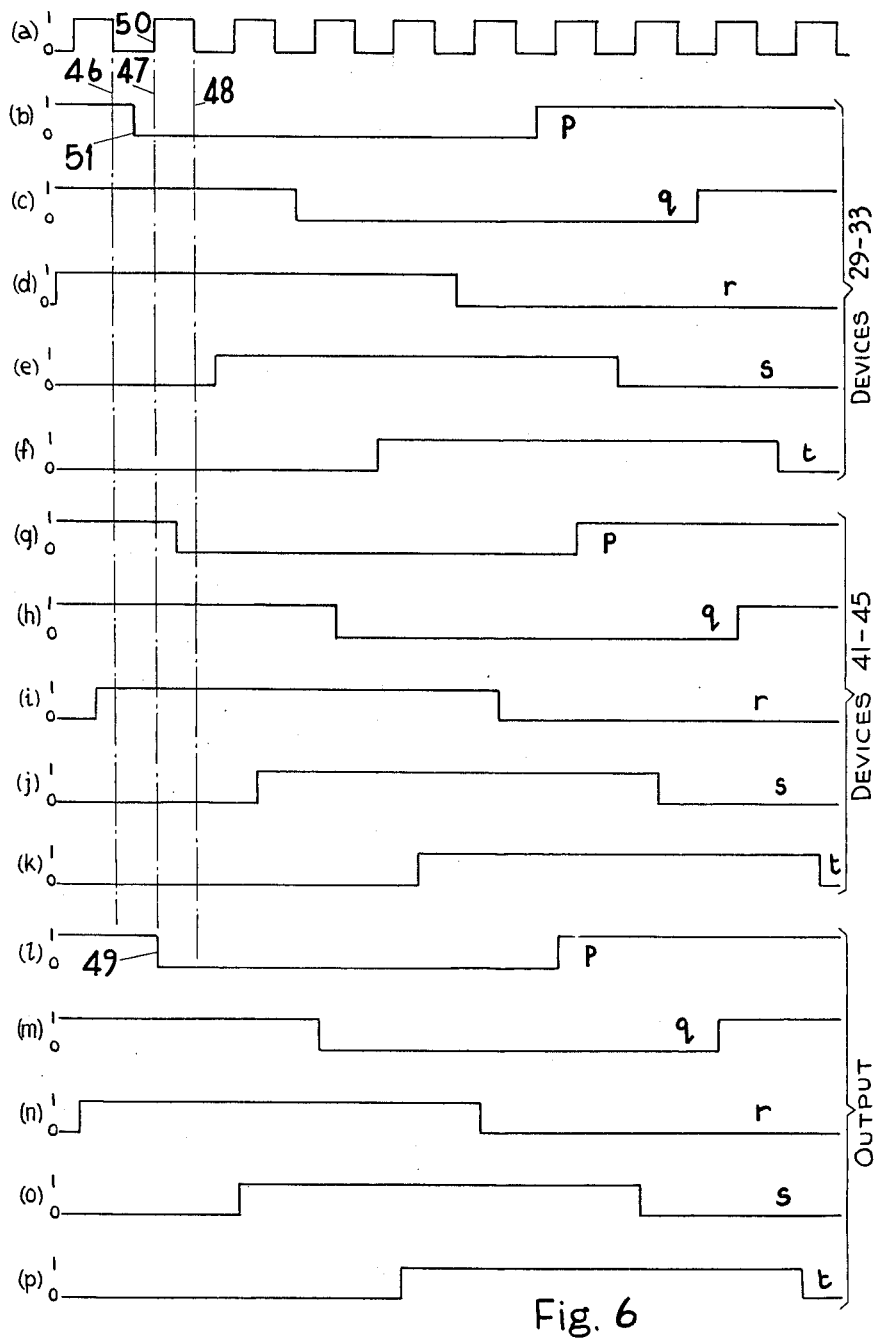

The two groups of sensing devices 29 to 33 and 41 to 45 are disposed so as to provide the binary coding shown diagrammatically in FIGURE 6. The curve of FIGURE 6A represents the $p$ digit of the binary representation of the least significant decimal digit while the curves ($b$) to ($f$) and ($g$) to ($k$) represent the binary digits of the coding effected by the wheel 25 and the groups of sensing devices 29 to 33 and 41 to 45 respectively, all the curves in this figure being drawn so that the lower level corresponds to "0" and the upper level corresponds to "1." The arrangement is such that these codings are combined to give the resultant coding of the digitizer stage under consideration by selecting the coding of the group of devices 29 to 33 when the $p$ digit, represented in FIGURE 6A, has the value "1" and the coding of the other group when this digit has the value "0," curves ($l$) to ($p$) in this figure showing the resultant coding.

Considering now the derivation of the $p$ digit shown in FIGURE 6L, it will be realised from the above that at positions between the broken lines 46 and 47 the representation of this digit is supplied by the sensing device 41. At the position represented by the line 47, there is a change-over and the representation of this digit is then supplied by the sensing device 29, this condition prevailing for all positions between the lines 47 and 48. In other words, the step 49 in the curve of FIGURE 6L coincides with the step 50 in the curve of FIGURE 6A with the result therefore that the position of the step 51 in the curve of FIGURE 6B, for example, is not critical and can occur any where between the lines 46 and 47 without affecting the overall accuracy of coding.

Figure 7:
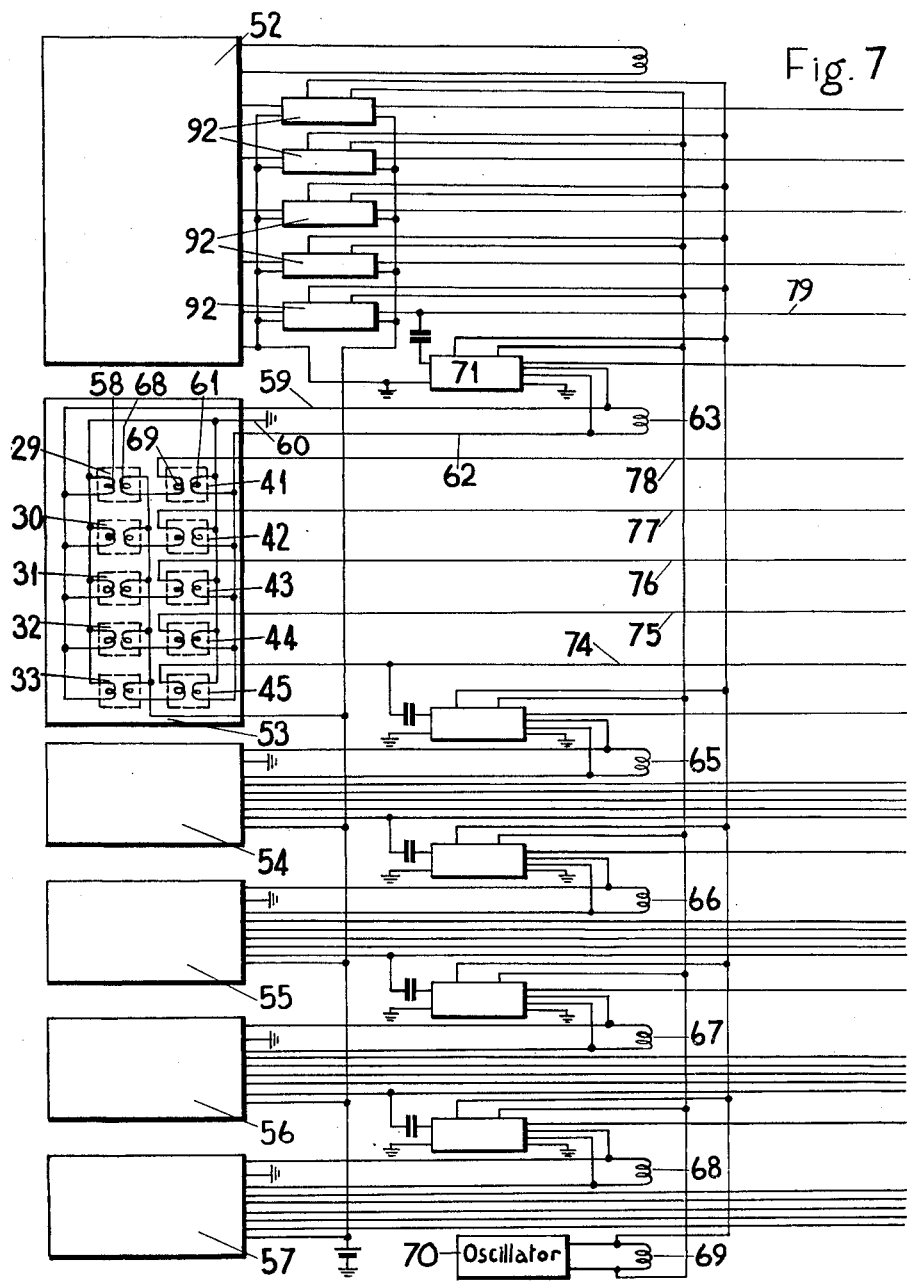
FIGURE 7 shows diagrammatically the electric circuit of the complete digitizer.

Referring now to FIGURE 7, which shows diagrammatically the electric circuit of the digitizer, the said six stages of the digitizer are shown by the rectangles 52 to 57 respectively. The particular stage discussed, by way of example, in the immediately preceding paragraphs, is that shown by the rectangle 53 and it will be seen that the primary windings, such as the winding 58 which corresponds to the coil 36 in FIGURE 4, of all the sensing devices 29 to 33 are connected in parallel across the leads 59 and 60 while the primary windings, such as the winding 61, of all the sensing devices 41 to 45 are connected in parallel across the leads 60 and 62. The leads 59 and 62 are connected to a secondary winding 63 of a transformer which has further secondary windings 64 to 68 which are associated with the other stages of the digitizer and a primary winding 69 which is connected to an oscillator 70 having a frequency of 15 kilocycles per second.

A device 71 is connected to the leads 59, 60 and 62 and is arranged selectively to short circuit either the leads 59 and 60 or the leads 60 and 62. In this manner the primary windings of only one of the two groups of sensing devices 29 to 33 and 41 to 45 are energised from the oscillator 70 at any time. The secondary windings, such as the windings 72 and 73, each of which corresponds to the coils 39 in FIGURE 4, of the two sensing devices associated with each binary digit are connected in series and the device 71 is caused to be operated to selecct one or other of the two groups of sensing devices in the manner previously described with reference to FIGURE 6 with the result that oscillations representing the digits $p$, $q$, $r$, $s$ and $t$ corresponding to the appropriate decimal digit are supplied by the stage 53 to the leads 74 to 78 respectively.

Figure 8:
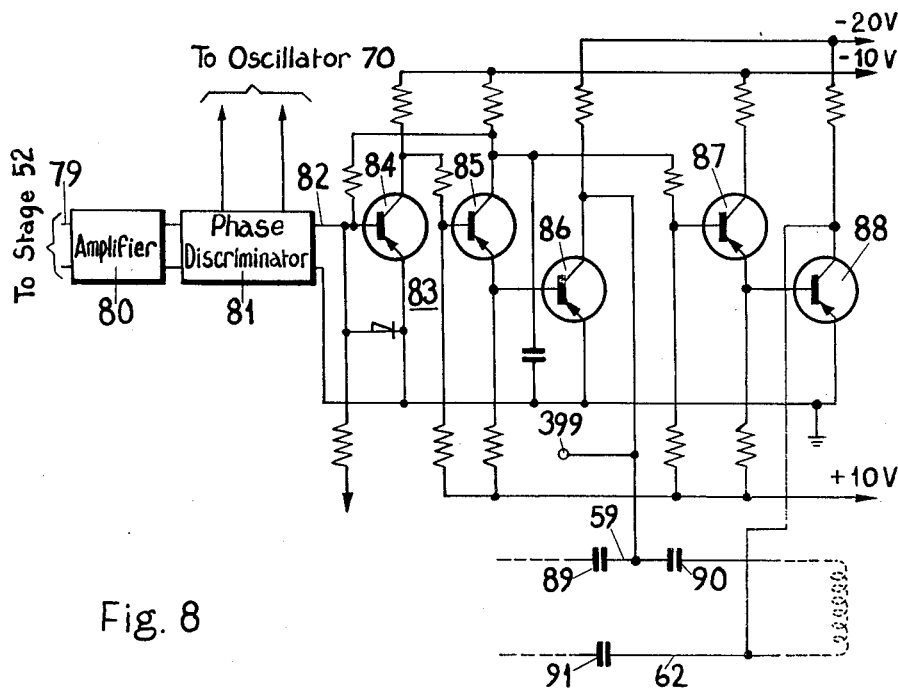
FIGURES 8 and 9 show parts of the electric circuit of FIGURE 7 in more detail.

The device 71 is controlled by the phase of the oscillations on the lead 79, these oscillations representing the digit $p$ of the least significant decimal digit which is coded by the stage 52. Referring now to FIGURE 8, the device 71 comprises an amplifier 80 which is arranged to pass the oscillations on the lead 79 to a phase discriminator 81 where the phase of those oscillations is compared with that of oscillations supplied by the oscillator 70. The output voltage supplied by the discriminator 81 to a lead 82 has either a positive or negative value depending upon the phase of the oscillations on the lead 79 and this voltage is utilised to control a bistable circuit 83 which is formed by two transistors 84 and 85. When the voltage on the lead 82 has its negative value, the transistor 84 is conducting and the transistor 85 is cut-off while when the voltage on the lead 82 has its positive value, the conditions of the transistors 84 and 85 are reversed.

The voltage developed at the emitter electrode of the transistor 85 is applied to the base electrode of a transistor 86 which is arranged to act as a switch. When the transistor 85 is conducting, the bias thus applied to the base electrode of the transistor 86 causes that transistor to be conducting with the result that there is a low impedance path between the emitter and collector electrodes of the transistor 86, these electrodes being connected to earth and to the lead 59 respectively. The collector electrode voltage of the transistor 85 is passed through a transistor 87 to the base electrode of a transistor 88 which is arranged as a switch in similar manner to the transistor 86. In this case the collector electrode of the transistor 88 is connected to the lead 62 so that when the bistable circuit 83 is operated so that the transistor 85 thereof is cut off, the transistor 88 provides a low impedance between the lead 62 and earth.

D.C. blocking capacitors 89, 90 and 91 are provided in the leads 59 and 62 so as to prevent undesirable coupling between the transistors 86 and 88 but in order to simplify the drawing, these capacitors are not shown in FIGURE 7.

The stages 54 to 57 of the digitizer are arranged in exactly the same manner as the stage 53 to prevent a false binary representation being provided by any one of those stages.

It will be appreciated that each of the stages 53 to 57 is, in effect, controlled by the output of the stage 52. In practice there are occasions when the binary representation provided by the stage 52 only changes relatively slowly and so as to prevent there being any possibility of uncertainty as to the binary representation provided by the stage 52, there are provided five devices 92.

Figure 9:
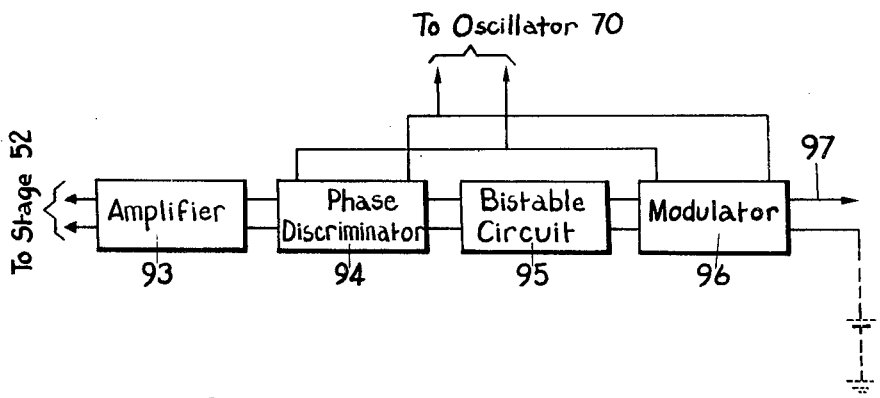

Referring now to FIGURE 9, each of the devices 92 comprises an amplifier 93 and a phase discriminator 94 which is arranged to compare the phase of the oscillations supplied by the amplifier 93 with oscillations supplied by the oscillator 70. Under normal conditions the output of the phase discriminator will have one of two values depending upon the value of the appropriate binary digit but as stated above, there may be some uncertainty under some conditions as to the value of the digit represented by the output voltage of the phase discriminator. To resolve this ambiguity, the output voltage of the phase discriminator 94 is utilised to control a bistable circuit 95 which is arranged to take up one of its stable conditions for each of the two normal values of the voltage supplied by the discriminator. The output of the bistable circuit 95 is passed to a modulator 96 where it is used to modulate the oscillations supplied by the oscillator 70. The oscillations supplied by the modulator 96 to the lead 97 are then arranged either to be in phase or in anti-phase with the oscillations supplied by the oscillator 70 in dependence upon the value of the binary digit to be represented thereby without the ambiguity previously mentioned.

*Digit selection circuit 21*

Figure 10:
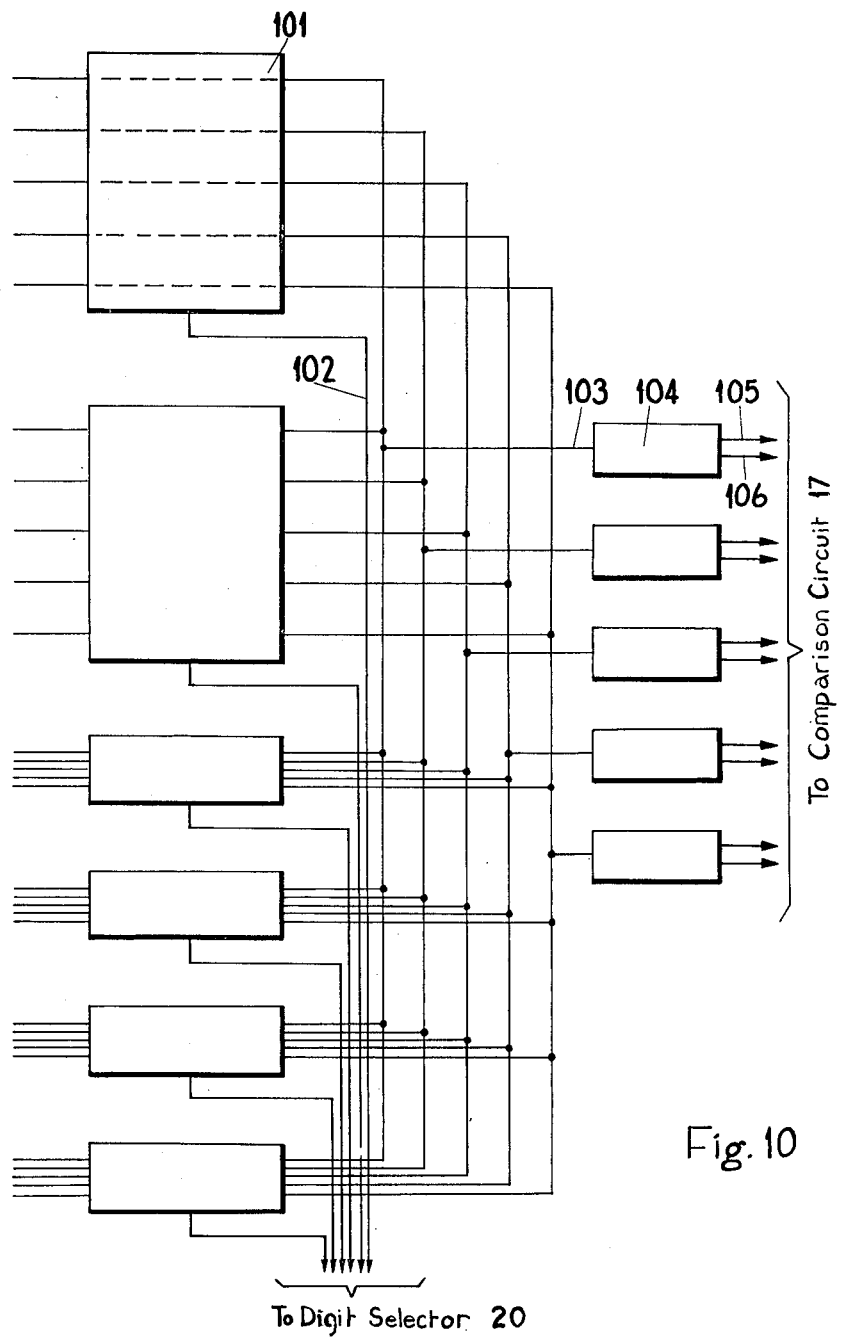
FIGURE 10 shows diagrammatically a simplified form of the digit selection circuit of FIGURE 1.

In order to understand the operation of the circuit 21 when the nut 3 is merely being positioned in dependence upon input data fed to the system, it is convenient now to consider the simplified circuit shown in FIGURE 10 although, as will subsequently be apparent, some complication is introduced to enable a special facility to be provided. The circuit 21 has fed to it the oscillations supplied by the digitizer stages 52 to 57 and accordingly FIGURE 10 is drawn so that the left hand side thereof matches up with the right hand side of FIGURE 7. (One of the leads associated with each of the digitizer stages, for example the lead 100, in FIGURE 7 does not appear in FIGURE 10 since these leads perform no function as far as the simplified digit selection circuit is concerned.)

Referring now to FIGURES 7 and 10, the oscillations supplied by the six digitizer stages 52 to 57 are passed to six gating devices 101 and each of these devices has an associated lead 102 to which a gating signal is applied by the digit selector 20 when the appropriate digit is selected. Thus when any digit is selected, the five oscillations supplied by the particular one of the digitizer stages 52 to 57 corresponding to that digit are passed to output leads 103 which are common to all the devices 101.

The oscillations on the five output leads 103 are supplied to five devices 104 respectively and each of these devices 104 applies to its associated pair of output leads 105 and 106 steady voltages which have values dependent upon the phase of the oscillations on the associated lead 103. If the oscillations on any particular one of the leads 103 are phased to respresent the binary digit "0," the associated lead 105 is at earth potential while the associated lead 106 has a potential of −10 volts; when the oscillations on the lead 103 are phased to represent the binary digit "1," the potentials on the leads 105 and 106 are interchanged.

Each of the devices 104 may comprise an amplifier, a phase discriminator and a bistable circuit connected in cascade in similar manner to the corresponding items of the device shown in FIGURE 9.

*Card reader 18*

As previously noted, a punched card which carries input data to be read off by the card reader 18 has a plurality of rows of ten positions at which a hole may be punched. Six of these rows have one position punched in each row to provide the input data for the system under consideration although a further six rows may similarly be punched to provide the input data for the other position control system associated with the other axis of the machine. Said ten positions in each row correspond to values nought to nine and like positions in the six rows constitute a column of positions all of which correspond to the same numerical value.

As far as the system under consideration is concerned, the card reader 18 has first and second contacts associated with each of the sixty positions at which a card presented thereto may have holes punched for the purpose of carrying input data to the system. The first contacts in each row are all connected to an associated input terminal of the card reader which thus has six input terminals connected in this manner. The second contacts in each column are all connected to an associated output terminal of the card reader.

It will be appreciated that the six input terminals of the card reader are associated with the six decimal digits respectively of the number punched on to a card presented to the card reader and during operation of the system, as will be apparent hereinafter, a negative voltage is applied to the input terminal of the digit to be read out at any time and this negative voltage is therefore passed to a particular one of the ten output terminals of the card reader, the particular one depending upon the value of the digit concerned.

*Comparison circuit 17*

As previously described, the comparison circuit 17 is arranged to determine when the decimal digit (subsequently referred to as "d") represented by the voltages supplied by the digit selection circuit 21 is the same as the decimal digit (subsequently referred to as "c" (read off by the card reader 18.

It will be noted from Table I that the binary code is such that for any particular decimal number, it is possible to determine whether or not the binary representation is greater than that decimal number by the values of only two of the binary digits. For example, if the decimal number being considered is "2," the binary representation is greater than "2" if either (or both) of the binary digits $p$ and $t$ is "0." Similarly inspection of two binary digits shows whether the binary representation is less than the decimal number and, in the case of the decimal number "2," this condition is satisfied if the digits $p$ and $q$ are "1" and "0" respectively.

The comparison circuit 17 operates by making use of the characteristics of the binary code referred to in the last paragraph and is adapted to determine that "d" is equal to "c" by detecting the condition $c-1<d<c+1$.

Referring now to FIGURES 11A and 11B, a plurality of gates, such as the gates 116 and 117 are arranged to respond to the voltages on the ten leads 105 and 106 (FIGURE 10). These leads are all shown in the present figure but, to enable the individual leads to be identified, each lead has the appropriate reference 105 or 106 with a suffix $p$, $q$, $r$, $s$ or $t$ depending upon the binary digit represented by the voltage thereon.

The gate 116, for example, is arranged to detect when there is a negative voltage on either one of the leads 106$p$ and 105$q$, that is to say when $p$ is "0" and/or $q$ is "1." The gate 116, which comprises two rectifier elements 118 and a resistor 119, causes a negative voltage to be applied to a lead 120 when this condition is detected and it follows that there is such a voltage on the lead 120 whenever the signals on the leads 105 and 106 represent a decimal number greater than "1," that is to say when $d$ is greater than "1." The gate 117, for example, is connected to the leads 105p and 105t and, in this case, a negative voltage is applied thereby to a lead 121 upon the condition being detected that there is a negative voltage (corresponding to the binary value "1") on both these leads. There is therefore such a negative voltage on the lead 121 whenever the signals on the leads 105 and 106 represent a decimal number less than "3," that is to say when "$d$" is less than "3."

It will be noted that there are no gates, such as the gates 116 and 117, to determine whether the binary representation is greater than "4" or less than "5" since these conditions are indicated by the presence of negative voltages (corresponding to the binary value "1") on the leads 106p and 105p respectively.

Further gates, such as the gate 122, 123 and 124 are arranged to detect different combinations of voltages on the leads, such as the leads 120 and 121, and ten leads 110 which are connected to the ten output terminals of the card reader 18. The latter leads are referenced with the addition of a suffix $-0, -1, -2 \ldots -9$ so as to enable the individual leads corresponding to the different values of $c$ to be identified.

If now there is a negative voltage on each of the leads 120 and 121 (signifying that $d$ is greater than "1" and less than "3") and also a negative voltage in the lead 110–2 (signifying that $c$ is "2"), a negative voltage is applied by the gate 122 to a lead 125 which otherwise is at earth potential. This voltage is passed via a rectifier element 126 to an output lead 127 of the comparison circuit. In this manner a negative voltage is applied to the lead 127 whenever $c$ is equal to $d$.

In similar manner to the above, a negative voltage is applied to a lead 128 by way of a gate, such as the gate 123, when $d$ is less than $c$ and to a lead 129 by way of a gate, such as the gate 124, when $d$ is greater than $c$.

Referring now to FIGURE 11C, a transistor 130 is connected between the lead 127 and a terminal 131 so as to act as an inverter circuit. The arrangement is such that the voltage developed at the terminal 131 is approximately at earth potential when there is a negative voltage on the lead 127, that is to say whenever $c$ and $d$ are equal while the terminal 131 has a voltage of approximately $-10$ volts when there is no such voltage on the lead 127.

The pilot lead screw control circuit 19, for example, comprises a plurality of two-state circuits and it follows that the voltages applied to the leads interconnecting these circuits have one or other of two values. These two values are in fact $-10$ volts and earth potential and in the description of the system it is convenient subsequently to refer (except where specifically otherwise stated) to a signal being present when the appropriate lead is approximately at earth potential. It follows that such a signal is developed at the terminal 131 when $c$ and $d$ are equal and this signal is hereinafter referred to as the "$d=c$" signal.

The voltage on the lead 128 is also inverted by means of circuits such as the circuit comprising the three transistors 132 so that there is developed at the terminal 133 a signal which is subsequently referred to as the "$d<c$" signal, that is to say the terminal 133 is approximately at earth potential when $d$ is less than $c$ but is otherwise at approximately $-10$ volts. Similarly the voltage on the lead 129 is inverted so as to develop at the terminal 134 a signal which is subsequently referred to as the "$d>c$" signal.

The "$d<c$" and "$d>c$" signals are applied to a gating circuit 135 with the result that the terminal 136 is approximately at earth potential when $d$ is either less than or greater than $c$. The signal at the terminal 136 is therefore subsequently referred to as the "$d \neq c$" signal.

Two transistors 137 and 138 are cross-connected to form a free-running multivibrator. A further transistor 139 is connected as a switch in the emitter electrode circuit or the transistor 137 and it follows therefore that when the transistor 139 is non-conducting, the multivibrator takes up the condition with the transistor 137 non-conducting and the transistor 138 conducting. The "$d=c$" signal passed by the transistor 130 is utilised by way of the transistor 141 and the rectifier element 142 to bias the base electrode of the transistor 139. The operation of this circuit is such that when $d$ is equal to $c$ for a period not greater than 9.2 milliseconds, the transistor 137 is conducting for approximately 7 milliseconds so that there is produced a positive-going pulse in the voltage waveform at the collector electrode of that transistor. If the condition of $c$ and $d$ being equal lasts for a period greater than 9.2 milliseconds but not more than 18.4 milliseconds, there are then produced two spaced pulses in the collector voltage waveform of the transistor 137. More generally a train of pulses is developed at the collector electrode of the transistor 137 as long as the "$d=c$" signal is passed by the transistor 130 and the rectifier element 143 is non-conducting. The collector voltage of the transistor 137 is passed to a terminal 144 to provide a signal subsequently referred to as the "$d=c$ pulse" signal.

If now the terminal 145 is earthed when the transistor 139 is conducting and the multivibrator circuit formed by the transistors 137 and 138 is operating so as to provide the "$d=c$ pulse" signal, the base electrode of the transistor 139 is held at earth potential by way of the rectifier element 143 with the result that the transistor 139 is cut off and operation of the multivibrator ceases. In other words, applying a signal (that is to say earth potential) to the terminal 145 causes the "$d=c$ pulse" signal to cease.

As long as $d$ is equal to $c$, a terminal 207 is held at approximately $-10$ volts by the rectifier element 142. When, however, the condition $d$ not equal to $c$ occurs, the terminal 207 reverts to approximately earth potential as soon as the transistor 138 becomes conducting. This causes the base electrode of the transistor 139 to be cut off, and the operation of the multivibrator ceases.

*Digit selector 20*

Referring now to FIGURE 12, the digit selector 20 comprises six bistable circuits which are connected in cascade and of which only the circuits 151, 152 and 153 are shown in the drawing. These circuits are arranged so that initially the circuit 151 has one particular condition while all the other circuits have the other condition. Upon application of a pulse to an input terminal 154 of the digit selector, the circuit 152 takes up the said particular condition while the circuit 151 is switched to its other condition. The next input pulse causes the third bistable circuit (not shown) to take up the said particular condition and so on.

The circuit 151 comprises two transistors 155 and 156 which are cross-connected to form a bistable arrangement, in each stable condition one of the transistors 155 and 156 being conducting and the other being cut-off. Another transistor 157 is arranged to invert the signal developed at the collector electrode of the transistor 156. The input at the terminal 154 is connected to the base electrode of the transistor 156 by way of a rectifier element 158 and the arrangement is such that the application of an earth potential, in the form of a positive-going pulse, to the terminal 154 when the transistor 156 is conducting causes that transistor to be cut-off and the transistor 155 to be conducting.

The other circuits such as the circuits 152 and 153 of the digit selector 20, are the same as that of the circuit 151 as so far described and a coupling capacitor, such as the capacitor 159, is provided between adjacent circuits. The capacitor 159, for example, causes a positive-going pulse to be applied to the base electrode of the transistor 160 when the transistor 155 of the circuit 151 is caused to conduct upon the application of an input pulse to the terminal 154. This triggers the circuit 152 to change over to the condition in which the transistor 160 is cut-off and the other transistor 161 of the bistable arrangement is conducting.

The voltage developed at the collector electrodes of the transistors such as the transistor 157 are applied to six terminals 162 and the arrangement is such that there is −10 volts developed at only one of these terminals 162 at any time, all the other leads being at approximately earth potential. These six terminals 162 are connected to the six input terminals of the card reader 18 and also, as subsequently described, to the input terminals of the digit selection circuit 21.

Four terminals 163 are connected to the collector electrodes of the transistors, such as the transistors 167, of the last four circuits of the selector. Thus if any one of the third to sixth digits is selected, the appropriate terminal 163 is at earth potential and all the other terminals 163 are at −10 volts.

For the purpose of resetting the digit selector 20 to its initial condition in which the transistor 156 of the circuit 151 is conducting and the transistor 155 is cut-off, earth potential is applied to a terminal 164. Such a potential applied to the terminal 164 is fed to the base electrode of the transistor 155 by way of a rectifier element 165 so as to cause the circuit 151 to take up the desired condition. At the same time it is fed via the rectifier element 166 to the base electrode of each transistor, such as the transistor 161, of the other bistable circuits and, since this potential condition lasts for a longer time than a pulse applied to the terminal 154 as aforesaid, it causes the other transistor of those circuits, for example the transistor 160, to be conducting.

*Pilot lead screw control circuit 19*

Figure 13D:
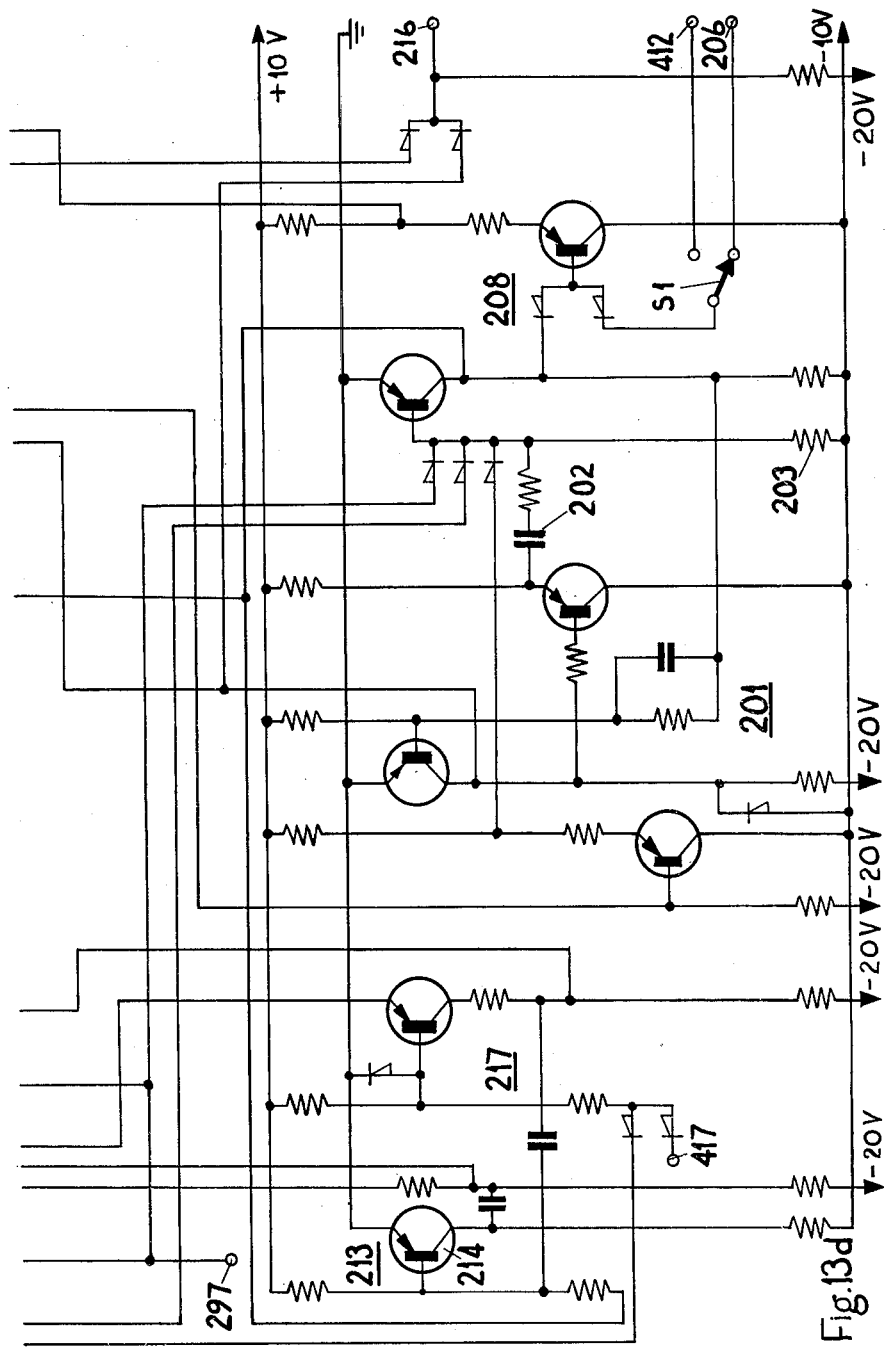
Figure 13E:
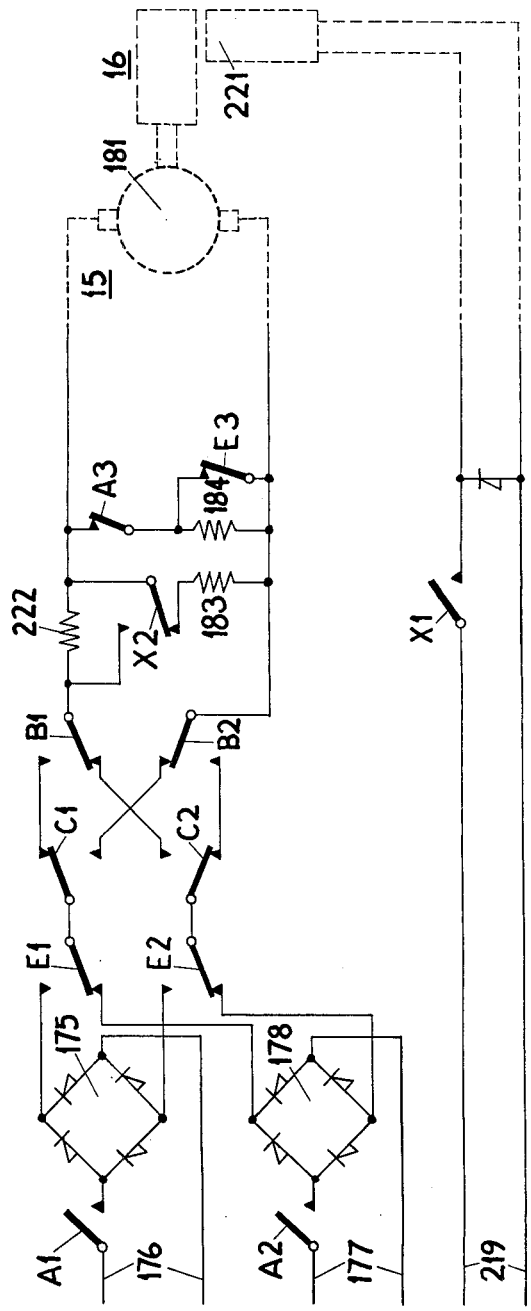

Referring now to FIGURES 13A and 13E, the speed at which the pilot lead-screw 4 is driven and the direction of rotation thereof are controlled by five electromagnetic relays A, B, C, E and X. In the drawings all these relays are shown with their contacts released. It may be mentioned briefly that the relay A, when operated, completes, by way of contacts A1, a circuit between a bridge rectifier 175 and the 220 volts alternating current supply lines 176 and, by way of contacts A2, between the bridge rectifier 178 and the 40 volt alternating current supply lines 177. The direct current output from either the bridge rectifier 175 or 178 is selected by means of relay contacts E1 and E2 and the selected output is passed through relay contacts C1, C2, B1 and B2 to the armature 181 of the motor 15 which has a separately-excited field winding (not shown). The relays B and C are so arranged that one of them is caused to be operated whenever the motor 15 is to be driven, the required direction of rotation determining which of the two relays is operated. The said contacts of these two relays are so connected as to ensure that the voltage of the direct current supply to the motor 15 is correctly sensed and the operating windings of these two relays are connected in circuit with switches S3 and S5 between terminals 179 and 180 respectively and a negative supply line 182. The signals developed at the terminals 133 and 134 (FIGURE 11) are applied to the terminals 179 and 180 respectively so that, when the switches S3 and S5 are in the positions shown, the relay B is operated when *d* is less than *c* and the relay C is operated when *d* is greater than *c*.

When normally open contacts X1 of the relay X are closed, the solenoid 221 of the gear box 16 is energised so that the gear box is in high gear. At the same time contacts X3 complete a circuit to energise the solenoid 190 of an anti-backlash device which forms the subject of copending patent application No. 8823/59. When the solenoid 190 is energised the nut 3 may move freely along the lead-screw 4 with some backlash but is restrained to prevent backlash when the solenoid 190 is de-energised.

The relay contact A3 serves to connect a circuit consisting of the resistor 184 and the relay contact E3 across the armature 181 of the motor 15, in order to provide dynamic braking of the motor when it is not being driven, the degree of braking depending on the state of the relay E.

The circuitry associated with the control of the relays A, E and X is shown in FIGURES 13A and 13D. With the mode of operation of the system at present being considered, the terminal 185 is maintained at a potential of −10 volts and the terminal 186 is maintained at earth potential. Furthermore the switches S1 to S5 are in the positions shown. This circuitry can therefore be represented, as far as the mode of operation under consideration is concerned, in the diagrammatic form shown in FIGURE 14. In the latter figure the symbols used to represent gates and devices having two states follow, as far as possible, the recommendations of Supplement No. 5 (1957) to British Standard 530:1948. The general layout of the various items in FIGURE 14 is the same as in FIGURE 13 and the same reference numerals are used throughout.

Referring now particularly to FIGURE 14, three bistable circuits 187, 188 and 189 are associated with the relays A, E and X respectively, each of these relays being operated when the appropriate bistable circuit is triggered to one of its two conditions. The signals developed at the terminals 163 of the digit selector 20 when the third, fourth, fifth and sixth digits are selected are applied to the terminals 191 to 194 respectively and these signals are passed to four gates 195 to 198. When any one of the gates 195 to 198 detects coincidence of the several signals supplied thereto, a signal is passed through the gate 199 to a monostable circuit 201. Such a signal applied to the circuit 201 causes it to be triggered from its stable condition to its unstable condition and when in the latter condition, a signal is passed thereby to the circuit 187 so as to release the relay A if it should at that time be operated. This interrupts the supply to the motor armature 181 and applies dynamic braking. The circuit 201 returns to its original condition after a short delay, the duration of which is determined mainly by the values of a capacitor 202 and a resistor 203. The effect of this, however, is that when various conditions occur simultaneously as determined by the gates 195 to 198, the circuit 201 is triggered with the result that the motor 14 cannot be driven and is in fact braked for a sufficiently long period to ensure that it has stopped.

Furthermore, triggering the circuit 201 from its stable condition causes a signal to be applied to a terminal 216. This signal is supplied, via a gate subsequently to be described, to the terminal 164 of the selector 20 thereby resetting that circuit to the first digit. In other words the card reader 18 and the digit selection circuit 21 are both caused to select the first decimal digit.

The operation of the pilot lead-screw control circuit 19 will now be considered, it being assumed that the position of the nut 3 (FIGURE 1) is not that required by a punched card presented to the card reader 18. In order to commence a positioning sequence of the control circuit 19, a start signal is applied to terminal 204, that is to say the terminal 204 is earthed. Assuming for the moment that the voltage on the terminal 415 at this time is such that any signal applied to the terminal 204 is passed by a gate 220, this causes a bistable circuit 205 to be triggered with the result that signals are applied to the circuits 188 and 198 so as to trigger both those circuits and thereby operate the relays E and X. Simultaneously the circuit 201 is triggered with the result that the relay A cannot be operated for a short period, in order to cover the special case when a start signal is given with the motor 15 already running.

A signal is applied to a terminal 206 whenever the motor 15 is to be driven to correct an error detected by the comparison circuit 17. For this purpose the signals developed at the terminals 133 and 134 (FIGURE 11C) may be gated together to derive a signal whenever $d$ is not equal to $c$, coincidence of this signal with the signal developed at the terminal 207 being detected so as to provide the signal applied to the terminal 206.

A gate 208 is arranged to detect coincidence of a signal applied to the terminal 206 and the circuit 201 being in its normal condition. When the two signals applied to the gate 208 are present, a signal is passed to the circuit 187 so as to trigger that circuit. Either the relay B or the relay C will at this time be operated and accordingly the operating circuit of the relay A is completed via the transistor 209 and either the contacts B3 or C3. The relay A is accordingly operated.

As previously stated, the relays E and X are also operated at this time and it follows that the motor 15 is driven at high speed with the gear box 16 in high gear, This causes the nut 3 to travel along the pilot lead-screw 4 in the appropriate direction to bring $d$ equal to $c$. When this equality is detected by the comparison circuit 17, the $d=c$ pulse" signal applied to the terminal 154 of the digit selector 20 causes the selector 20 to be stepped so that the second decimal digit is selected by both the card reader 18 and the digit selection circuit 21. If the position of the nut 3 is not such that $d$ then equals $c$, the motor 15 is again driven in the appropriate direction to bring this about. The decade selector 20 is again stepped and the motor 15 is driven as before until $d$ equals $c$ in respect of the third digit.

The selection of the third digit by the decade selector 20, however, causes a signal to be applied to the terminal 191 and thus a signal is passed by the gate 195 when signals occur simultaneously on the other three input leads of that gate. Two of the input signals to the gate 195 result from the circuits 188 and 189 being triggered while the remaining input signal is obtained by means of a gate 210 which is arranged to detect the coincidence of the "$d=c$" signal applied to the terminal 211 (from the terminal 131 in FIGURE 11) and the circuit 201 not being triggered. Thus at the end of the positioning of the nut 3 in respect of the third digit, the decade selector 20 is stepped as before to select the fourth digit while there is a brief delay, as timed by the circuit 201, before the motor 15 can again be driven.

While the circuit 201 is triggered from its stable condition, the signal normally applied to the lead 212 is removed. This signal on the lead 212 is applied to an inverter 213 which is constituted by a transistor 214 (FIGURE 13D). Accordingly while the circuit 201 is triggered, a signal is applied over a lead 215 to the bistable circuit 188 which is therefore operated to its other stable condition thereby releasing the relay E and preparing a circuit for direct current supply from the bridge rectifier 178 to the motor armature 181. At the same time, a signal supplied by the circuit 201 to the terminal 216 causes the digit selector 20 to be reset to the first digit.

The sequence described above of comparing the first three digits is repeated and it will be appreciated that in general, no repositioning of the nut 3 is necessary. If, however, for any reason $d$ is not equal to $c$ in any of these three digits, the relay A is operated as before but in this case, since the armature supply of the motor 15 is derived from the supply lines 177 by way of the bridge rectifier 178, the motor 15 is driven at low speed.

When at the end of the third digit comparison a signal is applied to the terminal 211 and a signal is therefore passed by the gate 210, it will be realised that no signal is passed by the gate 195 since at this time there is no signal supplied thereto by the circuit 188. Accordingly the digit selector 20 is stepped on to the fourth digit and the motor 15 is driven at low speed so as to move the nut 3 until $d$ is equal to $c$. When this condition is reached, a signal is supplied by the gate 196 with the result that the circuit 201 is again triggered. On this occasion, removal of the signal from the lead 212 and the resulting presence of a signal on the lead 215 causes a signal to be supplied by a gate 217, this gate being arranged to supply a signal when the circuit 188 is in the condition then prevailing and a signal is supplied by the inverter 213.

The signal supplied by the gate 217 operates the bistable circuit 189 to its other condition. This has the effect of releasing the relay X and at the same time applying a signal over a lead 218 to the bistable circuit 188 so as to operate that circuit to its first mentioned condition thereby reoperating the relay E. Releasing the relay X opens the contacts X1 thereby interrupting the connection between the direct current supply lines 219 and the solenoid 221 of the gear box 16. This has the effect of changing the gear ratio of the box 16 to low gear while opening the contacts X3 causes the anti-backlash device to become operative. Operation of the changeover contacts X2 to the position shown in FIGURE 13E causes the direct current supply to the armature 181 of the motor 15 to be taken from across part of a potentiometer formed by two resistors 183 and 222. (This serves to compensate for the lower loading of the motor 15 when the gear box 16 is in low gear.) Reoperation of the relay E provides for the direct current supply to the motor 15, when the relay A is operated, again to be obtained from the supply lines 176 by way of the bridge rectifier 175.

As before, a signal is applied to the terminal 216 at this time with the result that the digit selector 20 is again reset to the first digit. The first four digits are then checked and any correction of the position of the nut 3 effected by the motor 15 being driven at high speed via the gear box 16 in low gear. These driving conditions prevail when the digit selector 20 is stepped on to the fifth digit and the motor 15 is driven until the condition $d$ equal to $c$ is detected by the gate 197. The circuit 201 is therefore triggered and the consequences of this are the same as at the end of the third digit positioning, the bistable circuit 188 being triggered so as to release the relay E. Any drive applied to the lead screw 4 during the following check through the first five digits and during the positioning of the nut 3 associated with the sixth digit is, therefore brought about with the motor 15 running at low speed and the gear box 16 being in low gear.

If, now, at the end of the sixth digit positioning the bistable circuit 187 is still in the condition that the relay A is operated, that is to say the motor 15 is still running, when the "$d=c$ pulse" signal is applied to the terminal 211, a signal is passed by the gate 198 to signify that the condition which gave rise to this "$d=c$ pulse" signal was not a steady state condition. The circuit 201 is triggered by the signal passed by the gate 198 thereby applying a signal to the terminal 216 and resetting the digit selector 20 to the first digit. All six digits are then checked and any correction of the position of the nut 3 is effected by driving the pilot lead-screw 4 with the motor 15 running at low speed and the gear box 16 in low gear. If the circuit 187 is still in the condition that the relay A is operated when this sequence is completed, the sequence is repeated until such time as no signal is passed by the circuit 187 to the gate 198.

A gate 223 is arranged to detect coincidence of a signal applied to the terminal 164 (indicating that the sixth digit is selected by the selector 20), a signal is applied to a terminal 224 (this being the "$d=c$" signal developed at the terminal 136 of the comparison circuit 17 (FIGURE 11)), and signals supplied by the circuits 187, 188 and 189, indicating that the relays A, E and X are released. (As far as the signal supplied by the circuit 187 to the gate 223 is concerned, this signal can be considered as being present when the motor 15 is not running.)

It follows therefore that if the motor 15 is not running when the "$d=c$" signal is first applied to the terminal 224 during the positioning associated with the sixth digit, a signal is passed by the gate 223. If this does not occur, a signal is passed by the gate 223 as soon as a sequence of checking the six digits is completed and the motor 15 is not running.

The signal supplied by the gate 223 is fed to an amplifier 225 which has a slow build-up time. If therefore, the signal supplied by the gate 223 is a steady signal, as of course it should be if the nut 3 is then finally positioned, a signal is in due course supplied by the amplifier 225 to a terminal 226. If, however, for any reason, the signal supplied by the gate 223 disappears, the voltage build-up in the amplifier 225 is quickly removed.

At the beginning of the sequence described above, it was assumed that the voltage on the terminal 415 is such that any signal on the terminal 204 is passed by the gate 220. In fact a signal is supplied to the terminal 415, as hereinafter described, only when the table 1 is correctly positioned relative to the nut 3 and, since the inverter 227 (formed by the transistor 228) serves to invert any such signal before being applied to the gate 220, it follows that a signal is only supplied via the gate 220 to the circuit 205 when the table 1 is not correctly positioned relative to the nut 3 at the beginning of a sequence.

If the table 1 is correctly positioned relative to the nut 3 when the start signal is applied to the terminal 204, no signal is therefore initially passed to the circuit 205 although the circuit 201 is triggered as before so as to reset the digit selector 20 to select the first decimal digit. The comparison circuit 17 then compares $d$ and $c$ of the first decimal digit and if they are equal, the selector 20 is stepped on to enable each subsequent digit to be compared in similar manner. When a decimal digit is reached that does not give $d$ equal to $c$, it will be appreciated that one or other of the relays B and C is operated and auxiliary normally open contacts (not shown) of these relays are arranged so that when either relay is operated a signal is applied to a terminal 229. This causes the circuit 205 to be triggered so as to initiate the sequence previously described. (The reason for this is that, if a start signal is fed to the terminal 204 after the table 1 has been positioned, it may obviously be unnecessary to perform the full sequence for positioning the nut 3 whereas if such a sequence were to be effected, operation of the gear box 16 might disturb the position of the nut which in turn would cause the table control circuit 11 to carry out its full sequence.)

*Sensing device 10*

Referring now to FIGURES 25 and 26, two rollers 470 and 471 are mounted on the nut 3, these rollers 470 and 471 co-operating with a steel bar 472 which is of channel cross-section and which is rigidly attached to the underside of the table 1. The rollers 470 and 471 are arranged to bear on the outside surfaces 473 and 474 of the bar 472 respectively so that when the pilot lead screw 4 is rotated one or other of the rollers 470 and 471 bears on the appropriate surface of the bar 472 to provide the necessary torque reaction to prevent the nut 3 from rotating.

The sensing device 10 comprises an E-shape ferromagnetic core 475 the arms 476, 477 and 478 of which carry coils 479, 480 and 481 respectively and this core 475 is carried by the nut 3.

Two mild steel bars 482 and 483 are carried on the underside of the bar 472 and these bars 482 and 483 are arranged to co-operate with the core 475. When the table 1 is correctly positioned relatively to the nut 3, the bars 482 and 483 are both just clear of the core 475 but when the table 1 is moved in one direction from that position the bar 482 passes into the gap between the arms 476 and 477 of the core 475 (as shown in FIGURE 26) while movement in the other direction causes the bar 483 to pass into the gap between the arms 477 and 478.

The coils 479 and 481 on the two outside arms 476 and 478 of the core 475 are connected in series opposition (as far as the magnetic flux in the central arm 477 is concerned) across a source of electric oscillation having a frequency of 15 kilocycles per second. The coils 479 and 481 thus act as the primary winding of a differential transformer while the coil 480 on the central arm 477 acts as the secondary winding, the magnetic paths linking these coils being affected by the relative position of the table 1 and the nut 3 since when they are not correctly positioned relative to one another, one or other of the two bars 482 and 483 reduces the magnetic reluctance between the arm 477 and one of the arms 476 and 478. Thus when the table 1 and the nut 3 are correctly positioned relatively to one another, coupling between the coils 479 and 481 on the one hand and the coil 480 on the other hand tend to cancel out but for all other positions this is not true, the phase of the resultant coupling having one of two values dependent upon which side of the correct position of the nut 3 relative to the table 1 it in fact lies.

The electric circuit associated with the sensing device 10 is shown in FIGURE 15. In this figure the sensing device 10 is shown diagrammatically as a transformer having a primary winding 230 and a secondary winding 231, it being appreciated that the primary winding 230 is in fact formed by the two coils 479 and 481 and that the coupling between the primary and secondary windings is variable as described in the last paragraph. The primary winding 230 is arranged to be fed from the 15 kilocycles per second source by way of a transformer 232 which has a centre-tapped secondary winding 234.

A phase-shifting circuit formed by a potentiometer 235, a resistor 236 and a capacitor 237 is arranged to add a portion of the input oscillations supplied to the winding 230 to the oscillations supplied by the winding 231. The amplitude and phase of this added portion are chosen so as to buck out the undesirable quadrature component of the oscillations supplied by the winding 231 with the result that the oscillations between the leads 239 and 240 are such that they have one phase when the sensing device 10 is to one side of its "correct" position and another value, displaced by 180° from the first mentioned value, when the sensing device is positioned to the other side of the "correct" position.

Assuming for the moment that the relay contacts AA1 are in the position shown so that the transformer 238 is not in circuit, the oscillations between the leads 239 and 240 are supplied to two rectifier elements 243 which serve to limit those oscillations and at the same time have a squaring effect on the voltage waveform. The resultant voltage is supplied to an amplifier 244 which is also arranged to have a squaring effect so that the voltage applied to the primary winding 245 of a transformer 246 has a substantially square waveform over a wide range of amplitude of oscillations supplied by the winding 231.

The transformer 246 forms part of a phase discriminator 247 which is arranged to compare the phase of the waveform developed across the winding 245 with reference oscillations having a frequency of 15 kilocycles per second applied to terminals 248. Two like output voltages are developed at points 249 and 250 and these voltages are applied to the base electrodes of the transistors 252 and 253 respectively. The emitter electrode of the transistor 253 is earthed and the bias applied to the base electrode thereof is such that when the voltage developed at the point 250 has a value that is more negative than a predetermined small positive voltage with respect to earth, the transistor 253 is conducting. The voltage developed at the collector electrode of the transistor 253 is applied to the base electrode of a transistor 254 which is arranged to act as an inverter circuit with the result that the terminal 255 is maintained at approximately −10 volts when the transistor 253 is conducting and is at earth potential when the transistor 254 is conducting. In other words a signal (as previously defined in this specification) is developed at the terminal 255 when the voltage at the terminal 250 is greater than said predetermined positive value. The transistors 252 and 256 are arranged in similar manner to the transistors 253 and 254 apart from a slightly different arrangement for biassing the base electrode of the transistor 253, this bias being selected so that a signal is developed at the output terminal 257 whenever the voltage at the point 249 is more positive than a small predetermined negative value.

The output voltage of the discriminator 247, that is to say the voltage at either the point 249 or 250, is a function of the relative displacement of the table 1 and the nut 3 as shown by the curve 258 in FIGURE 16. The arrangement is such that when the relative displacement is to the right of the line 259, a signal is developed at the terminal 255 and this signal is subsequently referred to as a "high" signal. Similarly when the relative displacement is to the right of the line 261, a signal, which is subsequently referred to as the "not low" signal, is developed at the terminal 257. When the relative displacement is between the lines 259 and 261, the sensing device 10 is said to be in a region of "true zero." The width of this region is determined by the setting of a potentiometer 262.

*Table control circuit 11*

Figure 17A:
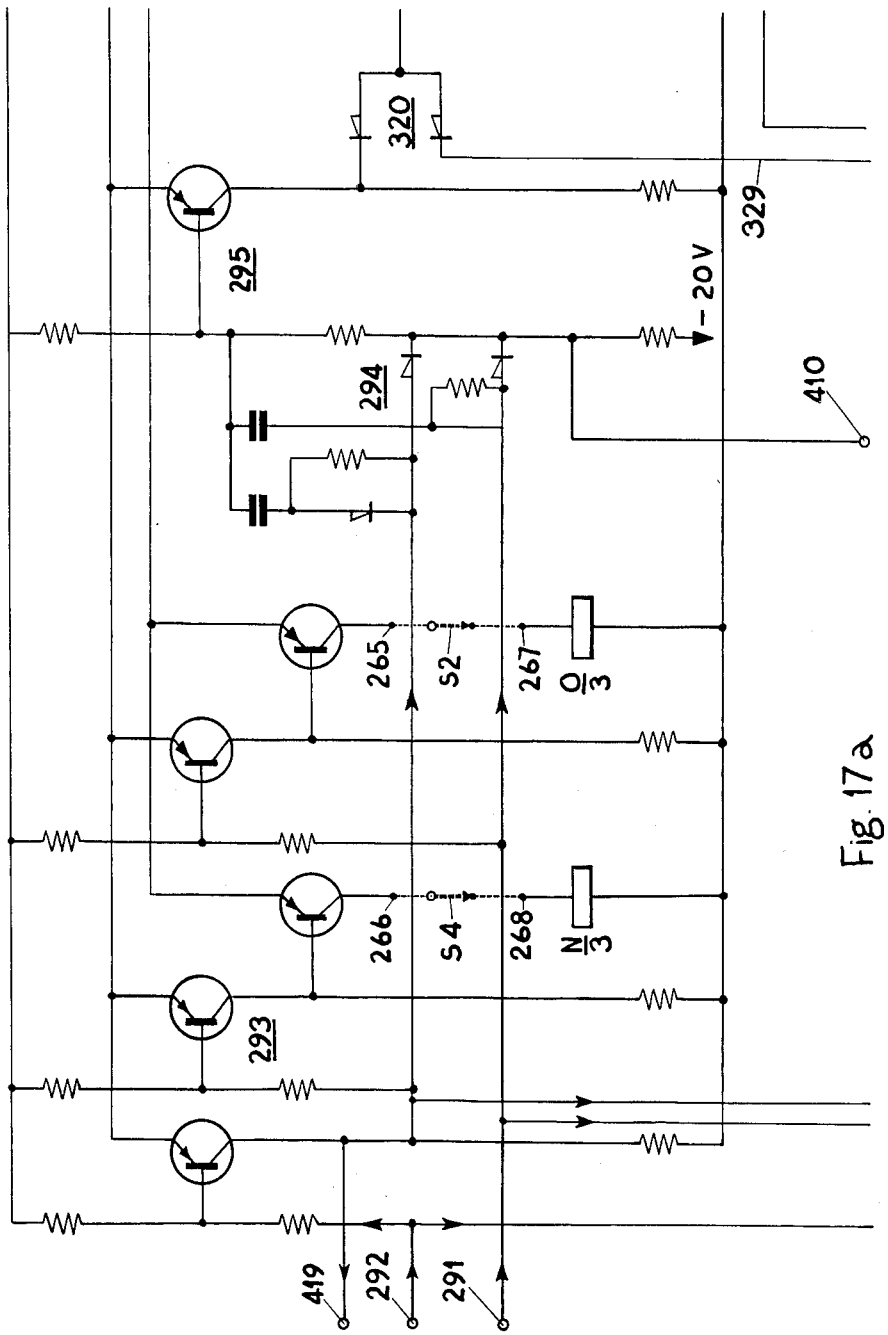
Figure 17B:
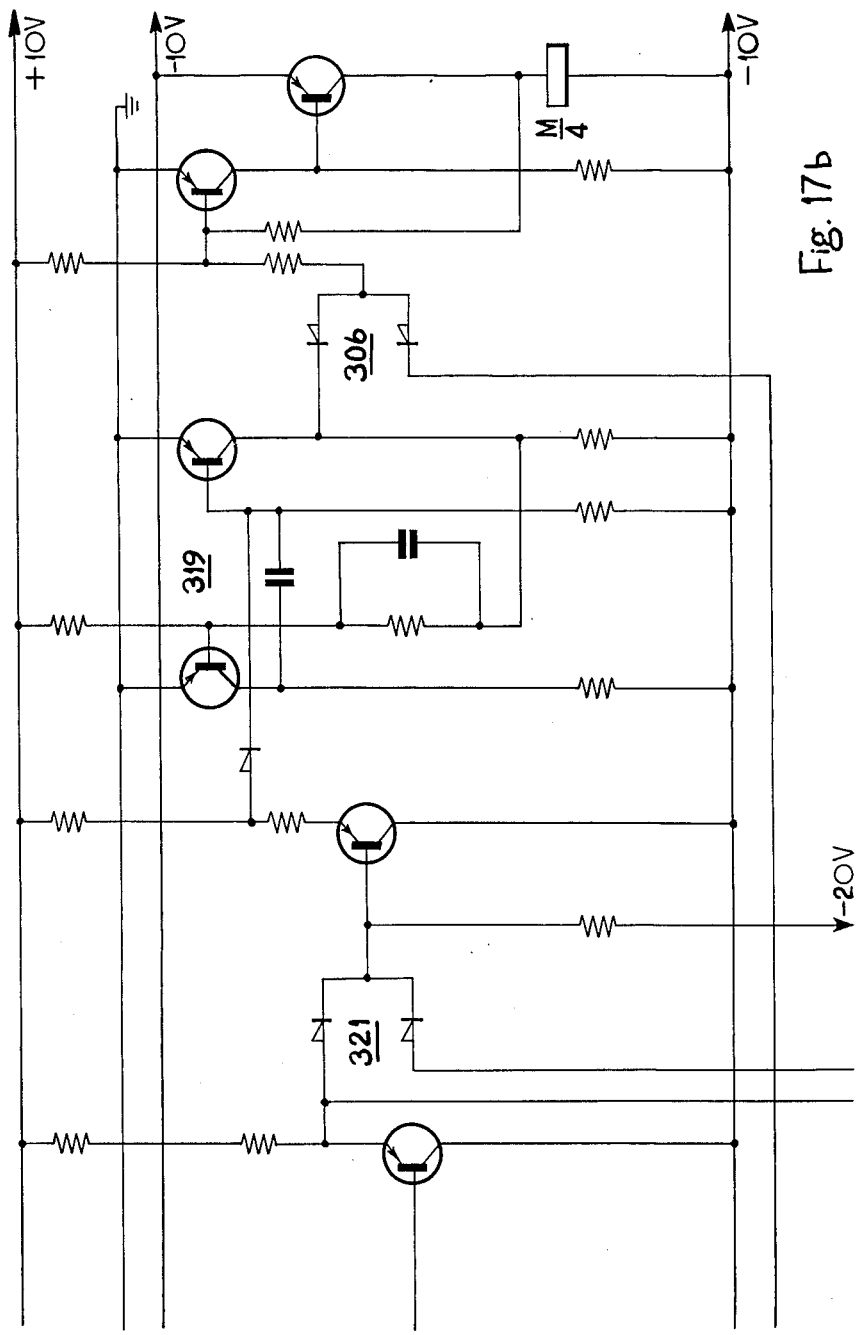
Figure 17E:
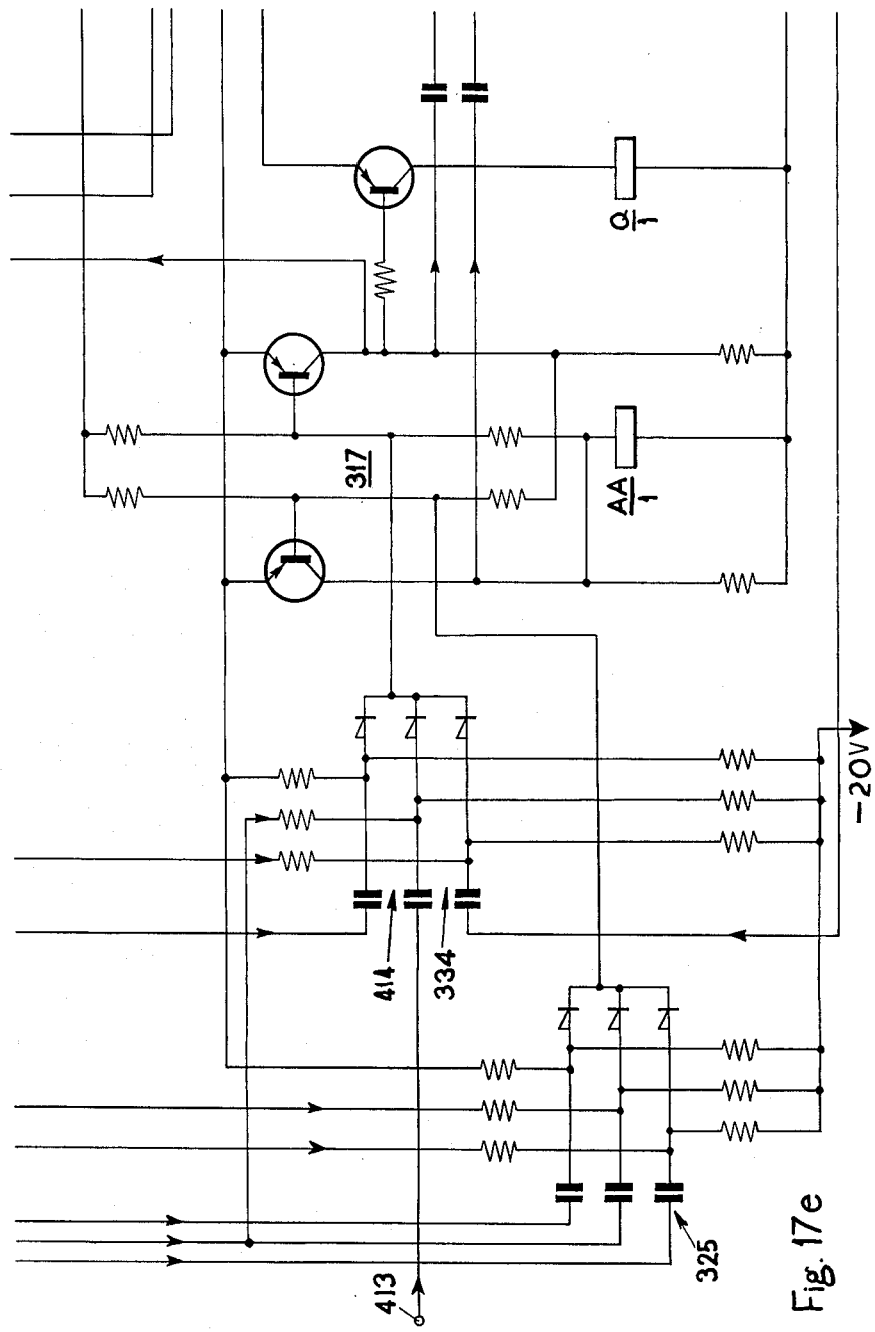
Figure 17G:
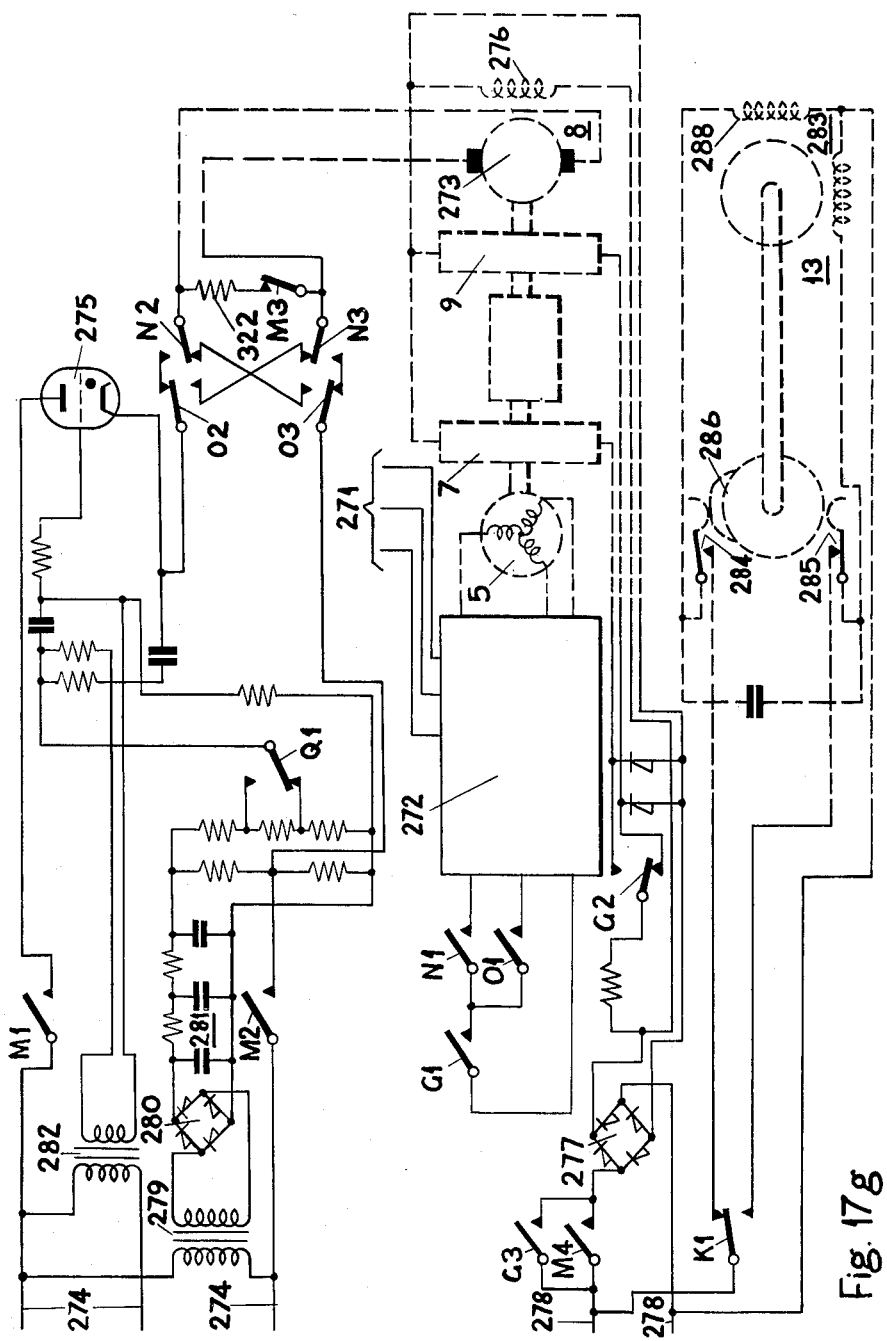

Referring now to FIGURE 17G, the speed at which the lead screw 2 is driven and the direction of rotation thereof is controlled by five electromagnetic relays G, M, N, O and Q. In the drawings all these relays are shown with their contacts released.

The alternating current motor 5 is a three-phase motor and is arranged to be connected to a three-phase supply 271 by way of two contactors shown diagrammatically by the rectangle 272, each of these contactors being associated with one direction of rotation of the motor. The contacts G1 are common to the operating circuits of both contactors while the contacts N1 and O1 are individual to the two operating circuits respectively. Thus when the relay G is operated, the supply to the motor 5 is completed so as to cause that motor to be driven, the direction of rotation being dependent upon which of the relays N and O is operated at that time.

The armature 273 of the direct current motor 8 is arranged to be supplied with direct current derived from a three-phase alternating current supply 274 by way of a thyratron 275. Relay contacts M1 and M2 are connected in the alternating current side of this supply, these contacts being closed when the armature 273 is to be energised. Relay contacts N2, N3, O2 and O3 are connected in the direct current side of this supply, the arrangement being such that the direction of current flow is dependent upon which one of the relays O and N is operated.

The voltage applied to the control grid of the thyratron 275 consists of a direct current component derived from the alternating current supply 274 via a transformer 279, a bridge rectifier circuit 280 and a smoothing network 281 and an alternating current component supplied by a transformer 282. The magnitude of this direct current component may have one of two values depending upon the position of the relay contacts Q1, the bias applied to the control grid of the thyratron 275 being more positive when the relay Q is operated, with the result that the armature current of the motor 8 is greater than when that relay is released.

The field winding 276 of the motor 8 is arranged to be supplied with direct current derived by means of a bridge rectifier circuit 277 from a single-phase alternating current supply 278. The alternating current supply to the bridge rectifier circuit 277 is completed by way of relay contacts G3 or M4 so that the winding 276 is energised when either the relay G or the relay M is operated.

The operating windings (not shown) of the clutches 7 and 9 are arranged to be energised with direct current supplied by the bridge rectifier 277 by way of relay contacts G2, the clutch 7 being operated when the relay G is operated while the clutch 9 is operated when the relay G is released.

A further electromagnetic relay K is arranged by way of contacts K1 to feed alternating current from the supply 278 to the clamp actuator 13. Associated with the alternating current motor 283 of the actuator 13 there are provided switches 284 and 285 which are arranged to be operated by a cam 286 which is rotated by the motor 283. The arrangement is such that when the contacts K1 are in the position shown, the windings 287 and 288 of the motor 283 are energised so as to drive the cam 286 to the position shown with the result that the contacts of the switch 284 open and the supply to the motor 283 is interrupted. In this position of the cam 286, the clamp 12 is operated to clamp the table 1. When the relay K is operated, the windings 287 and 288 are energised so as to cause the motor 283 to drive the cam 286 to a position diametrically opposite to that shown in the drawing, in this position the clamp 12 is released and again the supply to the motor 283 is interrupted by the switch 285.

The circuitry associated with the control of the relays G, K, M, N, O and Q is shown in FIGURES 17A to 17B. With the mode of operation of the system at present being considered, the terminal 289 is maintained at a potential of −10 volts and the terminal 290 is earthed. This circuit can, therefore, be represented, as far as the mode of operation under consideration is concerned, in the diagrammatic form shown in FIGURE 18, this figure representing the table control circuit 11 in similar manner to the way in which FIGURE 14 represents the pilot lead-screw control circuit 19.

The "high" and "not low" signals developed at the terminals 255 and 257 (FIGURE 15) respectively are applied to terminals 291 and 292 of the table control circuit. The "not low" signal is passed through an inverter 293 to provide a "low" signal which together with the "high" signal, is supplied to a gate 294. A signal is therefore supplied by the gate 294 whenever the sensing device 10 is outside a zero region and this signal is passed through an inverter 295 to provide a signal when the sensing device 10 is within such a region.

Terminals 265, 266, 267 and 268 are connected to terminals 265′, 266′, 267′ and 268′ (FIGURE 13A). Accordingly the operating windings of the relays N and O are supplied with the "low" and "high" signals respectively, the switches S2 and S4 being shown in broken outline, so that the relay N is operated when the sensing device 10 is on the low side of a zero region and the relay O is operated when it is on the high side.

A bistable circuit 296 is associated with relay G for the purpose of controlling same. When the circuit 205 (FIGURE 13D) has been triggered to initiate a positioning sequence of the nut 3, a positive-going pulse is developed at the terminal 297 and this pulse is applied to a terminal 298 so as to cause the transistor 299 of the circuit 296 to be conducting and the transistor 300 to be cut off. This in turn causes the transistor 302 to be conducting with the result that the relay G is operated. The motor 5 is therefore driven so as to bring the sensing device 10 into a region of "true zero."

The terminal 303 is connected to the terminal 304 (FIGURE 13B) of the pilot lead screw control circuit. A gate 305 is arranged to detect coincidence of a signal at the terminal 303 and a signal supplied by the circuit 296 when the transistor 300 thereof is conducting. Accordingly no signal is supplied by the gate 305 when the gear box 16 is in high gear or when the relay G is operated to drive the motor 5. It follows, therefore, that no signal is passed by the gate 306 and the relay M is not operated at this time.

Since at this time no signal is being passed by the gate 305, there is no signal supplied by the gate 307 and accordingly no signal is passed to the inverter 311. It follows, therefore, that a signal is at this time passed by the inverter 311 thereby causing the relay K to be operated with the result that the table 1 is unclamped.

While the motor 5 is running, contacts G4 are closed with the result that a signal is applied to a lead 312. As mentioned in the last paragraph, a signal is supplied at this time by the inverter 311 while a monostable circuit 313 is also in the condition to supply a signal to the gate 314 which thus itself passes a signal. This latter signal is fed to two gates 315 and 316, the gate 315 being arranged to detect coincidence of this signal with the beginning of a "low"' signal while the gate 316 detects coincidence with the beginning of a "high" signal.

When the lead screw 2 has been driven by the motor 5 in the manner described above, it will be appreciated that upon the sensing device 10 passing through the region of "true zero," the circuit 296 is triggered by a signal passed by one of the gates 315 and 316 back to the condition with the transistor 299 cut off. This results in the relay G being released to interrupt the supply to the motor 5.

A bistable circuit 317 is associated with the relay Q in the same manner as the bistable circuit 296 is associated with the relay G and operating the circuit 296 to the conditon in which the transistor 300 is conducting causes a signal to be supplied over the lead 318 to trigger the circuit 317 and thereby operate the relay Q. If, however, at this time there is no signal applied to the terminal 303, no signal is passed by the gate 305 to the gate 306 and accordingly the relay M cannot be operated to drive the direct current motor 8. There is therefore a pause until a signal appears at the terminal 303 as a result of the gear box 16 being in low gear. When this signal appears, the circuit 296 is again triggered to operate the relay G. The motor 5 then drives the lead screw 2 as before until the sensing device 10 reaches the "true zero" region.

A monostable circuit 319 is associated with the relay M, this circuit being triggered from a stable condition to an unstable condition when a signal is supplied thereto by a gate 321. When this circuit 319 is in its stable condition, a signal is supplied thereby to the gate 306 and thus when a signal is also supplied by the gate 305 (indicating that the relay G is released and that the gear box 16 is in low gear), a signal is supplied by the gate 306 to operate the relay M. The contacts M1 and M2 are thus closed to complete the alternating current supply to the thyratron 275 and the contacts M3 are open so as to disconnect the resistor 322 from across the armature 273 of the motor 8. As previously described the circuit 317 is triggered at this time by the signal supplied thereto over the lead 318 so that the relay Q is operated. At the same time the relay AA is operated by the circuit 317 and the contacts AA1 thereof (FIGURE 15) connect the transformer 238 in circuit with the result that a further portion of the oscillations supplied to the winding 230 are, after passing through the phase-shifting network formed by three components 241, a potentiometer 242 and the transformer 238, added to the oscillations on the leads 239 and 240. This has the effect of shifting the "zero" region so as to give a region of "false zero" as shown in FIGURE 16. The three components 241 are chosen by trial and error so as to satisfy this requirement and at the same time not to introduce any quadrature component. Triggering the circuit 317 also causes the guard circuit 313, which is similar to the circuit 319, to be triggered to its unstable condition. Accordingly the previously mentioned signal normally supplied by the circuit 313 to the gate 324 is temporarily removed. This gate 324 is arranged to detect coincidence of signals supplied by the gate 305 and by the inverter 311 so that although these two signals are present at the time being considered, no signal is passed by the gate 324 until the end of the period timed by the circuit 313. Under these conditions the direct current motor 8 is caused to drive the lead-screw 2 at the higher speed of that motor until the sensing device 10 reaches the region of "false zero." When this region is reached, the circuit 319 is triggered to its unstable condition and accordingly the relay M is released to interrupt the supply to the motor 8 and at the same time apply dynamic braking to that motor.

If now the high speed drive by the motor 8 has been in what may be termed the forward direction so that at the end of the high speed drive there is a "not low" signal at the terminal 292, the gate 325 causes the circuit 317 to release the relays AA and Q. If, on the other hand, the previous drive by the motor 8 had been in the reverse direction, the relay M is re-operated after a period timed by the guard circuit 313 to drive the motor 8 again at its higher speed to bring the sensing device 10 forward through the "false zero" region. It will, of course, be appreciated that the conditions of the relays N and O are interchanged for this second drive. As previously, this drive is stopped by the relay M releasing. The resulting overshoot again causes the "not low" signal to be present so that a signal is passed through the gate 325 to trigger the circuit 317 and thereby release the relays AA and Q.

Upon the relay M operating again, the motor 8 is then driven at its lower speed to the region of "true zero" and when this has been reached, the relays M, N and O are released so as to stop the motor 8.

The terminal 326 is connected to the terminal 327 (FIGURE 13C) of the pilot lead-screw control circuit and there is therefore applied to the terminal 326 a signal when the pilot lead-screw sequence has been completed. If this signal is present when the low speed operation of the motor 8 ceases, a signal is passed by the gate 307 since there are then signals on all the leads 328 to 332. The signal supplied by the gate 307 is passed through the gate 309 with the result that no signal is then passed by the inverter 311 and the relay K is released so as to initiate clamping of the table 1.

If the total movement of the pilot lead screw 4 in a sequence to position the nut 3 is such that the sensing device 10 is indicating true zero at the time when the unclamping operation has been completed, and if the sensing device continues to indicate true zero until the pilot lead-screw sequence is complete, then the appearance of a signal at the terminal 326 will trigger the circuit 296 via the gate 333, which in turn will trigger the circuit 317 over the lead 318 with the result that the motor 8 is driven in the appropriate direction at its higher speed to bring the sensing device 10 to the region of "false zero." The sequence continues from that point as before.

*Zero setting—General description*

It will be recalled that, as so far described, the control system operates to position the table 1 so that it is spaced from some arbitrary zero by a distance determined by a punched card supplied to the card reader 18. In fact, the system is adapted so that the "zero" position of the table can be selected at will.

The manner in which zero setting is effected is that the table 1 is first brought to a predetermined position, for example so that a datum mark or line on a work piece clamped to the table is in register with a stationary index, by operating the motors 5 and 8 under the control of push-buttons (not shown) or by operating hand-wheels (not shown). (It will be appreciated that such positioning of the table 1 has the effect of bringing it to a position that is an unknown distance from the "zero" position appertaining at that time.) The nut 3 is then driven via the pilot lead-screw 4 until it takes up a position corresponding to that of the table 1, as determined by the sensing device 10 and finally the binary representation of the position of the nut 3, as given by the digitizer 14 (as previously described) is changed one decimal digit at a time so that the binary representation supplied to the digit selection circuit 21 is of the decimal number representing the desired co-ordinate of the datum mark, as punched on a card supplied to the card reader 18, numerical switching circuits (not shown in FIGURE 1) being provided for this purpose between the digitizer 14 and the circuit 21. It should be noted, however, that the "zero" position of the table need not coincide with the datum mark.

It follows that if zero setting is effected with a card supplied to the card reader 18 with holes punched therein corresponding to the number "345678," say, and the system is then used in the manner previously described to position the table 1 in dependence upon a card which is punched in respect of the number "765432," say, the table will be positioned so that the boring machine may drill a hole at a distance of 41.9754 inches from the datum mark or line used for positioning the table prior to zero setting.

*Zero setting—Numerical switching circuits*

A separate numerical switching circuit is provided for each digit of the six-digit decimal number represented by the outputs of the digitizer 14 and one such circuit is shown in FIGURES 19 and 20. Referring now to FIGURE 19, there is a continuously rotary six-pole ten-way switch 340 and the five oscillations supplied by the digitizer 14 in respect of the particular decimal digit, for example the oscillations on the leads 74 to 78 (FIGURE 7) are fed via terminals 341 to 345 to five of the movable contacts 346 to 350 respectively of the switch. The contacts of the five contact banks associated with the contacts 346 to 350 are connected to ten leads 351 to 360.

Referring also to FIGURE 20, auto-transformers 362 to 366 are provided across pairs of leads such as the pair of leads 351 and 352, and the centre tapping of each of these transformers is connected to the live side of the voltage source represented in FIGURE 7 by the battery 377. The effect of the auto-transformers 362 to 366 is that when an oscillation is applied to any one of the leads 351 to 360, an oscillation in antiphase thereto is automatically supplied to the other one of the pair of leads associated with one of the transformers. It will be recalled that reversal in phase of the oscillations representing a binary digit corresponds to a change in the value of that digit and if, therefore, oscillations applied to the lead 353, say, represent the digit "0," then the auto-transformer 363 causes oscillations corresponding to the digit "1" to be present on the lead 354.

The switch 340 shown in the drawing is in the position corresponding to zero shift and it will be noted that the oscillations supplied to the terminals 341 to 345 are passed to the leads 351, 353, 355, 357 and 359 respectively. If, now, the movable contacts 346 to 350 of the switch are turned one step anti-clockwise, the oscillations applied to the terminals 341 to 345 are passed to the leads 358, 360, 352, 354 and 356 respectively. In other words, if the oscillations applied to the terminals 341 to 345 correspond to the binary number "11001," which represents the decimal number "2," the oscillations on the leads 352, 354, 356, 358 and 360 correspond to the number "00111." Due to phase reversal by the transformers 362 to 366, the oscillations on the leads 351, 355, 357 and 359 correspond to the number "11000," that is to say the decimal number "3." More generally, this position of the switch 340 causes the oscillations on the leads 351, 353, 355, 357 and 359 to represent a decimal number one greater than that represented by the oscillations applied to the terminals 341 to 345.

Moving the switch 340 one further step anti-clockwise causes the oscillations supplied to the terminals 341 to 345 to be passed to the leads 353, 355, 357, 359, 351 respectively. Thus the oscillations on these five leads represent a shift of two in the decimal number represented thereby. Similarly the remaining positions of the switch 340 give rise to a shift having a numerical value as indicated in the drawing against the contacts of the contact bank associated with the contact 350.

If, now, the lead 378 is maintained at a voltage more negative than that of the source 377, the rectifier elements represented by the reference 379 are conducting with the result that the oscillations on the leads 351, 353, 355, 357 and 359 are passed to terminals 381 to 385 respectively, it being appreciated that the oscillations developed at the terminals 381, 382, 383, 384 and 385 represent $p$, $q$, $r$, $s$ and $t$ digits of the binary representation of the shifted decimal number. At this time the lead 386 is biassed so that the group of rectifier elements having the reference numeral 387 are non-conducting.

The effects of zero setting have so far only been considered as applied to one decimal digit at a time although, in fact, it is sometimes necessary to carry from one digit to the next more significant digit. If, for example, a two digit decimal number in the range from "00" to "20" is to have "3" added to it, the situation is as set out in Table II below:

TABLE II

| Original Decimal Number | Resultant Decimal Number | Carry from 2nd Decimal Digit to 1st Decimal Digit | Digit $p$ of 2nd Decimal Digit of Original No. | Digit $p$ of 2nd Decimal Digit of Resultant No. |
| --- | --- | --- | --- | --- |
| 00 | 03 | No | 1 | 1 |
| 01 | 04 | No | 1 | 1 |
| 02 | 05 | No | 1 | 0 |
| 03 | 06 | No | 1 | 0 |
| 04 | 07 | No | 1 | 0 |
| 05 | 08 | No | 0 | 0 |
| 06 | 09 | No | 0 | 0 |
| 07 | 10 | Yes | 0 | 1 |
| 08 | 11 | Yes | 0 | 1 |
| 09 | 12 | Yes | 0 | 1 |
| 10 | 13 | No | 1 | 1 |
| 11 | 14 | No | 1 | 1 |
| 12 | 15 | No | 1 | 0 |
| 13 | 16 | No | 1 | 0 |
| 14 | 17 | No | 1 | 0 |
| 15 | 18 | No | 0 | 0 |
| 16 | 19 | No | 0 | 0 |
| 17 | 20 | Yes | 0 | 1 |
| 18 | 21 | Yes | 0 | 1 |
| 19 | 22 | Yes | 0 | 1 |
| 20 | 23 | No | 1 | 1 |

In Table II, there is given the binary digit $p$ (according to the code of Table I) corresponding to the second decimal digits of both the original and the resultant decimal numbers. It will be noted that it is necessary for "1" to be added to the first decimal digit of the original number only when the binary digit $p$ of the second decimal digit of the original number is "0" and the digit $p$ of the second decimal digit of the resultant number is "1." This rule applies generally provided the number being added is between "0" and "4" inclusive.

If, however, "8," say is to be added, the situation is as set out in Table III.

TABLE III

| Original Decimal Number | Resultant Decimal Number | Carry from 2nd Decimal Digit to 1st Decimal Digit | Digit p of 2nd Decimal Digit of Original No. | Digit p of 2nd Decimal Digit of Resultant No. |
|---|---|---|---|---|
| 00 | 08 | No | 1 | 0 |
| 01 | 09 | No | 1 | 0 |
| 02 | 10 | Yes | 1 | 1 |
| 03 | 11 | Yes | 1 | 1 |
| 04 | 12 | Yes | 1 | 1 |
| 05 | 13 | Yes | 0 | 1 |
| 06 | 14 | Yes | 0 | 1 |
| 07 | 15 | Yes | 0 | 0 |
| 08 | 16 | Yes | 0 | 0 |
| 09 | 17 | Yes | 0 | 0 |
| 10 | 18 | No | 1 | 0 |
| 11 | 19 | No | 1 | 0 |
| 12 | 20 | Yes | 1 | 1 |
| 13 | 21 | Yes | 1 | 1 |
| 14 | 22 | Yes | 1 | 1 |
| 15 | 23 | Yes | 0 | 1 |
| 16 | 24 | Yes | 0 | 1 |
| 17 | 25 | Yes | 0 | 0 |
| 18 | 26 | Yes | 0 | 0 |
| 19 | 27 | Yes | 0 | 0 |
| 20 | 28 | No | 1 | 0 |

It will be seen from Table III that "1" has to be added to the first decimal digit of the original whenever either the binary digit $p$ of the second decimal digit of the original number is "0" or the digit $p$ of the second decimal digit of the resultant number is "1." This rule applies generally if the number to be added is between "5" and "9" inclusive.

The manner in which the circuit shown in FIGURES 19 and 20 is caused to change the oscillations passed to the terminals 381 to 385 so that "1" is added to the decimal digit represented by those oscillations will now be described. As previously mentioned, the rectifier elements 379 are normally conducting, that is to say when there is no carry from the next less significant decimal digit, and the rectifier elements 378 are not conducting. When however, "1" is to be added for the purpose of carry, the bias on the leads 378 and 386 is reversed so that the rectifier elements 387 are conducting and the elements 379 are not conducting.

Due to the phase inversion by the transformers 362 to 366, which is equivalent to a shift of "5," and to the connections of the rectifier elements 387 to the terminals 381 to 385, which are equivalent to a shift of "4," there is effectively a shift of "1" in the decimal digit represented by the oscillations at the terminals 381 to 385.

There are also provided a pair of rectifier elements 388 which are biassed by the voltage on the lead 389 and further pairs of rectifier elements 391 which are biassed by the voltage on the lead 392. One or other of these two pairs of rectifier elements is conducting at any time so that the oscillations passed thereby via the lead 393 to the terminal 394 represent the digit $p$ associated with the resultant decimal digit under consideration.

The oscillations on the terminal of the equivalent circuit associated with the next less significant decimal digit corresponding to the terminal 394, this terminal being referenced 394′ in FIGURE 20, are supplied to a device 395 which is identical with the device 104 hereinbefore described. The output of the device 395 is either zero volts or −10 volts depending upon the value of the digit $p$, this voltage having the more positive value when $p$ is equal to "1."

The output voltage of the device 395 is passed to two gates 396 and 397 together with the voltage applied to a terminal 398, this voltage being either zero volts or −10 volts in dependence upon the value of the digit $p$ determined by the digitizer in respect of said next decimal digit, the more positive value corresponding to $p$ being equal to "0." It will be recalled that each stage of the digitizer 14 (other than that associated with the most significant decimal digit) has a device, such as the device 71 (FIGURE 8) which is responsive to the digit $p$ of that stage.

The necessary voltage applied to the terminal 398 is therefore obtained by connecting that terminal to a terminal (corresponding to the terminal 399 of the device 71) of the appropriate device.

One or other of the output voltages supplied by the gates 396 and 397 is passed to a lead 401 via switch "contacts" 402 which are shown in broken outline in FIGURE 20. In fact, these "contacts" 402 are provided by a sixth bank of the switch corresponding to the switch 340 of the numerical switching circuit associated with said next decimal digit, the appropriate bank of contacts having the reference 402′ in FIGURE 19. The "contacts" 402 are in the position shown in FIGURE 20 when the number to be added by the numerical switching circuit associated with said next decimal digit is "0" to "4" and in the alternative position when the added number is "5" to "9."

The gate 396 is arranged to supply a signal (as previously defined) when either of the input voltages to that gate has its more positive value. The gate 397, on the other hand, supplies a signal only when both of its input voltages have the more positive value. It will therefore be appreciated that the lead 401 is maintained at approximately earth potential when the numerical switching circuit under consideration is required to add "1" for carrying purposes.

A terminal 403 is connected to the appropriate terminal 163 of the digit selector 20 (FIGURE 12) so that a negative voltage is applied to the terminal 403 when the decimal digit associated with the numerical switching circuit under consideration is selected. A gate 404 is arranged to detect coincidence of negative voltages on the lead 401 and on the terminal 403 with the result that a negative voltage is applied to the lead 378 when there is no carry and the appropriate decimal digit is selected. The rectifier elements 379 are therefore conducting so that oscillations on the leads 351, 353, 355, 357 and 359 are passed directly to the terminals 381 to 385 respectively.

The voltage on the lead 401 is inverted by means of a transistor 405 and this inverted voltage and the voltage supplied to the terminal 403 are supplied to another coincidence gate 406 which is arranged in similar manner to the gate 404 to supply the voltage applied to the lead 386. With the conditions at present being considered, the transistor 405 is conducting so that the lead 386 is approximately at earth potential and the rectifier elements 383 are biased to be not conducting.

When, however, there is a signal applied to the lead 401, that is to say the negative voltage is removed, indicating that the numerical switching circuit is to add "1" for carry purposes, the voltages on the leads 378 and 386 are reversed. Accordingly the rectifier elements 379 are cut off and the rectifier elements 387 are conducting so that the oscillations supplied to the terminals 381 to 385 then represent the required resultant number as previously described.

It will be noted that a negative voltage is applied to one or other of the leads 389 and 392 irrespective of whether the appropriate decimal digit is selected by the digit selection circuit 21. Oscillations representing the digit $p$ of the resultant decimal digit are therefore supplied at all times to the terminal 394.

Although in describing the operation of the system it was convenient previously to treat the digit selection circuit 21 as a separate unit, it will now be realised that this circuit is, in fact, combined with the numerical switching circuits for zero setting. The complete circuit for carrying out the functions of digit selection and zero setting is therefore shown in FIGURE 21, this figure replacing the simplified figure (FIGURE 10) previously considered. The numerical switching circuit associated with the least significant decimal digit does not, of course, have provision for carry from the preceding digit. Accordingly the circuit shown diagrammatically by the rectangle 407 in FIGURE 21 is the same as that shown in FIGURE 20 except that the lead 378 is connected directly to the terminal 403 and the rectifier elements 387, 388 and 391 and the circuits at the bottom of this figure including the gates 396, 397, 404 and 406 are omitted.

*Zero setting—Operation of pilot lead-screw and table control circuits*

Considering now the table control circuit shown in FIGURES 17A to 17G, the terminals 289 and 290 are maintained during zero setting at earth potential and −10 volts respectively. This ensures that the circuit 296, for example, is triggered to the condition in which the transistor 299 is cut-off and the transistor 300 is conducting with the result that the transistor 302 is cut-off and the relay G cannot be operated. The motor 5 cannot therefore be provided with an electric supply. Moreover, the gate 305 is inoperative by virtue of the negative voltage on terminal 290, with the result that no signal can be passed by the gate 306 and the relay M remains unoperated. The motor 8 cannot therefore be provided with an electric supply.

The circuit of FIGURE 17 may, when used for zero setting, be simplified (in similar manner to FIGURE 18) to the diagrammatic form shown in FIGURE 22.

The "high" and "not low" signals are again applied to the terminals 291 and 292. As previously noted, the gate 294, to which are passed the signal applied to the terminal 291 and the signal applied to the terminal 292 after inversion by the inverter 293, supplies a signal whenever the sensing device 10 is outside a zero region and the signal passed by this gate is fed to a terminal 410.

During zero setting the switches S1 to S5 (FIGURE 13A) are operated to their alternative positions. Accordingly the "high" signal applied to the terminal 291 and the "low" signal supplied by the inverter 293 are in this case utilised to control the relays B and C of the pilot lead screw control circuit. It will be recalled that those two relays determine the direction in which the motor 15 is driven at any time.

When being operated in the manner now under consideration, the terminal 185 (FIGURE 13B) of the pilot lead screw control circuit is at earth potential and thus the five rectifier elements, such as the element 411 (FIGURE 13A), prevent any negative voltage applied to the terminals 191 and 194 being passed on to the gates 195 to 198.

The terminal 412 associated with the switch S1 is connected to the terminal 410 (FIGURE 17) and, since this switch is now operated to its alternative position, a signal is supplied to the gate 208 whenever the sensing device 10 is outside a zero region.

FIGURE 23 is a simplified diagram (similar to FIGURE 14) showing the operation of the pilot lead screw control circuit during zero setting, and in this figure the same references have been used as in FIGURES 13 and 14 although where the number of inputs to corresponding gates in FIGURES 14 and 23 are not the same, the gate in FIGURE 23 has the addition of a dash against its reference numeral. For example, the gate 195 has four input signals supplied to it when being used in the manner shown in FIGURE 14 whereas in FIGURE 23, it has only three input signals and is accordingly references 195′.

To initiate a zero setting sequence, the start signal is applied to a terminal 414 (FIGURE 13B) of the pilot lead screw control circuit and this signal causes the circuit 205 to be triggered as before. The circuits 188 and 189 are therefore triggered so that the relays E and X are operated thereby setting up circuits for the motor 15 to be driven at high speed and for the gear box 16 to be in high gear.

If, now, the sensing device 10 is not in a region of "true zero," a signal is applied to the terminal 412 and coincidence of this signal with the signal supplied by the circuit 201 is detected by the gate 208 so as to supply a signal to trigger the circuit 187. This has the effect of operating the relay A so as to complete the supply to the motor 15 with the result that the motor is driven at high speed until a signal is supplied by the gate 199 to trigger the circuit 201 which in turn supplies a signal to the circuit 187 to trigger it to the condition in which the relay A is released.

As previously stated, a signal is applied to the terminal 415 when the table 1 is correctly positioned relative to the nut 3, the terminal 415 being connected to the terminal 416 (FIGURE 17C) for this purpose. This signal is passed via the gates 210 and 198 to the gate 199 with the result that the circuits 201 and 187 are triggered and the relay A is released to stop the motor 15.

A start signal is also supplied to the terminal 413 (FIGURE 17E) of the table control circuit at the beginning of a zero setting sequence so that any signal applied by the gate 320 is passed to the circuit 317. If, at this time, the sensing device 10 is in a region of "true zero," a signal is supplied by the inverter 295, coincidence of this signal with the signal supplied by the circuit 313 is detected by the gate 320 and accordingly the circuit 317 is triggered. The only effect of the circuit 317 being triggered, apart from the fact that the circuit 313 is triggered to its unstable condition thereby temporarily preventing any signal being passed by the gate 320, is that the relay AA is operated. This causes a signal to be applied to one of the terminals 291 and 292 and to the terminal 412 with the result that the motor 15 is operated to drive the pilot lead screw 4 until the sensing device 10 reaches the region of "false zero." (The reason for driving the sensing device 10 away from the "true zero" region is that by driving it back into that region, it can be positioned to greater accuracy.) When the "false zero" region is reached, a signal is again supplied by the gate 320 so as to cause the circuit 317 to revert to its original condition thereby releasing the relay AA.

As in the case of normal positioning, the pilot lead screw control circuit is then operated so as to set up connections for the motor 15 to be driven at low speed with the gear box 16 still in high gear. The sensing device 10 is not then within the region of "true zero" and the relay A is again operated to complete the supply to the motor 15 so as to drive the sensing device 10 into that region. When the motor stops after being operated in this manner, the sensing device 10 will pass through the region of "true zero" and if a "low" signal was not previously applied to the terminal 417, which is connected to the terminal 419 (FIGURE 17A), no signal can be passed by the gate 217 to the circuit 189. The relay A which will have released when the sensing device 10 moved into the region of "true zero" will re-operate so as to cause the motor 15 again to drive the pilot lead screw 4 to bring the sensing device 10 back into the zero region, this time from the "low" region. When the sensing device 10 arrives at the zero region from the direction of the low region, the gate 217 passes a signal to trigger the circuit 189. The effect of this is that the relay X is released and the relay E is re-operated so as to set up connections for the motor 15 to be driven again at high speed with the gear box 16 in low gear.

Again the motor 15 operates to bring the sensing device 10 into the zero region and at the end of this step of positioning the sensing device, the circuit 188 is again triggered so as to release the relay E. As before, the sensing device 10 does not stop within the zero region, and the motor 15 is therefore again operated at low speed, the gear box 16 already being in low gear so as to drive the sensing device into the zero region.

When at the end of the sequence just described, the sensing device 10 is brought to the region of "true zero" and the circuits 187, 188 and 189 are in the conditions corresponding to the relays A, E and X being released, a signal is passed by the gate 223 and if this signal remains, a signal is subsequently supplied by the amplifier 225 to the terminal 226 to signify that positioning of the sensing device 10 has been completed. If the signal supplied by the gate 223 is only of momentary duration, due for example to the signal applied to the terminal 415 disappearing as a result of overshoot, the last step of positioning is repeated until a steady signal is supplied by the gate 223.

*Zero setting—Operation of numerical switching circuits*

Each of the switches 340 (FIGURE 19) is, in fact, an electromagnetic step-by-step switch and the circuit for operating these switches is shown in FIGURES 24A and 24B. In these figures, the three input terminals 421, 422 and 423 are connected to the terminals 226 (FIGURE 13C), 136 (FIGURE 11C) and 207 (FIGURE 11C) respectively. A signal is thus applied to the terminal 421 when the sequence of the pilot lead screw control circuit described above has been completed while a signal is applied to the terminal 422 when $d$ is not equal to $c$. Moreover, a positive-going pulse is applied to the terminal 423 when the condition $d$ not equal to $c$ is detected by the comparison circuit 17 so as to replace the normal negative voltage by earth potential.

During normal positioning by the control system, the terminal 424 is maintained at earth potential so that both the transistors 425 and 426 of a monostable circuit 427 are cut-off and as will subsequently be apparent, this inhibits operation of the switches 340. During zero setting, however, the terminal 424 is maintained at −10 volts with the result that the circuit 427 operates so that one or other of the transistors 425 or 426 is conducting and the other is cut-off.

Six terminals 428 are connected to the six terminals 162 of the digit selector 20 (FIGURE 12) so that only one of the six circuits 429 is operatively selected at any time. The circuits 429 are all the same but only the left hand one, which is the one associated with most significant decimal digit is shown in full. A further terminal 431 is connected to a terminal 432 (FIGURE 12).

When, during zero setting, the nut 3 on the pilot lead-screw 4 is correctly positioned, a signal is supplied to the terminal 421 as aforesaid. This is passed through an inverter formed by a transistor 433 and coincidence of this inverted signal and a signal applied to a terminal 440 which is connected to the terminal 216 (FIGURE 13D) is detected by a gate formed by rectifier elements 434 and 435, a signal being passed to a terminal 441 to which the terminal 164 (FIGURE 12) is connected when such coincidence is detected. (Thus with the normal positioning conditions previously considered, a signal is supplied via the terminals 441 and 164 to reset the digit selector 20 whenever a signal is supplied to the terminal 216 (FIGURE 13D) and the pilot lead-screw sequence is not completed as was previously assumed in describing the operation of the pilot lead-screw control circuit.)

With the present mode of operation, a signal supplied to the terminal 216 (FIGURE 13D) during the pilot lead-screw sequence when there is no signal developed at the terminal 226 (FIGURE 13C), causes a signal to be supplied to the digit selector 20 so as to reset it to select the first decimal digit.

If, now, when the signal is subsequently applied to the terminal 421, $d$ is not equal to $c$, a signal is passed via a gate 438 to a gate 439 which is arranged to detect coincidence of such a signal with a signal on an output of a bistable circuit 442 (which at this time is supplying such a signal) and a signal on the terminal 421. (It will, of course, be appreciated that $c$ is at this time determined by a punched card supplied to the card reader 18, this card being punched in respect of the required coordinate of the datum mark or line.) The resulting signal supplied by the gate 439 is passed via a transistor 443 and a rectifier element 444 to a lead 445 to which the circuits 429 are all connected.

Considering now the left-hand circuit 429 in the drawing, coincidence of a signal on the lead 445 with a signal applied to the appropriate terminal 428 to select the first digit is detected by a gate 446 with the result that a transistor 447 is cut-off and a transistor 448, which was previously cut-off, is caused to conduct. The operating winding of a relay Z is connected in circuit with the transistor 448 with the result that this relay is operated. Contacts Z1, which are connected in parallel with like contacts of relays associated with the other five switches 340, are thus closed so as to apply negative bias to the base electrode of a transistor 452 so as to render that transistor conducting and thereby cause a signal to continue to be supplied to the lead 445 even though the signal supplied by the gate 439 may have disappeared. Closing the contacts Z2 completes the energising circuit of the operating winding 449 of the appropriate switch 340 (FIGURE 19) which is therefore stepped on one step at this time. (It will be recalled that this has the effect of adding one to the digit $d$.)

If now stepping the switch 340 under consideration on one position results in $d$ being equal to $c$, the "$d=c$" signal is supplied by the comparison circuit 17 to the digit selector 20, as previously described, with the result that the digit selector then causes the second digit to be selected. Operation of the digit selector 20 in this manner results in one of the input signals to the gate 446 being removed so that the winding 449 cannot be re-energised.

Energising the operating winding 449 of the switch 340 causes a pair of normally-closed auxiliary contacts 451 to be opened with the result that the circuit through the operating winding of the relay Z is broken and the winding 449 is de-energised. If, however, stepping the switch 340 on one position does not bring about the desired equality, a signal is still supplied by the gate 439 so that the sequence described above is repeated. This continues until such time as $d$ has the required value and the signal previously supplied to the terminal 421 disappears.

Under the control of the digit selector 20, each of the other circuits 429 is selected in turn and the switch 340 associated with each of these circuits is stepped in similar manner as necessary to change the oscillations supplied by the digitizer 14 in respect of the second to sixth digits of the decimal number which characterises the position of the nut 3.

It will be appreciated that a signal is applied to the terminal 423 to initiate stepping of the switch 340 associated with each of the six decimal digits. The first of these signals is fed via a lead 455 to cause a bistable circuit 442 to be triggered so that the transistor 456 thereof is conducting and the transistor 457 is cut off. The circuit 442 remains in this state until a signal is passed thereto by a transistor 458 to reverse the conditions of the transistors 456 and 457. In fact the transistor 458 is arranged to invert any signal supplied thereto by a gate 459.

As previously remarked, the terminal 431 is connected to the terminal 432 (FIGURE 12) and accordingly a signal is applied to the terminal 431 as long as the digit selector 20 is operated to select any one of the first five decimal digits. A signal is therefore passed by the gate 459 while the first five digits are being set in the manner described above and as long as $d$ does not equal $c$ in respect of the sixth digit. As soon as $d$ is equal to $c$ for the sixth digit, the signal supplied by the gate 459 disappears with the result that a signal is then supplied by the transistor 458 to trigger the circuit 442 so that the transistor 457 is conducting and the transistor 456 is cut off. This in turn triggers the monostable guard circuit 427 so that the transistor 425 is conducting and the transistor 426 is cut off. With the transistor 425 conducting, earth potential is applied via the transistor 464, which acts as an emitter follower, to the terminal 441. Accordingly the digit selector 20 is reset to select the first digit.

While the guard circuit 427 is in its unstable state, a negative bias is applied to the base electrode of a transistor 462 via a rectifier element 463. This causes the transistor 462 to be conducting for a short period while the digit selector 20 is being reset to select the first digit irrespective of the voltage then applied to the terminal 423.

The sequence described above is repeated one or more times (as may be necessary due to "carry" from one digit to the next more significant digit) until a sequence is completed without the circuit 442 having been triggered. When this occurs, coincidence of no signal supplied by the gate 459 and no signal supplied by the transistor 456 of the circuit 442 is determined by a gate 465 so that the bias holding a transistor 466 cut off is removed and that transistor is caused to conduct. A signal, which may be utilised to light a pilot lamp to signify that zero setting has been completed is therefore developed at a terminal 467.

*General*

The system may be arranged so that when zero setting has been effected in the manner described above, the same input data may be utilised to move the table an equal distance either way from the predetermined position at which zero setting was effected. This facility is convenient when using the boring machine to manufacture left-hand and right-hand parts since only one set of input data is required. To provide this facility it is merely necessary to connect a ten-pole two-way switch between the output terminals of the card reader 18 and the input lead 110–0 to 110–9 (FIGURE 11A) of the comparison circuit 17. If now these output terminals are given the references C–0 to C–9, the connections effected by the switch in its two positions are as set out in Table IV below.

TABLE IV

| Output Terminal of Card Reader 18 | Input Lead of Comparison Circuit 17 | |
|---|---|---|
|  | Position A | Position B |
| C–0 | 110–0 | 110–9 |
| C–1 | 110–1 | 110–8 |
| C–2 | 110–2 | 110–7 |
| C–3 | 110–3 | 110–6 |
| C–4 | 110–4 | 110–5 |
| C–5 | 110–5 | 110–4 |
| C–6 | 110–6 | 110–3 |
| C–7 | 110–7 | 110–2 |
| C–8 | 110–8 | 110–1 |
| C–9 | 110–9 | 110–0 |

When modified in the manner just described, this switch is operated to either Position A or Position B and is kept in the same position during zero setting and subsequent positioning of the table prior to boring.

The effect of operating this switch from Position A to Position B is that the six digit decimal number of the input data in Position A is replaced in Position B by a number obtained by subtracting the original number from 999999 and it can be shown that this causes the system to operate to give the result previously stated. In order, however, to prevent false operation of the system, it is convenient, in this case, also to modify the card reader 18 so that the most significant digit read thereby has "1" added to it. Thus a card punched in respect of the number "135791," say, would cause the modified card reader to supply voltages corresponding to the number "235791."

In the embodiment of the invention described herein with reference to the accompanying drawings, input data is supplied in the form of a punched card but it is to be understood that input data may be supplied in other ways. For example the input data may be in the form of a punched tape or alternatively multi-position electric switches which are arranged to be set by hand may be provided to establish the necessary connections in respect of the input data for positioning sequence. (In order to give the latter facility, the embodiment of the invention described herein by way of example may be modified by the provision of six ten-way single-pole switches, these switches being respectively associated with the six decimal digits of the input data, and each switch being connected between one of the terminals 162 of the digit selector 20 on the one hand and the ten leads 110–0 to 110–9 of the comparison circuit 17 on the other hand. These switches may be provided instead of, or in addition to, the card reader 18.)

Furthermore, although in the described embodiment of the invention, zero setting is effected by changing the signals supplied by the digitizer 14, it will be appreciated that the same effect could be obtained within the scope of the invention by changing the voltages supplied by the card reader 18.

We claim:
1. A position control arrangement comprising a movable member which is to be positioned relative to an arbitrary zero position, means to supply a first group of electric signals which represent input data in the form of a first multi-digit number characteristic of the desired position of said movable member, means to supply a second group of electric signals which represent information in the form of a second multi-digit number characteristic of the actual position of said movable member, means responsive to the first and second groups of signals to compare said first and second numbers, means to move said member in dependence upon the comparison of said numbers to reduce the difference between said numbers to a predetermined value during a positioning operation, zero-changing means to change one of said groups of signals whereby said zero position may be moved prior to a positioning operation, and means automatically to operate said zero-changing means during a zero setting operation in dependence upon the comparison effected by said means responsive to the first and second groups of signals so that, subsequent to such operation of the zero-changing means, the zero position is determined by the input data and the position of the movable member during the zero setting operation.

2. A position control system comprising a moveable part, a moveable member, means to supply a first group of electric signals which represent input data in the form of a multi-digit number that is characteristic of the desired position of the moveable part from an arbitrary zero position, means to supply a second group of electric signals which represent a second multi-digit number that is characteristic of the actual position of the moveable member, zero-changing means which is arranged to derive from one of the two groups of signals a further group of electric signals that represent another multi-digit number, comparison means to compare the further group of signals with the other group of signals, first positioning means to move the moveable member, second positioning means to move the moveable part, position responsive means which supplies an electric signal in dependence upon the relative positions of the moveable member and the moveable part, means operative during a positioning operation to cause the first positioning means to move the moveable member in dependence upon the comparison effected by the comparison means and to cause the second positioning means to move the moveable part in dependence upon the electric signal supplied by the position responsive means so that the moveable part then takes up a position determined by the input data relative to said zero position, and means operative during a zero setting operation to cause the first positioning means to move the moveable member in dependence upon the electric signal supplied by the position responsive means and to cause the zero-changing means to be operated in dependence upon the comparison effected by the comparison means so that the position of the arbitrary zero is then determined by the input data and the position of the moveable part.

3. A system according to claim 2 wherein the zero-changing means is arranged to derive the further group of electric signals from the second group of signals.

4. A system according to claim 2 wherein the first positioning means comprises a first lead-screw arranged to engage the moveable member and means to rotate the first lead-screw to cause said member to move along that lead-screw and the second positioning means comprises a second lead-screw arranged to engage the moveable part and means to rotate the second lead-screw to cause said part to move along that lead-screw.

5. A system according to claim 2 wherein the moveable part is the table of a machine tool.

References Cited by the Examiner

UNITED STATES PATENTS

| | | | |
|---|---|---|---|
| 2,784,359 | 3/57 | Kamm | 318—28 |
| 2,792,545 | 5/57 | Kamm | 318—162 X |
| 2,853,664 | 9/58 | Towns et al. | 318—28 |
| 2,875,390 | 2/59 | Tripp | 318—162 XR |
| 2,889,508 | 6/59 | McCoy et al. | 318—30 |
| 2,927,258 | 3/60 | Lippel | 318—28 |
| 3,011,113 | 11/61 | Jerue et al. | 318—162 XR |

ORIS L. RADER, *Primary Examiner.*

MILTON O. HIRSCHFIELD, *Examiner.*